United States Patent

Suzuki et al.

[11] Patent Number: 6,072,391
[45] Date of Patent: Jun. 6, 2000

[54] INFORMATION INDICATOR FOR VEHICLE

[75] Inventors: Akihiko Suzuki, Kagamigahara; Makoto Tamaki, Iwakura; Osamu Yamanaka, Aichi-ken; Tadanobu Iwasa; Hiroshi Ito, both of Ichinomiya, all of Japan

[73] Assignee: Toyoda Gosei Co., Ltd., Aichi-ken, Japan

[21] Appl. No.: 08/662,860

[22] Filed: Jun. 12, 1996

[30] Foreign Application Priority Data

| Jun. 12, 1995 | [JP] | Japan | 7-144453 |
| Aug. 3, 1995 | [JP] | Japan | 7-198314 |
| Mar. 11, 1996 | [JP] | Japan | 8-052182 |
| Mar. 28, 1996 | [JP] | Japan | 8-073571 |
| Mar. 29, 1996 | [JP] | Japan | 8-075872 |

[51] Int. Cl.[7] .................................................. B60Q 1/00
[52] U.S. Cl. .......................... 340/468; 340/435; 340/436; 340/815.45; 340/815.65; 340/815.69; 340/903
[58] Field of Search .................................... 340/438, 459, 340/461, 815.42, 815.43, 815.45, 815.65, 815.66, 815.67, 815.69, 437, 932.2, 463, 435, 436, 468, 903, 904

[56] References Cited

U.S. PATENT DOCUMENTS

| 3,748,642 | 7/1973 | Radin et al. | 340/466 |
| 4,026,654 | 5/1977 | Beaurain | 340/903 |
| 4,232,286 | 11/1980 | Voll | 340/932.2 |
| 4,274,078 | 6/1981 | Isobe et al. | 362/83.1 |
| 4,467,313 | 8/1984 | Yoshino et al. | 340/904 |
| 4,755,791 | 7/1988 | Kuroda | 340/466 |
| 4,825,191 | 4/1989 | Ching-Hwei | 340/479 |
| 5,032,821 | 7/1991 | Domanico et al. | 340/438 |
| 5,076,384 | 12/1991 | Wada et al. | 340/943 |
| 5,231,379 | 7/1993 | Wood et al. | 340/980 |
| 5,313,335 | 5/1994 | Gray et al. | 340/903 |
| 5,394,137 | 2/1995 | Orschek | 340/457.3 |
| 5,521,579 | 5/1996 | Bernhard | 340/438 |
| 5,546,311 | 8/1996 | Sekine | 340/902 |
| 5,552,761 | 9/1996 | Kazyaka | 340/456 |
| 5,699,057 | 12/1997 | Ikeda et al. | 340/435 |

FOREIGN PATENT DOCUMENTS

| 2932118 A1 | 2/1981 | Germany . |
| 4135042 C1 | 2/1993 | Germany . |
| 5-1596 | 1/1993 | Japan .............................. B60Q 1/32 |
| 07032911 | 2/1995 | Japan . |
| WO 85/01114 | 3/1985 | WIPO . |
| WO 94/09508 | 4/1994 | WIPO . |
| WO 95/25322 | 9/1995 | WIPO . |

OTHER PUBLICATIONS

German Patent Application Official Letter No. 196 23 469.7–51, Toyoda Gosei Co., Ltd., Sep. 24, 1997, pp. 1–3.

*Primary Examiner*—Edward Lefkowitz
*Attorney, Agent, or Firm*—Pillsbury Madison & Sutro LLP

[57] ABSTRACT

An information indicating device having an LED and a light transmitting structure is disposed within a line of sight of a vehicle operator so as to transmit light from the LED to the vehicle while the operator is driving the vehicle. A distance sensor measures a distance between a vehicle body and an object near it. An emission control circuit controls the LED based on an output of the distance sensor, thereby indicating predetermined information, such as a distance warning to the operator. An indicating portion is disposed on an end of a corner pole or a fender marker to receive light from the LED and transmit light to the vehicle operator without requiring the vehicle operator to substantially look away from the direction the vehicle is traveling or a mirror showing the driver the vehicle's traveling direction.

45 Claims, 42 Drawing Sheets

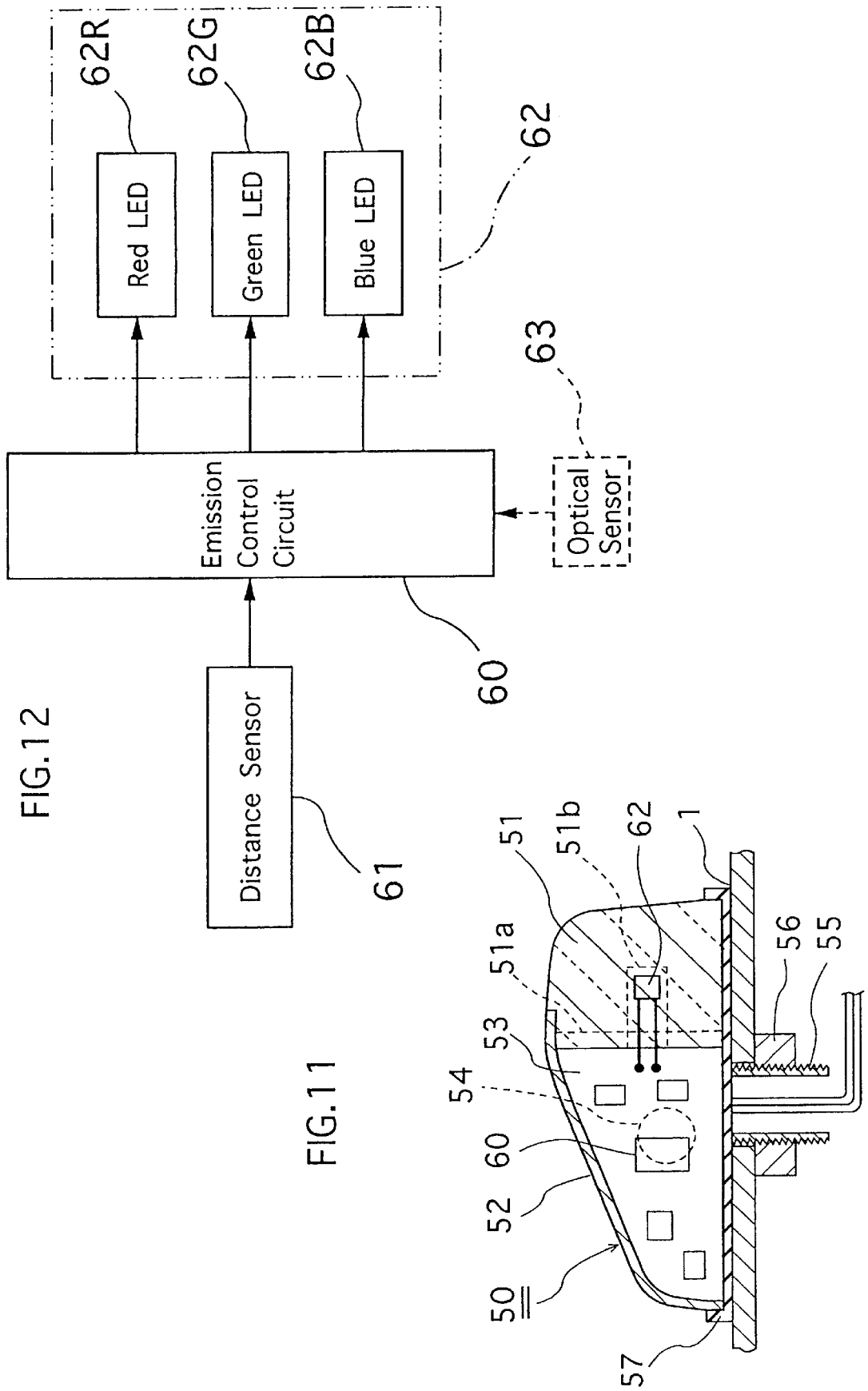

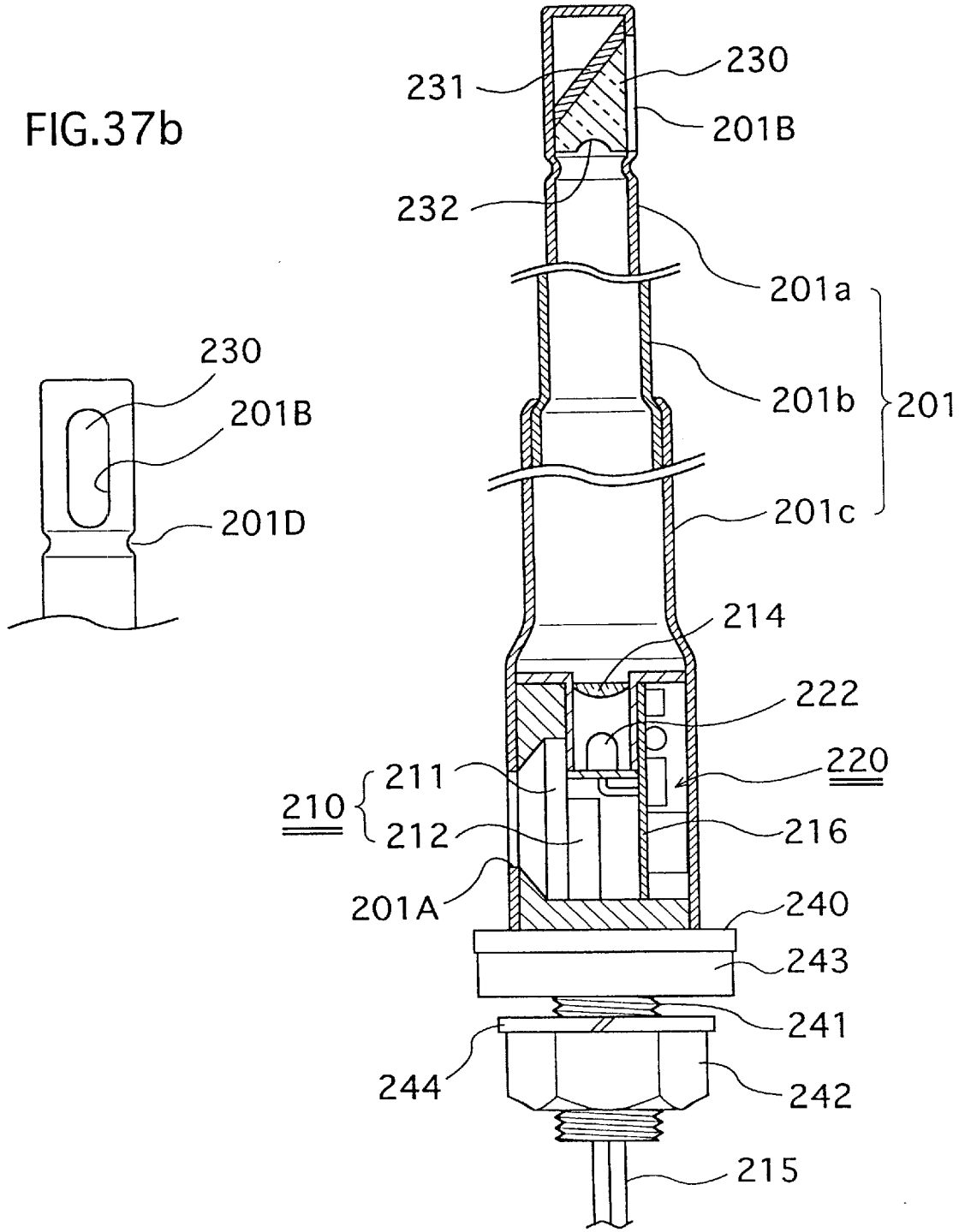

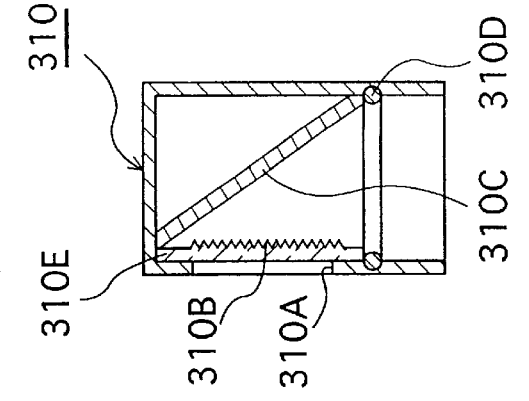
FIG.38d
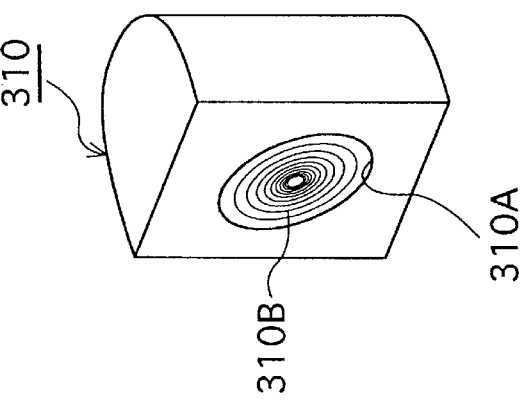
FIG.38c
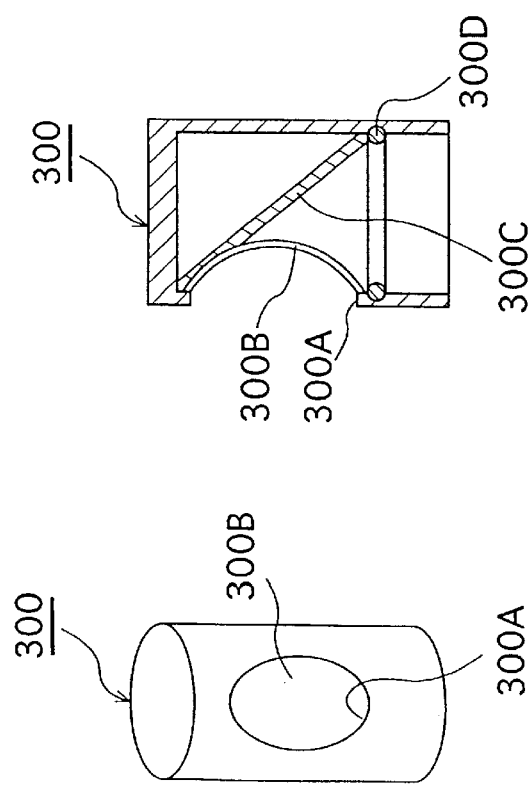
FIG.38b
FIG.38a

INFORMATION INDICATOR FOR VEHICLE

BACKGROUND OF THE INVENTION

1. Field of the Invention

This invention relates to an information indicator disposed at a fixed position of a vehicle body to transmit a variety of information to a driver. Particularly, the invention pertains to a vehicle corner indicator that is provided on a fender marker or a corner pole of a car to help the driver to discern the side position of the car, a warning indicator provided on an exterior mirror of the car to warn the driver of an approaching obstacle or the like, or a warning indicator fitted to a high mounted brake light or the like to warn the driver of an object approaching from behind the car. Moreover, the inventive device contains different colors of light emitting diodes (LEDs) and is able to emit a light of a desired color to impart different information to the driver based on the color of emitted light.

2. Description of the Related Art

Conventionally, a vehicle corner indicator, such as a fender marker or a corner pole, is attached near a leading end of a right or left fender of a car for the purpose of enabling a driver to detect a car body side or a clearance between the car body and an exterior object. Such a corner indicator has a main body made of a transparent or translucent resin and a light source, e.g., a small bulb, contained inside the main body. Otherwise, light from a lamp is supplied to the corner indicator via an optical fiber. At night, the corner indicator is illuminated by the light source, thereby helping the driver discern the correct position of the car body side or improve the visibility of the driver.

The conventional car corner indicator enables the driver to detect the side position of the car body, thereby improving his or her ability to estimate the clearance between the car and an object located beside the car. However, in a recent highly-developed information-oriented society, a variety of information transmitting functions tend to be requested for cars. Thus, it is desirable to add various functions to the car corner indicator. The position where the fender marker or corner pole is located is particularly readily observed by the driver who watches the front of the car while driving. It is useful if such a position is given various information transmitting functions.

It is known to provide a warning means, such as a warning lamp or the like, on an instrument panel or meter panel of the car for visually notifying the driver of troubles or abnormalities by light. However, the driver typically watches the front of the car through a windshield when driving the car forward and watches a back side, as well as the front of the car, when parking the car in a garage or the like. Accordingly, if the conventional warning lamp is lit, it is difficult for the driver to see such a warning as soon as possible. Therefore, it is more convenient if the fender marker or other parts of the car that are more easily seen as described above, is provided with a similar warning function to that of the conventional warning lamp.

Japanese Laid Open Patent Publication No. (Kokai) 7-169762 discloses an approach warning indicator. This technique relates to a car mounted sensor for detecting an approaching object and its accompanying device. The device includes a pyroelectric infrared sensor provided at a side of a rear view mirror of the car. It detects a human body on a motorbike or the like who is approaching from the right or left of the car or from behind the car, when he or she enters an infrared detecting zone, thereby sounding an alarm for the driver. Particularly, the device can notify and warn the driver of the presence of a rider on a motorbike, for example, that comes inside a blind spot of the vehicle, thereby assuring the safety of the rider of the motorbike.

This sensor and its accompanying device can auditorily inform the driver that a heat emitting body, such as the human body, is approaching from behind or stopping behind the car, thereby attracting the attention of the driver. However, it uses an infrared sensor for detecting the object, so that it cannot detect an object that does not emit heat. For example, it cannot detect an obstacle such as a gutter or a fence located at right or left side of a road. Moreover, the device auditorily draws attention of the driver by the alarm sound or the like, so that, when it is noisy around the car, it is difficult for the driver to recognize the sound. The driver frequently watches a rear side of the car through the rear view mirror during driving. Thus, if a structure is provided near the rear view mirror to give a visual information of the obstacle at the side of the car, the driver's attention will be drawn attention more efficiently and easily to acknowledge the obstacle.

In recent years, there has been proposed a device that has a distance sensor for measuring a distance between the car body and an object around it. It measures the distance to visually inform the driver of such distance, thereby improving his or her ability to sense the relative position of the car side. However, the driver may not notice the information if his or her attention is drawn by the surroundings when of parking, even if he or she is notified of the distance information when the distance becomes a fixed value.

A rear detecting and ranging system is known as a conventional abnormal approach warning indicator. The system informs the driver of an existence of an obstacle behind the car or a distance between the car and the obstacle, when backing the car for parking or the like. For example, if the distance between the car and the obstacle becomes a set value or less, the system sounds a predetermined alarm to draw the attention of the driver.

Such a system can auditorily give information of the obstacle behind the car to the driver when backing the car to attract his or her attention. However, it is possible that it is hard for the driver to hear the alarm sound due to noises around the car. Therefore, it is desirable to provide a means for warning the driver of the obstacle behind the car in place of or in addition to the auditory warning. The driver usually watches the rear of the car through a rear windshield when backing the car. Therefore, if the information about the obstacle behind the car is given visually where the driver is more likely to be looking during backing of the car, it is possible to draw the attention of the driver more efficiently and facilitate his or her notification of the obstacle.

SUMMARY OF THE INVENTION

It is a first object of the invention to provide an information indicator in a fender marker indicator which can be illuminated in a desired color and added with a variety of information transmitting functions, such as warning functions or the like.

It is a second object of the invention to provide an information indicator in a fender marker indicator which is combined with a detecting means, such as a sensor or the like, to give a visual warning to a driver or the like without requiring the driver to look away from the traveling direction of the vehicle.

It is a third object of the invention to provide an information indicator in a vehicle corner indicator which gives a visual warning to a driver or the like during parking or driving in a garage, without requiring the driver to look away from the surroundings of the vehicle, which are observed either directly through the vehicle windshield or a vehicle mirror.

It is a fourth object of the invention to provide an information indicator in an approach warning indicator which visually and effectively gives information about an obstacle at a side of a car to the driver or the like without requiring the driver to take his eyes off the road or the surroundings of the vehicle.

It is a fifth object of the invention to provide an information indicator in an abnormal approach warning indicator which gives the driver visual warning information by means of a corner pole when parking or the like so that the driver does not need to look away from the vehicle's surroundings to observe the visual warning.

It is a sixth object of the invention to provide an information indicator in an abnormal approach warning indicator which gives a visual warning about an obstacle behind a car to a driver or the like during parking without requiring the driver to look away from the vehicle surroundings or mirrors showing the vehicle surroundings.

According to the first preferred aspect of the invention, an information indicator comprises an LED; an indicator disposed at a predetermined position on a car and within a line of sight of a driver for providing the light emitted from the LED to the driver; and an emission control means or LED controller for operating the LED to transmit a prescribed information to the driver.

The indicator may be composed of a warning indicator provided on a fender marker, corner pole or external mirror, or a warning indicator provided on a high mounted brake light at the rear of the car.

According to the second preferred aspect of the invention, an information indicator comprises a light-transmitting main body provided on a fender marker near a front end of a right or left side of a car; a plurality of LEDs of different colors disposed inside the main body; and an emission control means or LED controller for controlling the LEDs in combination to illuminate the main body in one of a plurality of preset colors of light.

According to the third preferred aspect of the invention, an information indicator comprises a main body attached near a front end of a right or left side of a car; an LED disposed inside the main body; a distance sensor for measuring a distance between a car body and an object near the car body; and an LED controller for controlling the LED based on an output of the distance sensor.

The third aspect of the invention may be structured such that the main body is a corner pole attached near the front end of the car body; the distance sensor is disposed inside the corner pole; the LED is disposed inside the corner pole; while further comprising an indicator disposed at an end of the corner pole so as to receive the light from the LED and visibly provide the light to the driver.

The third aspect may be structured such that the main body is a corner pole attached near the front end of the car body; the distance sensor is disposed inside the corner pole; while further comprising an indicating portion disposed at an upper part of the corner pole and accommodating the LED so as to visibly provide the light from the LED to the driver; and a lead connecting the LED controller with the LED and capable of stretching and contracting in accordance with a change in length of the corner pole.

According to the fourth preferred aspect of the invention, an information indicator comprises a distance sensor disposed at a fixed position of a car which detects an object around the car and outputs a signal corresponding to a distance between the car and the object; a warning indicator disposed on an external mirror and having an LED capable of emitting light toward the car interior; and an emission control circuit for controlling the LED based on an output of the distance sensor.

The fourth variation of the invention may be structured such that the distance sensor is disposed on the outside mirror and detects a hollow at a fixed position on a ground surface in front of a front wheel as well as at the side of the front wheel, to output a signal corresponding to a depth of the hollow; and the warning indicator is disposed around a circumference of the external mirror.

According to a fifth preferred aspect of the invention, an information indicator comprises a distance sensor, attached near a rear end of a car body, for measuring a distance between the car body and an object behind the car body; an indicator, disposed near the rear end of the car body, having an LED capable of emitting light toward the car interior; and an emission control circuit for controlling the LED based on an output of the distance sensor.

The fifth aspect may be structured such that the indicator is disposed on a high mounted brake light disposed inside the car.

The fifth aspect may be structured such that the distance sensor is provided on each of the right and left sides of the rear end of the car body to be able to measure the distances between the car body and objects behind the car body at the right and left sides; the warning indicating means is provided on each of right and left sides of the high mounted brake light inside the car; and the LED controller independently controls the LEDs of the right and left warning indicating means according to outputs of the right and left distance sensors.

The fifth aspect may be structured such that the distance sensor is provided on each of the right and left and center parts of the rear end of the car body so as to be able to measure the distances between the car body and objects behind the car body at the right and left and center; the indicator is provided on each of right and left and center parts of the high mounted brake light inside the car; and the LED controller independently controls the LEDs of the right, left, and center indicators according to outputs of the right and left and center distance sensors.

The fifth aspect may be structured such that the indicator is a warning indicator having a case fixed on a predetermined position of a rear part of the vehicle cabin and the LED is accommodated inside the case.

The fifth aspect may be structured such that a reflector, such as a mirror surface of a rear-under mirror, attached to the upper end of the rear surface of the car body, and the mirror surface reflects the light toward the car interior.

Further objects and advantages of the invention will be apparent from the following description, reference being had to the accompanying drawings, wherein preferred embodiments of the invention are clearly shown.

BRIEF DESCRIPTION OF THE DRAWINGS

FIG. 11 is a sectional view illustrating the main parts of the fifth embodiment of the inventive vehicle corner indicator;

FIG. 12 is a block diagram showing circuitry used in each embodiment of the inventive vehicle corner indicator;

FIG. 27a, shows a case in which the car goes forward to approach a gutter in front of the car; FIG. 27b shows a case in which the car approaches a gutter at an angle; and FIG. 27c shows a case in which the car becomes nearly parallel to the gutter;

FIG. 37a, is a sectional view showing the fifteenth embodiment of the inventive abnormal approach warning indicator;

FIG. 37b is a partial front view of an upper part of the fifteenth embodiment of the inventive abnormal approach warning indicator;

FIG. 38a is a perspective view showing a first example of an indicating part used in the fifteenth embodiment of the inventive abnormal approach warning indicator;

FIG. 38b is a sectional view showing the first example of the indicating part used in the fifteenth embodiment of the inventive abnormal approach warning indicator;

FIG. 38c is a perspective view showing a second example of an indicating part used in the fifteenth embodiment of the inventive abnormal approach warning indicator;

FIG. 38d is a sectional view showing the second example of the indicating part used in the fifteenth embodiment of the inventive abnormal approach warning indicator;

DESCRIPTION OF PREFERRED EMBODIMENTS

Figure 1:
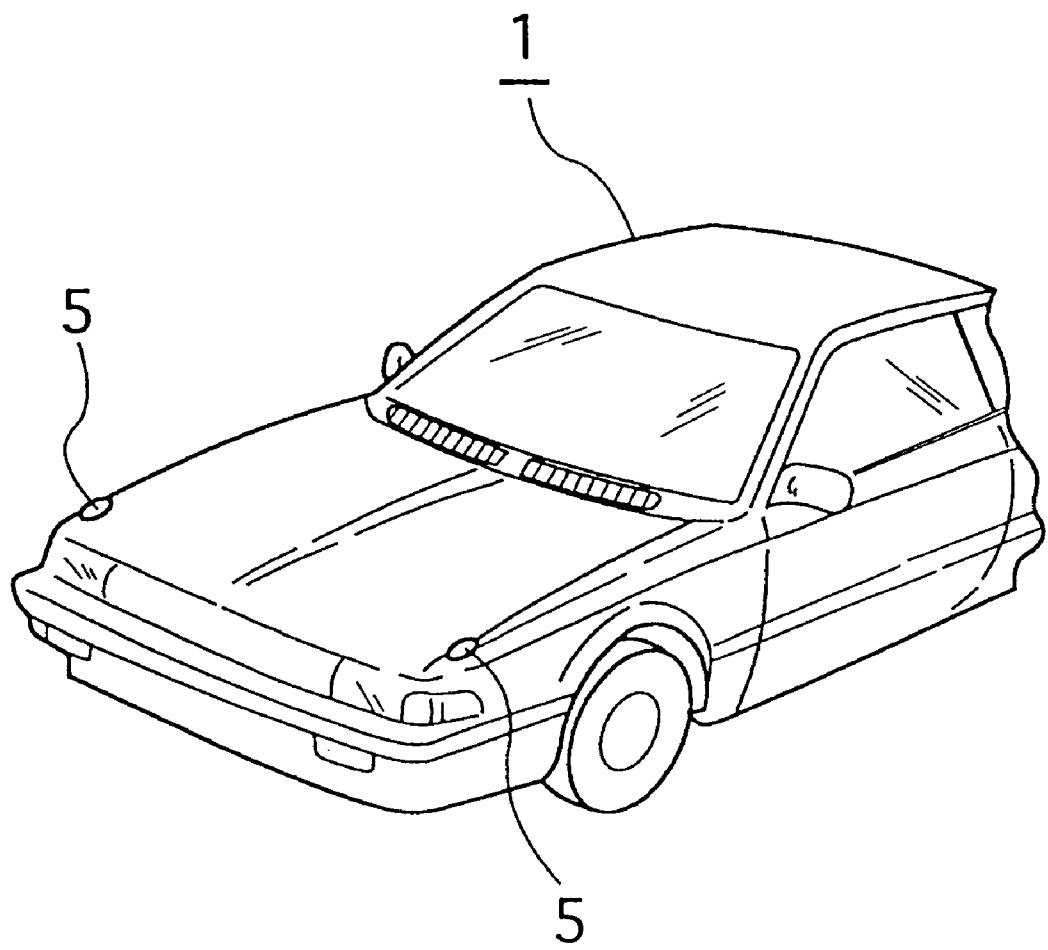
FIG. 1 is a perspective view showing a fender marker indicator mounted on a car according to the first to fourth embodiments of the information indicator of the invention.

Several embodiments of the invention are described hereafter, referring to the drawings. In each embodiment, the same or corresponding reference numerals or characters are attached to same or corresponding members or elements.

A first embodiment of the invention is described with reference to FIG. 1, which is a perspective view showing a fender marker indicator mounted on a car. FIG. 2 is a block diagram showing the circuitry used in each embodiment of the inventive fender marker indicator.

Figure 2:
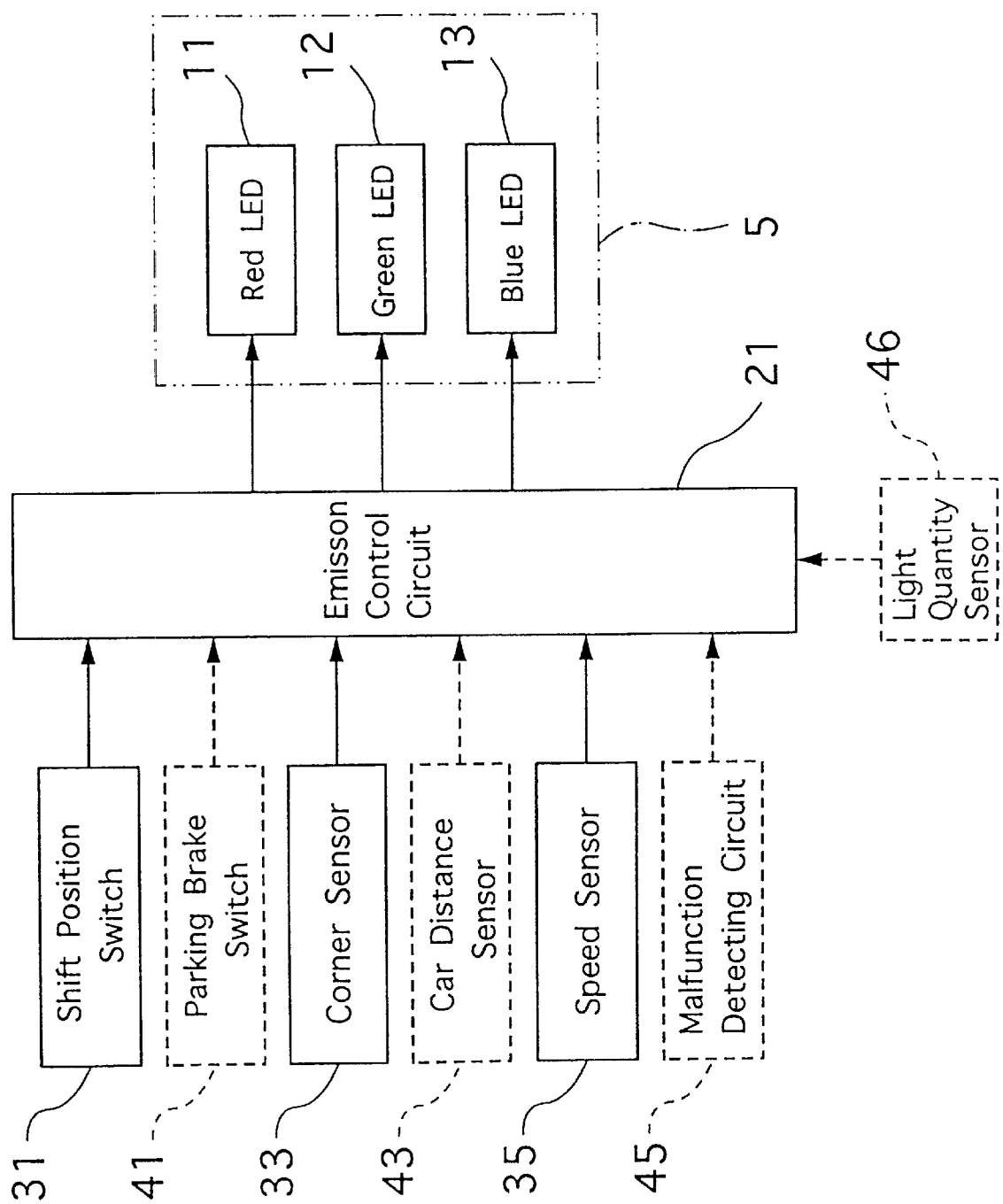
FIG. 2 is a block diagram showing circuitry used in each embodiment of the inventive fender marker indicator.

As shown in FIGS. 1 and 2, the present embodiment of fender marker indicator has a main body 5, LEDs 11, 12 and 13 and an emission control circuit or LED controller 21. The main body 5 itself is a conventional housing made of a transparent or translucent resin. The main bodies 5 are fixed on right and left fenders of a car body 1, respectively. Of course, the main body 5 may be modified in various ways as long as it has at least a transparent or translucent part facing the driver's seat. The LEDs 11, 12 and 13 are disposed inside the main body 5 and can emit light through the main body 5. As shown in FIG. 2, LEDs 11, 12 and 13 are composed of a red LED 11, a green LED 12 and a blue LED 13. The LED controller 21 is composed of CPU, ROM, RAM and so on, and its outputs are connected to the LEDs 11, 12 and 13. The LED controller 21 controls light emission of the different colors of LEDs 11, 12 and 13 by a duty control or the like, while selectively combining them. Thus, any desired color of light can be emitted therefrom and through the main body 5 to the outside, thereby illuminating the main body 5 in a desired color.

Moreover, the fender marker indicator of the present embodiment has a detector connected to its inputs. The state detecting means detects a prescribed warning state and inputs a predetermined signal corresponding thereto to the emission control means 21. If the state detecting means inputs a signal, the control means 21 or LED controller controls and lights the LEDs 11, 12, and 13 in a predefined color, thereby illuminating the main body in the predefined color for warning the driver.

The detector includes sensors detecting a variety of warning states of which the driver should be notified. In this embodiment, a plurality of detector are connected to the LED controller 21 so that the LED controller 21 selectively receives signals from the detector depending on a car speed.

The LED controller 21 drives the LEDs 11, 12, and 13 to display one of the predefined colors according to a warning state corresponding to the input signal, thereby illuminating the main body 5 in a color selected from among the predefined colors. As shown by the solid line in FIG. 2, the detector includes a shift position switch 31, a corner sensor 33 and a speed sensor 35. Detection signals therefrom are selectively input to the LED controller 21 according to the car speed, by a program shown in FIG. 3.

Operation of the present embodiment of a fender marker indicator is described hereafter.

Figure 3:
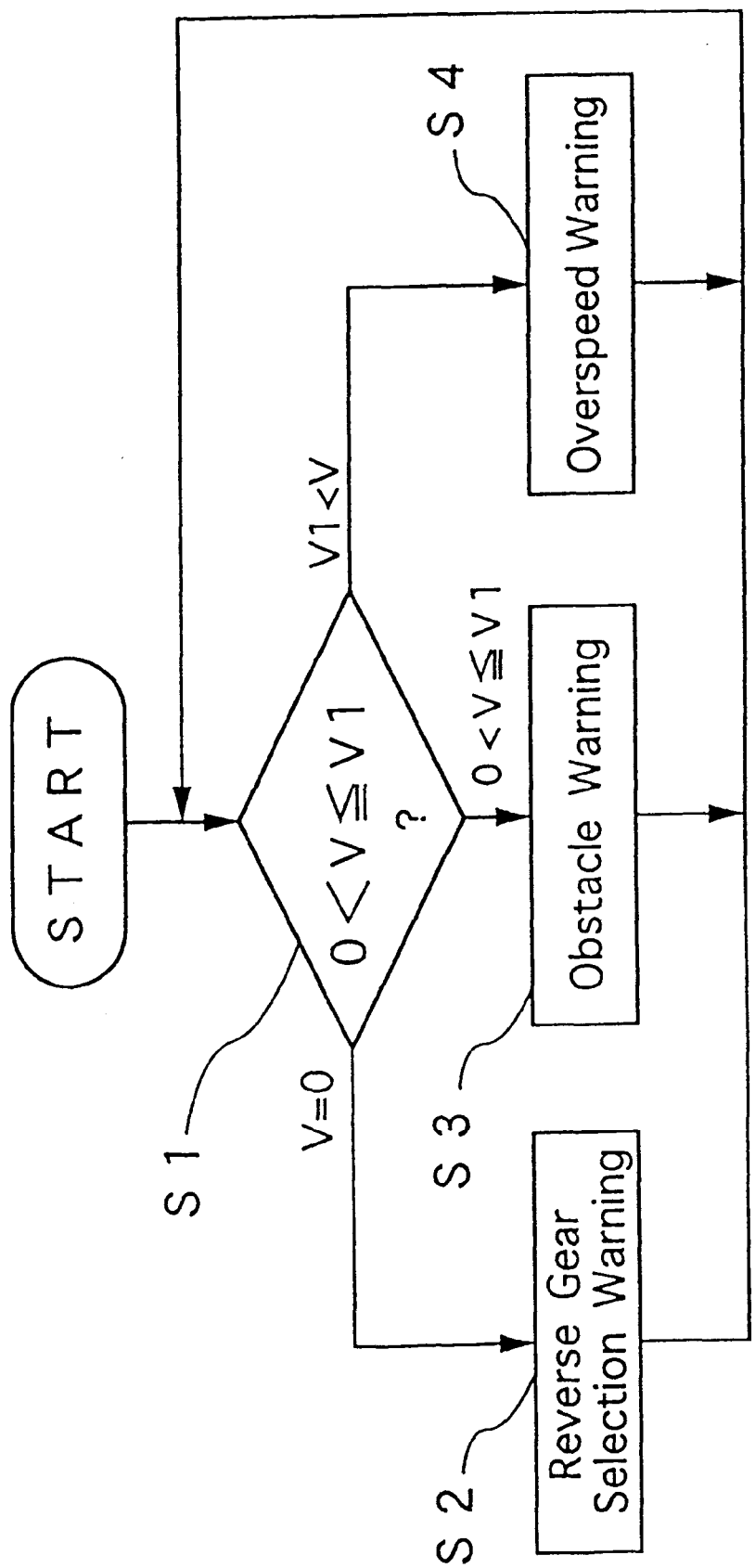
FIG. 3 is a flowchart showing an overall operation of a first embodiment of the fender marker indicator of the invention.
Figure 4:
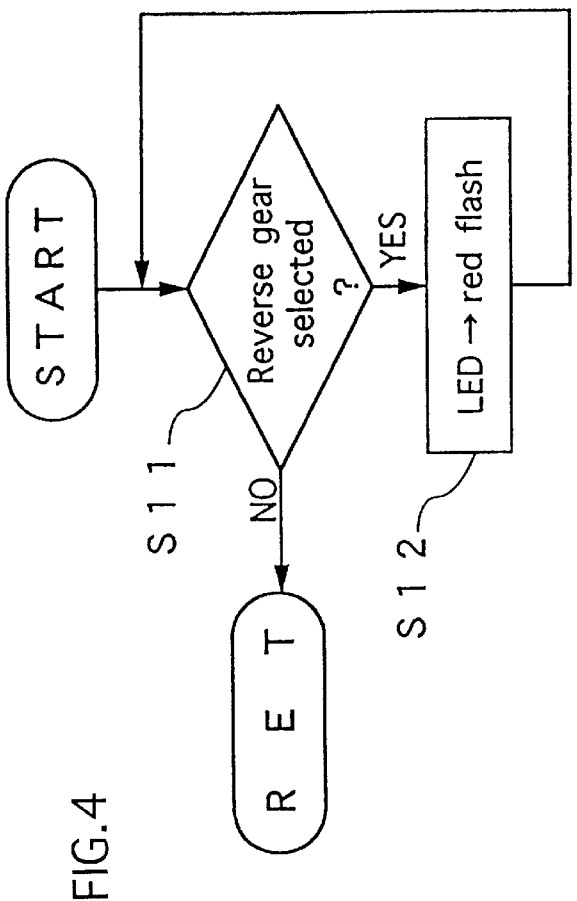
FIG. 4 is a flowchart showing a warning operation at the time of selecting a reverse gear according to the first embodiment of the inventive fender marker indicator.
Figure 5:
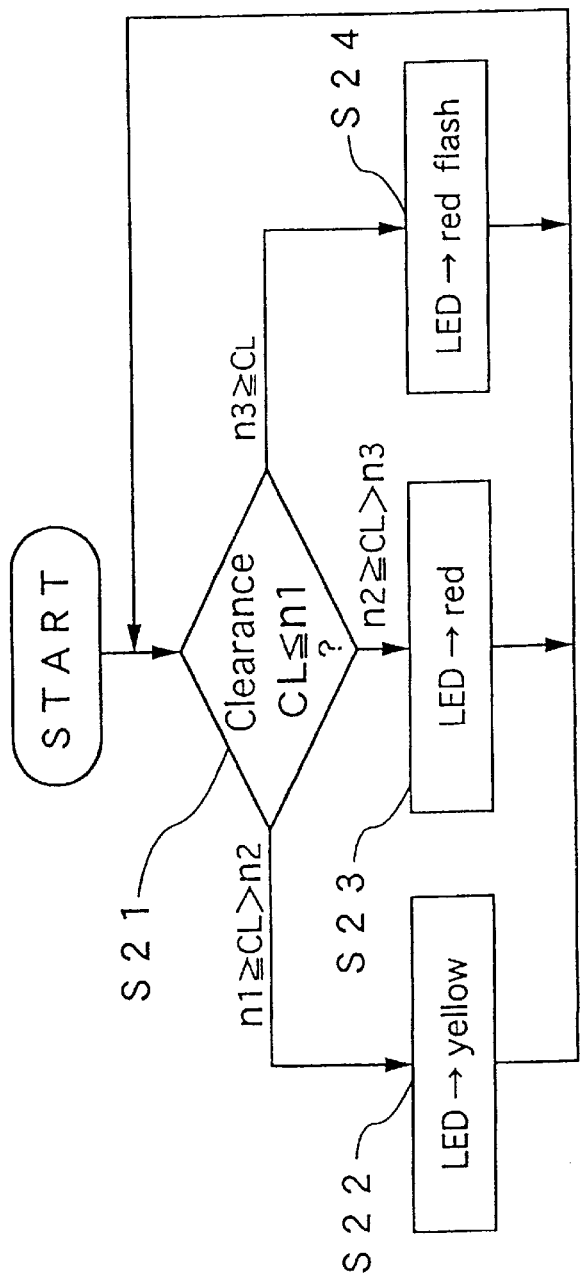
FIG. 5 is a flowchart showing a warning operation at the time of detecting an obstacle according to the first embodiment of the inventive fender marker indicator.
Figure 6:
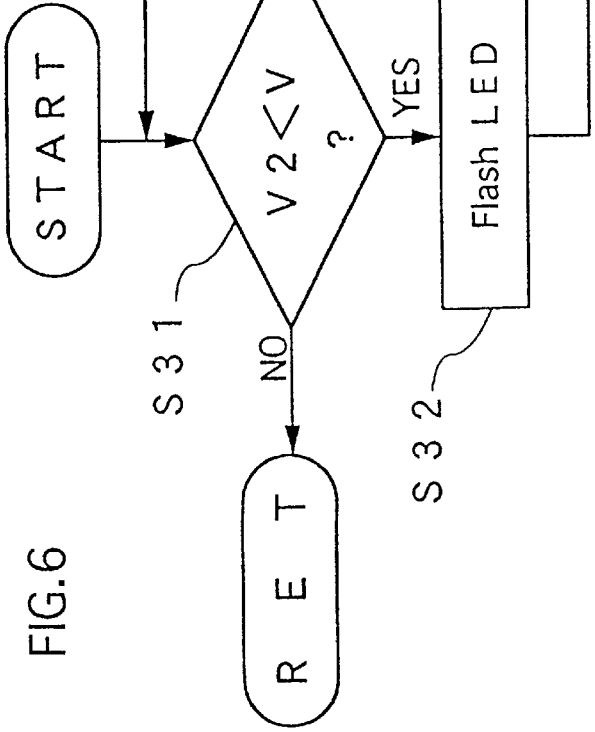
FIG. 6 is a flowchart showing a warning operation at the time when the vehicle speed exceeds a threshold value according to the first embodiment of the inventive fender marker indicator.

FIG. 3 is a flowchart showing an overall operation of a first embodiment of the fender marker indicator of the invention. FIGS. 4 to 6 show each warning operation in the overall operation of FIG. 3. FIG. 4 is a flowchart showing a warning operation at the time of selecting a reverse gear in the first embodiment of the inventive fender marker indicator. FIG. 5 is a flowchart showing a warning operation at the time of detecting an obstacle in the first embodiment of the inventive fender marker indicator. FIG. 6 is a flowchart showing a warning operation when the vehicle speed exceeds a threshold value in the first embodiment of the inventive fender marker indicator.

First, describing the overall operation of FIG. 3, the LED controller 21 decides if a car speed V computed by a car speed computing circuit (not shown) is zero or exceeds a set speed V1 in step S1. If the car is stopped (V=0), execution proceeds to step S2, and the LED controller 21 receives the signal from the shift position switch 31, thereby executing the warning operation at the time of selecting the reverse gear, as shown in FIG. 4. If the car is running at the set speed V1 or less (0<V≦V1), execution proceeds to step S3, and the LED controller receives the signal from the corner sensor 33, thereby executing the warning operation of the obstacle at the side of the car body, as shown in FIG. 5. If the car is running at a speed more than the set speed V1, execution proceeds to step S4, and the LED controller 21 receives the signal from the speed sensor 35, thereby executing the warning operation at the time of exceeding the speed limit, as shown in FIG. 6. The signal from the speed sensor 35 is always input in the LED controller 21 for car speed computing by the car speed computing means. If the execution proceeds to step S4, such signal is supplied for the speeding warning operation of FIG. 6.

Then, in the case of execution of the warning operation for the reverse gear selection after proceeding to the step S2 of FIG. 3, the LED controller 21 decides if the reverse gear is selected based on the signal from the shift position switch 31 in step S11. If the reverse gear is selected, the LED controller 21 controls the LEDs 11, 12, and 13 to emit flashes of red color light. Thus, the red light passes through the main body 5, illuminating the main body 5 for warning the driver via a flashing red light. As a result, when the reverse gear is selected at the time of parking, for example, the fender marker flashes red to draw the attention of the driver or the like and notify the driver that the shift position is in the reverse gear.

In the case of execution of the warning operation for warning the driver of an obstacle at the side of the car after proceeding to step S3 of FIG. 3, the LED controller 21 decides whether or not a clearance CL between the car body 1 and the obstacle beside the car body 1 is one of three set values (n1, n2, n3) or less, in step S21, where n1>n2>n3. If the clearance CL is not more than the first set value n1, but more than the second set value n2, the LED controller 21 controls the LEDs 11, 12, and 13 to emit a yellow light in step S22. Thus, the light from the LEDs 11, 12, and 13 passes through the main body 5, thereby continuously illuminating the main body 5 in yellow. If the clearance CL is not more than the second set value n2 but exceeds the third set value n3, the control circuit 21 controls the LEDs 11, 12, and 13 to emit a red light in step S23. Thus, the light passes through the main body 5, thereby continuously illuminating the main body 5 in red. If the clearance CL is the third set value n3 or less, the control circuit 21 controls the LEDs 11, 12, and 13 to emit flashes of red light in step S24. Thus, the flashes of light pass through the main body 5, thereby illuminating the main body 5 to warn the driver. As a result, if the clearance CL becomes the set value or less and the driver or the like is required to pay attention to avoid contact with the obstacle when turning and the like, the fender marker indicator is illuminated step by step in the continuous yellow light, continuous red light and flashes of red light. Then, the driver is visually notified that the clearance CL is small without requiring the driver to look away from the vehicle's surroundings. It is to be understood that one or both of the main bodies 5 on the side of the car where the obstacle is located can be illuminated for warning the driver.

In the case of execution of the warning operation for exceeding a threshold speed shown in FIG. 6 after proceeding to step S4 of FIG. 3, the LED controller 21 decides if the current car speed V exceeds the speed limit V2 based on the signal from the speed sensor 35 in step S31. If the car speed V exceeds the threshold limit V2, the LED controller 21 controls the LEDs 11, 12, and 13 to emit flashes of a fixed color light. Thus, the flashes of light pass through the main body 5 and illuminate to warn the driver of the excessive speed by flashing the fixed color of light. As a result, when the car speed V becomes more than the threshold speed limit V2, the fender marker indicator is lit by flashes of the fixed color light, e.g. red, thereby visually attracting the attention of the driver or the like and notifying him of the need to slowdown. The flashing color of the LEDs 11, 12, and 13 may be any desired color. It may be flashes of a color other than red in order for the user to easily distinguish the warning operation for speeding from the warning operation for the obstacle. Otherwise, it may be a reddish color that is easy to draw the attention of the driver.

Here, the reverse gear selecting operation is usually done when the car is stopped, so that the warning operation for the reverse gear selection is carried out when the car speed V=0 in step S2, in this embodiment. Moreover, it is desirable to warn the user of the obstacle beside the car body 1 to prevent contact or collision therewith in step S3 when the car is driven at a relatively low speed, e.g., at the time of turning. Then, the set speed V1 is preferably less than the normal car speed or the speed limit V2 of a common road in a certain degree. Thereby, the difference between the speed zone (0<V≦V1) for the obstacle warning and the speed limit V2 for the speeding warning becomes as large as possible, so that it is easy to distinguish these two warning operations.

In this embodiment, while the clearance CL is set in three values, it may be a single set value so that the LEDs 11, 12, and 13 are lit or flashed in a single color for warning or it may include more set values for more detailed warnings. Moreover, the speed limit V2, which is set beforehand for the speeding warning, may be another speed such as a speed limit at a typical road, e.g., 100 km/h, of an expressway, while using a speed detecting circuit for operating a conventional warning buzzer in order to work the inventive device. It may be a normal car speed on the common road, e.g., 40 km/h, 50 km/h or 60 km/h, while the speed detection is performed in the inventive speeding warning separately from the conventional warning by a buzzer. While, in the above embodiment, the speeding warning is performed depending on the single speed limit V2, a plurality of threshold speed limits may be set beforehand. Then, the LEDs 11, 12, and 13 may be lit in different colors or may be controlled to emit a continuous light or flashes of light, according to the set threshold speed limits, respectively. Thus, several speeding warnings are possible.

In the above embodiment, the LED controller 21 controls the different colors of LEDs 11, 12 and 13 by the duty control or the like while selectively combining them, so that selected colors composed of the inherent colors of the LEDs 11, 12, and 13 themselves and mixed colors thereof can be obtained. The desired color of light emitted from the LEDs 11, 12, and 13 is radiated from the main body 5 and seen by the driver or the like at the fender located at the front part of the car body 1.

As a result, the fender marker indicator can be illuminated in a desired color by appropriately controlling the light emission of the LEDs 11, 12, and 13. Thus, the fender marker indicator can display warnings based on the desired color of light, in addition to its normal function. Accordingly, the fender marker can rapidly and surely give the driver or the like visual warnings when combined with the detector.

Moreover, the LED controller 21 selectively receives the signals from a multiple of state detectors 31, 33 and 35, and controls the LEDs 11, 12, and 13 to selectively emit predetermined colors according to the warning corresponding to the input signal. Then, the main body 5 is illuminated in the warning color to visually notify the driver or the like of the warning. Namely, at the time of selecting the reverse gear in the stopped state (V=0), the fender marker indicator is illuminated by flashes of red light for warning. If the clearance CL between the car body 1 and the obstacle beside it becomes the set value n1, n2, n3 or less when the car speed V is not more than the set speed V1 (0<V≦V1), namely when the clearance is too small, the fender marker indicator is illuminated for warning by yellow light, continuous red light and flashes of red light in order. When the car speed V exceeds the speed limit V2 (V2<V), the fender marker indicator is illuminated in a fixed color for warning. Accordingly, in these cases, the driver or the like can be given corresponding visual warnings immediately and without fail to draw the driver's attention thereto because the fender marker indicator is provided in the driver's line of sight, the driver need not look away from the front of the vehicle, which is the direction the vehicle is traveling to observe and be warned by the warning indicator. Moreover, the indicator can perform a plurality of warning functions to transmit a variety of information to the user.

A second embodiment of the invention is described below with reference to FIGS. 2 and 3. While the first embodiment connects the shift position switch 31, corner sensor 33 and speed sensor 35 to the control circuit 21 to carry out different warning operations according to the car speed V, the following embodiments use other state detectors to carry out a single warning operation by the detector.

Figure 7:
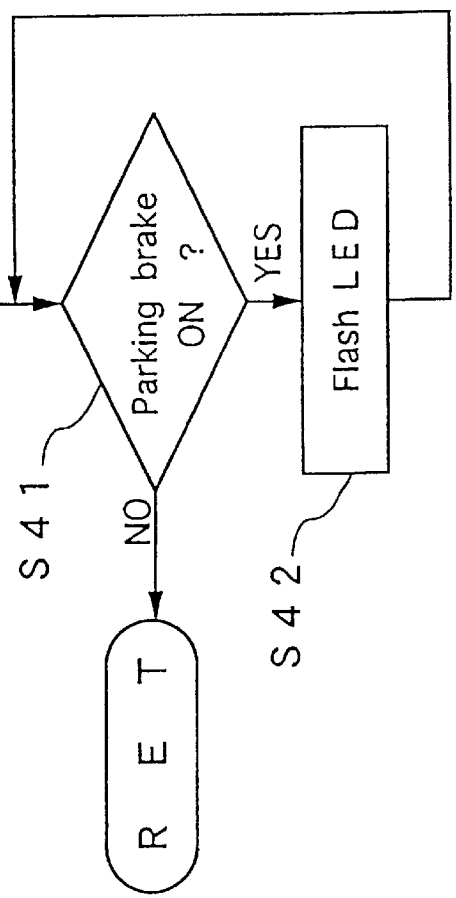
FIG. 7 is a flowchart showing a warning operation at the time of operating a parking brake according to a second embodiment of the inventive fender marker indicator.

FIG. 7 is a flowchart showing a warning operation at the time of operating a parking brake in a second embodiment of the inventive fender marker indicator.

The second embodiment of fender marker indicator connects a parking brake switch 41 as the detector, to the LED controller 21. The parking brake switch 41 detects if a parking brake is in use or not. If a signal showing an in use state of the parking brake is input from the parking brake switch 41 to the control circuit or LED controller 21, the LED controller 21 controls the LEDs 11, 12, and 13 to emit a fixed color of light, thereby illuminating the main body 5 in that color to warn the driver that the parking brake is in use. Namely, as shown in FIG. 7, the control circuit 21 decides if the parking brake is on or off based on the signal from the parking brake switch 41 in step S41. If the parking brake is in use, the LED controller 21 controls the LEDs 11, 12, and 13 to emit flashes of a fixed color of light in step S42. The flashing color may be any desired color as is the case with the speeding warning operation of the first embodiment. Thus, the light from the LEDs 11, 12, and 13 transmits through the main body 5 and illuminates it by a fixed color that flashes. As a result, when the parking brake is on, the fender marker indicator flashes to draw the visual attention of the user and notify him or her of the warning without requiring the driver to look away from the vehicle's surrounding, such as at the vehicle dashboard, during operation of the vehicle.

Figure 8:
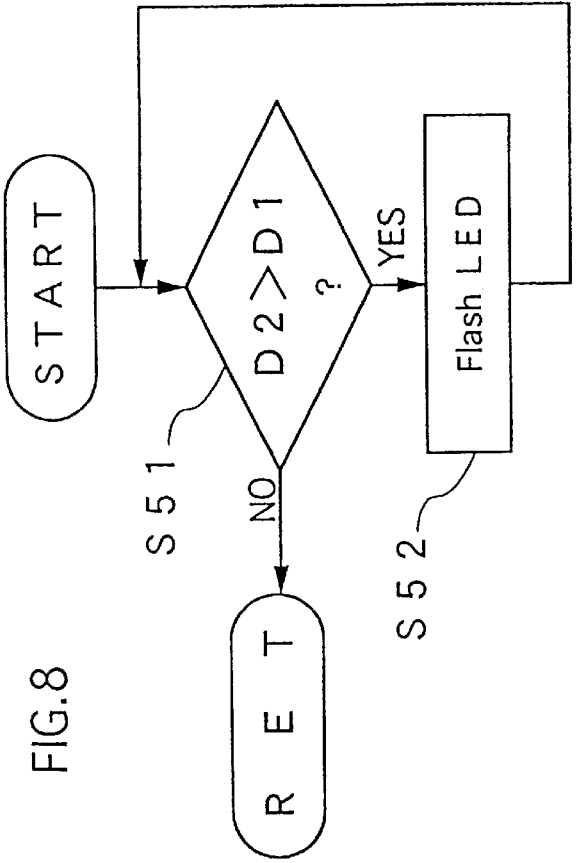
FIG. 8 is a flowchart showing a car distance warning operation according to a third embodiment of the inventive fender marker indicator.

FIG. 8 is a flowchart showing a car distance warning operation in a third embodiment of the inventive fender marker indicator.

A third embodiment of a fender marker indicator connects a car distance sensor 43 for detecting a distance between cars as the state detector to the LED controller 21. If a signal showing that a car distance D1 becomes less than a fixed value D2 is input from the car distance sensor 43, the LED controller 21 controls the LEDs 11, 12, and 13 to emit a fixed color of light, thereby illuminating the main body 5 in that fixed color for warning the driver of the proximity of the other car. Namely, as shown in FIG. 8, the LED controller 21 decides if the current car distance D1 is less than the preset fixed value D2 or not on the basis of the input signal from the car distance sensor 43 in step S51. If the car distance D1 becomes less than the fixed value D2, the LED controller 21 controls the LEDs 11, 12, and 13 to emit flashes of a fixed color of light in step S52. The flashing color may be any color as with the speeding warning operation of the first embodiment. Thus, the light from the LEDs 11, 12, and 13 passes through the main body 5 and illuminates it in a selected color for warning the driver. As a result, when the car distance D1 becomes less than the fixed value D2 and therefore too small, the fender marker indicator flashes to visually draw the attention of the user and notify him or her of the warning. The fixed value D2 of car distance is set by computing the most suitable car distance for safety based on the car distance and the car speed. Thus, the driver can be given a warning at an optimal car distance according to the car speed without looking away from the surroundings of the vehicle, e.g., while observing the vehicle moving direction through the vehicle's front windshield.

Figure 9:
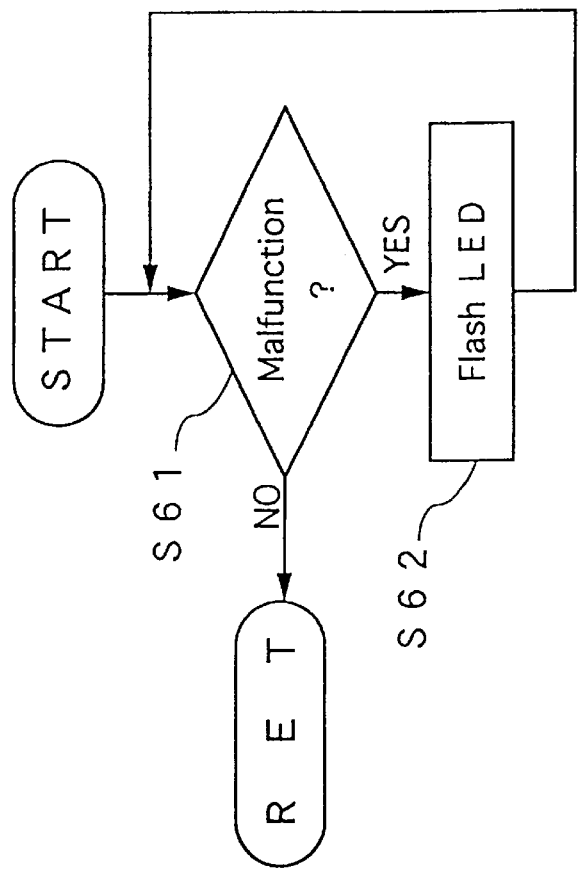
FIG. 9 is a flowchart showing a warning operation at the time of an abnormal condition according to a fourth embodiment of the inventive fender marker indicator.

FIG. 9 is a flowchart showing a warning operation upon detecting an abnormal condition of the car in a fourth embodiment of the inventive fender marker indicator.

The fourth embodiment of fender marker indicator connects a malfunction detecting circuit 45 for detecting an abnormality of the car as the state detector to the LED controller 21. If a signal indicative of an abnormality or trouble is input from the malfunction detecting circuit 45, the LED controller 21 controls the LEDs 11, 12, and 13 to emit a fixed color of light, thereby illuminating the main body 5 in that fixed color for warning the driver of the malfunction. Namely, as shown in FIG. 9, the control circuit 21 decides if there is any trouble or abnormality in the car based on the input signal from the malfunction circuit 45 in step S61. If a malfunction takes place in the car, the LED controller 21 controls the LEDs 11, 12, and 13 to emit flashes of a fixed color of light in step S62. The flashing color may be any color as with the speeding warning operation of the first embodiment. Thus, the light from the LED 11, 12, 13 passes through the main body 5 and illuminates it in that color for warning the driver of the malfunction. As a result, when a predefined malfunction to be detected arises in the car, the fender marker indicator is flashed to visually draw the attention of the user and notify him or her of the warning. It is to be understood that different colors of light may be emitted from main body 5 depending on the type of malfunction detected.

In each of the first to fourth embodiments, a light quantity sensor 46 may be connected to the control circuit 21 so that the LED controller 21 sets the color of the LEDs 11, 12, and 13 to a bluish color when a quantity of light inside the car is not more than a predetermined value, while setting the color to a reddish color when the light quantity is more than that value. Namely, when the current light quantity exceeds a predefined fixed value during the daytime or the like, the LED controller 21 controls the LEDs 11, 12, and 13 to emit the reddish color light, e.g. by lighting the red LED 11 alone, thereby illuminating the main body 5 in that color. On the other hand, when the current light quantity is not more than the predefined fixed value at the nighttime or in a tunnel or the like, the LED controller 21 controls the LEDs 11, 12, and 13 to emit the bluish color light, e.g., by lighting the blue LED 13 alone, thereby illuminating the main body 5 in that color.

The predefined fixed light quantity is set at a value nearly equivalent to a medium value between the light quantity at the daytime and the light quantity at the nighttime on the basis of the visibility curve by the well-known Prukinje effect, e.g., a value equivalent to the light quantity at the evening time or the like. The light quantity is preferably detected at the outside of the car in view of the purpose of this modification that aims to improve the visibility of the fender marker which is also located outside of the car.

If the above structure is added, the illumination color of the fender marker indicator is automatically set in the bluish or reddish color according to the difference of the light quantity during the daytime or nighttime or the like. Namely, when the light quantity is small as is the case during the nighttime or in the tunnel or the like, the fender marker indicator is illuminated in the bluish color that is thought to be a color easy to see according to the Prukinje effect. On the other hand, when the light quantity is large as is the case during the daytime or the like, the fender marker indicator is illuminated in the reddish color that is thought to be a color easy to see according to the Prukinje effect. As a result, the illumination color of the fender marker indicator can be set in a suitable color according to the external light quantity. Thus, the driver can clearly see the fender marker indicator at any time regardless of the change of the light quantity.

While each of the first to fourth embodiments is used to provide a warning, it may also be used in a navigation system. For example, it may be used to inform the user that the car is nearing a destination. Namely, each embodiment may be modified in various ways as long as it has the main body 5 of light transmitting resin attached to the fender of the car body 1, multiple LEDs 11, 12 and 13 of different colors arranged inside the main body 5 to emit light through the main body 5, and the LED controller 21 for controlling the LEDs 11, 12, and 13 by selectively combining them to illuminate the main body 5 in a desired color. With such a structure, the LED controller 21 controls, by selectively combining, the different colors of LEDs 11, 12, and 13 by the duty control or the like, so that they emit their own colors and any desired color by mixing their own colors. The selected color of light radiated from LEDs 11, 12, and 13 emerges from the main body 5 and is seen by the user facing the front of the car body 1 without having to take his eyes off the road to look at the dashboard, for example. As a result, the fender marker indicator can be illuminated in a desired color by appropriately controlling the LEDs 11, 12, and 13. Therefore, if each of the colors is given a predefined meaning, the colors can be used for a variety of objects and the fender marker indicator is provided with various information transmitting functions.

The detector may include sensors other than those described above, as long as it is a sensor for detecting a warning state that should be noticed by the driver while operating the vehicle without taking his eyes off from the vehicle's surroundings. Moreover, it may use a single sensor without combining a plurality of sensors as discussed above. The sensors may be integrally assembled inside the main body 5 together with the LEDs 11, 12, and 13 or be provided separately from the main body 5.

While each of the above embodiments has three colors of LEDs, i.e., red, green and blue, the LED may be composed in another way, as long as it is structured to emit a plurality of colors of light necessary for giving warnings or the like. For example, it may include two of the above three colors. In this case, similar results can be obtained though the colors are limited as compared with the above. However, if three colors of LEDs 11, 12 and 13, e.g., red, blue and green, are used, any desired color can be generated, so that the indicator can be applied in more fields.

Moreover, while the first embodiment connects the shift position switch 31, corner sensor 33 and speed sensor 35 to the LED controller 21 to make various warning operations according to the car speed V, one of these sensors may be used to perform a single warning operation. Multiple state detecting means of the second to fourth embodiments may be used to selectively perform multiple warning operations according to a prescribed condition, such as the car speed.

The main body 5 can be structured to indicate one specific warning of each of the first to fourth embodiments, or used in common to indicate multiple warnings.

Figure 10:
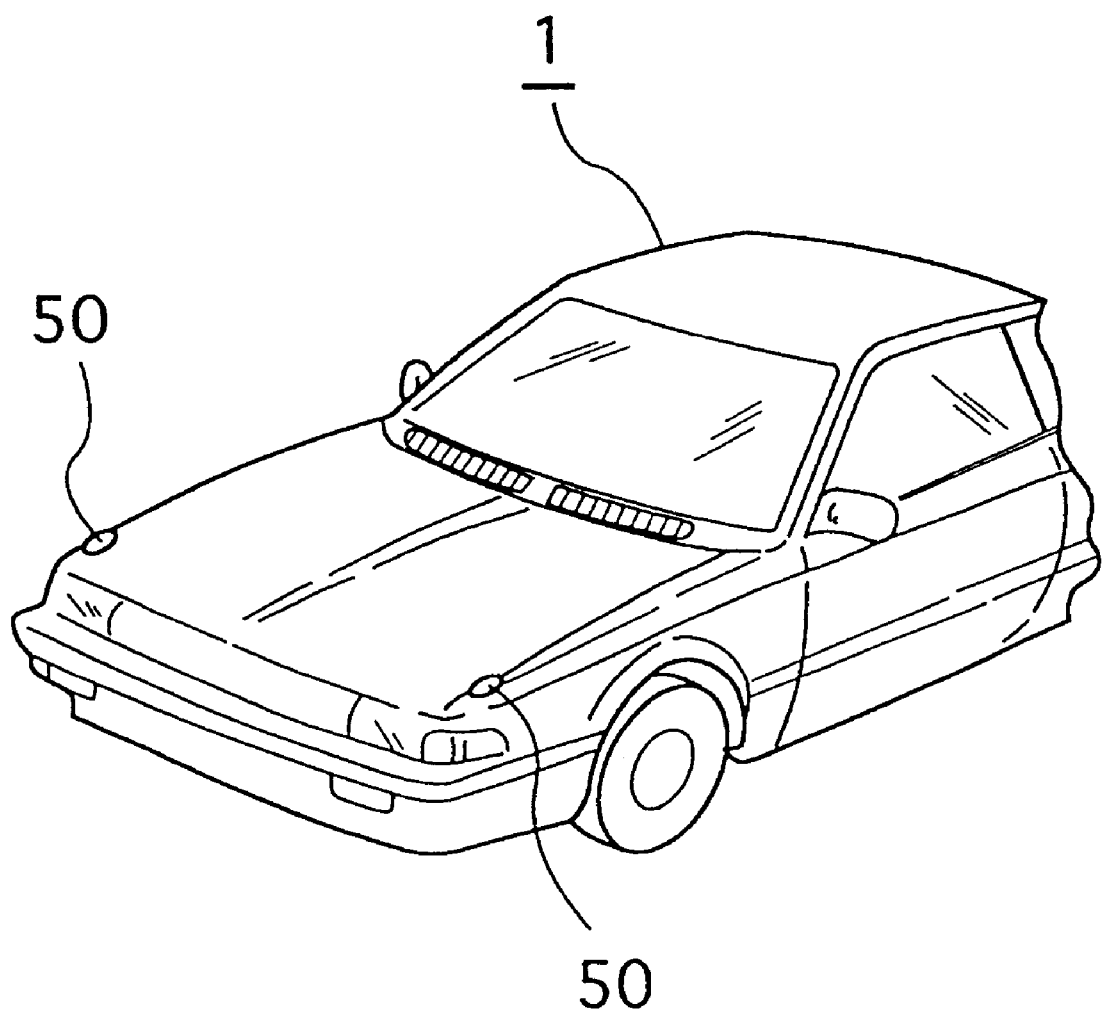
FIG. 10 is a perspective view showing a vehicle corner indicator mounted on a car as a fifth embodiment of information indicator of the invention.

A fifth embodiment of the invention is described below with reference to FIGS. 10–13. FIG. 10 is a perspective view showing a vehicle corner indicator mounted on a car according to a fifth embodiment of information indicator of the invention. FIG. 11 is a sectional view of the main parts of the fifth embodiment of the inventive vehicle corner indicator. FIG. 12 is a block diagram showing a circuitry used in each embodiment of the inventive vehicle corner indicator.

As shown in FIGS. 10–12, the present embodiment of vehicle corner indicator is composed of a main body 50, a distance sensor 61, an LED 62 and an LED controller 60. The main body 50 has a lens 51 made of a transparent or translucent resin, a housing 52 formed in a mouse shape by a metal plate, a thread 55, a nut 56 and an interposed plate 57. The thread 55 is joined to a bottom of the housing 52 and inserted into a panel of the car body 1. The nut 56 is engaged with the thread 55 from downward to secure the housing 52 or the corner indicator on the car body 1. The interposed plate 57 is disposed between the lens 51 and housing 52 and the car body 1. The interposed plate 57 is made of a rubber or the like so as to keep the corner indicator and the car body 1 connected stably while preventing damages thereto. The housing 52 accommodates a printed circuit board 53 having the LED controller 60, other circuits, the LED 62, an ultrasonic vibrator 54 and its control circuit mounted thereon. The LED 62 is composed of red LED 62R, green LED 62G and blue LED 62B in the form of chips or the like, thereby to generate three primary colors of light.

While the illustrated embodiment has three primary colors of LEDs as the LED 62, the LED 62 may be made of one or two colors of the three LEDs 62R, 62G and 62B.

The printed circuit board 53 has one surface on which is mounted the LED 62, the LED controller 60 for controlling the LED 62, the control circuit for driving and controlling the ultrasonic vibrator 54 and other control circuits. The printed circuit board 53 has another surface to which is attached the ultrasonic vibrator 54 alone. The distance sensor 61 is composed of the ultrasonic vibrator 54 and a circuit necessary for transmitting and receiving ultrasonic waves through the ultrasonic vibrator 54. The ultrasonic vibrator 54 is inserted in a circular hole formed on the housing 52 in an airtight manner. The printed circuit board 53 fits in a center part between the lens 51 and the housing 52. The control circuit 60 is structure by one chip microcomputer and has CPU, ROM, RAM, etc. The LED 62 is connected to the output of the LED controller 60. The LED 62 is controlled by the LED controller 60 so that the different colors of LEDs 62R, 62G and 62B are selectively combined by the duty control or the like, thereby emitting a desired color of light. Such color of light is radiated outside through the main body 50, thereby illuminating the main body 50 continuously in that color or by flashes of that color. The LED 62 is used to operate in response to a signal other than the output from the distance sensor 61.

The present embodiment of corner indicator connects the distance sensor 61 to an input of the LED controller 60. The sensor 61 detects a distance between the car body 1 and an obstacle at the side of the car body 1 so that the LED controller 60 controls the LED 62 to emit a fixed color of light for warning. The distance sensor 61 is made of an ultrasonic or optical sensor for measuring the distance between the car and the obstacle when parking or the like, that should be recognized by the driver. In this embodiment, four corner indicators are provided near each of the four corners of the car, though FIG. 10 only shows the indicators fixed at two front corners, so that each distance sensor 61 is connected to each LED controller 60. Then, when the car speed is a predetermined value or less, e.g., not more than 10 km/h, the LED controller 60 is activated, and the signal from the distance sensor 61 is input therein. The LED controller 60 controls the LED 62 to provide a warning in accordance with a warning state corresponding to the input signal. Though not show, the output of a vehicle speed sensor shows that the car speed is 10 km/h or less so that a power is supplied to the control circuit 60 in this embodiment.

The lens 51 has an inserting groove 51a for the printed circuit board 53 and a fitting hole 51b for the LED 62. Particularly, a surface of the fitting hole 51b in the lens 51 is roughened by grinding or cutting.

The main bodies 50 are secured, respectively, on the fenders located at the right and left front sides of the car body 1, as shown in FIG. 10. The main bodies 50 are secured, respectively, on the right and left rear sides, not shown, of the car body 1, too. While the main bodies 50 are disposed at the four corners of the car body 1 as mentioned above, they may be disposed at two corners at the front end or the rear end.

An operation of the vehicle corner indicator is described hereafter.

Figure 13:
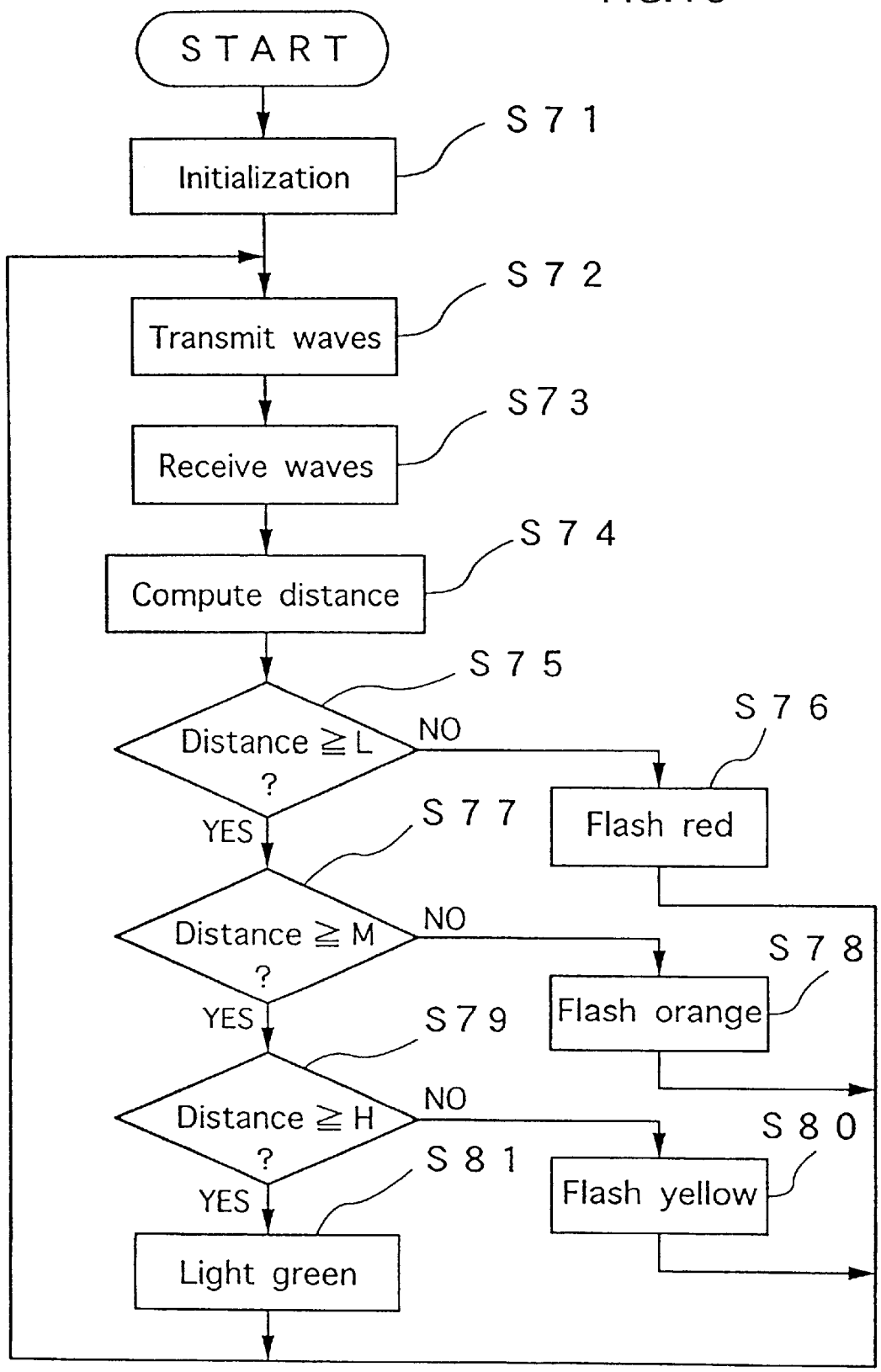
FIG. 13 is a flowchart showing an overall operation of the fifth embodiment of the inventive vehicle corner indicator.

FIG. 13 is a flowchart showing an overall operation of the fifth embodiment of the inventive vehicle corner indicator.

In this embodiment, the LED controller 60 is supplied with power when the speed sensor outputs a signal showing the car speed is at or below 10 km/h, and the following program is executed.

If the current velocity becomes 10 km/h or less and the power is supplied to the distance sensor 61, LED 62, LED controller 60 and so on, initialization is carried out in step S71. Then, ultrasonic waves are transmitted for a predetermined period of time, i.e., a few microseconds or less, in step S72. Reflected waves of the transmitted ultrasonic waves are detected after a fixed period of time in step S73. Thereafter, in step S74, a distance is computed on the basis of a delay in receiving the ultrasonic waves, which were transmitted and received in the previous steps. In step S75, it is decided if the computed distance is not less than a predetermined smallest distance threshold L or not. If it is decided that the distance is less than the smallest threshold L, the red LED 62R is operated to emit flashes of red light in step S76. If it is determined that the computed distance in step S75 is the smallest threshold L or more, the execution proceeds to step S77. In step S77, it is decided if the computed distance is not less than a medium distance threshold M or not. If it is decided that the distance is less than the medium threshold M, the red LED 62R and the green LED 62G are lighted while adjusting their duty ratio, in step S78, so as to emit flashes of orange light. If it is determined that the computed distance in step S77 is the medium threshold M or more, the execution proceeds to step S79. In step S79, it is decided if the computed distance is not less than a largest distance threshold H or not. If it is decided that the distance is less than the largest threshold H, the red LED 62R and the green LED 62G are lighted while adjusting their duty ratio, in step S80, so as to emit flashes of yellow light. If it is decided in step S79 that the computed distance is the largest threshold H or more, the green LED 62G is operated to emit flashes of green light in step S81.

As described above, in the present embodiment of the corner indicator, the main body 50 is attached near the right and left corners of the car body 1, and the distance sensor 61 inside the main body 50 measures the distance between the car body 1 and the obstacle beside it. Moreover, the LED 62 inside the main body 50 is controlled by the LED controller 60 according to the output signal of the distance sensor 61.

Accordingly, the distance sensor 61 measures the clearance of the car to the obstacle so that the emission color of the LED 62 is changed according to the clearance, when the car speed is below a predetermined threshold. The driver can visually recognize the output color of the LED 62 and know the distance between the car body 1 and the obstacle without taking his eyes off the surroundings of the vehicle, which are observed either directly through the vehicle windshield or through a vehicle mirror. Therefore, even a person not skilled in driving can rapidly and correctly move the car close to a fence or wall.

The main body 50 on the fenders of the car body 1 has an appearance similar to an appearance of a well-known fender marker as a whole. Thus, even if it protrudes from the body 1 at the front and rear ends thereof, it contributes to the improvement of the ornamentation of the car body 1. Moreover, since the main body 50 accommodates the distance sensor 61, LED 62 and LED controller 60, the entire system can be made operational merely by introducing an external power supply thereunto. Therefore, the vehicle corner indicator can be made compact and is easy to install.

Particularly, the fifth embodiment is structured such that a logic circuit determines whether or not an ignition switch is on or off when speed sensor output is 10 km/h or less, thereby controlling a gate of the power source to supply power to the distance sensor 61, LED 62 and LED controller 60. However, the power from the power source, which is made ON in response to an ON of the ignition switch, may be directly supplied to the distance sensor 61, LED 62 and LED controller 60. In this modification, the corner indicator is illuminated continuously in green at the time of regular running state, as long as there is no other cars nearing the front of the car body 1 or as long as an obstacle does not lie beside the car. In such a modified indicator, there are advantages that the structure of the illustrated embodiment of corner indicator can be separately manufactured in advance and mounted on the car body 1 as desired. In this case, the same functions as the above can be attained, too.

The above embodiment computes the distance by the output of the distance sensor 61, and changes the illumination color in four steps according to the distance. However, it may be structured such that the emission color of the LED 62 is controlled by other information, e.g., car speed, at the time of regular running state, and that the distance sensor 61 is operated only when the output of the speed sensor is 10 km/h or less. In addition, more or less incremental steps corresponding to the distance can be used in the corner indicator.

While the main body 50 is formed in a shape similar to a conventional fender marker in the above embodiment, the inventive corner indicator can be embodied into a corner pole.

Figure 14:
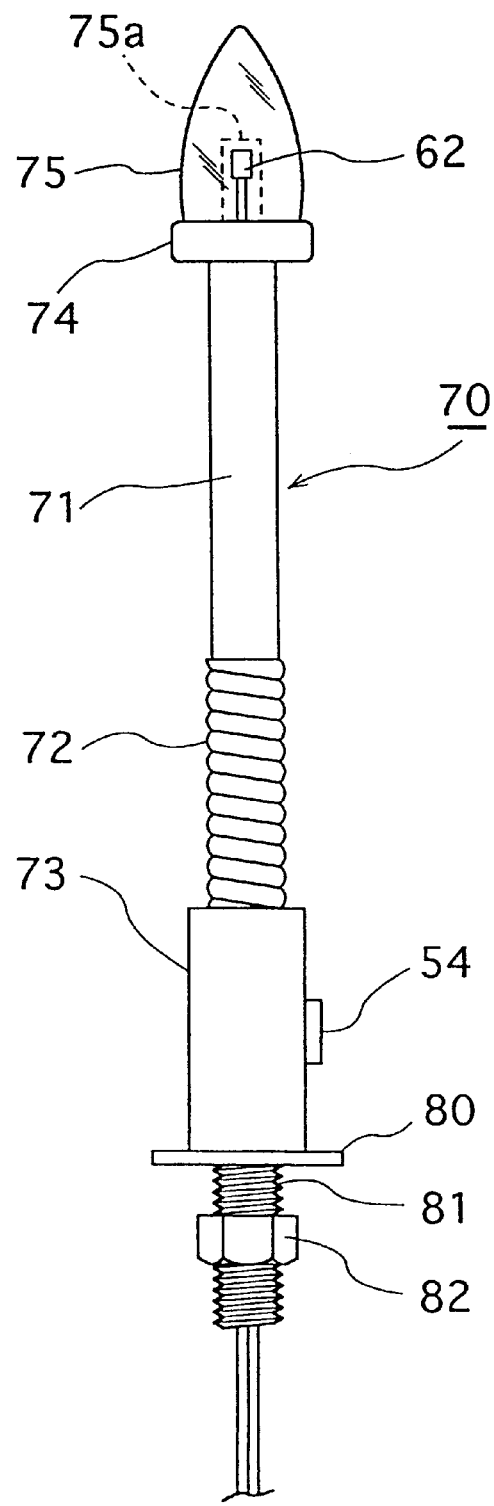
FIG. 14 is a front view of a vehicle corner indicator according to a sixth embodiment of the information indicator of the invention.

FIG. 14 is a front view of a vehicle corner indicator as a sixth embodiment of information indicator of the invention.

As shown in FIG. 14, in this embodiment of corner indicator, a main body 70 has a rigid tube 71 which is set in a fixed height or attached with a flag or the like as desired. An elastic tube 72 is disposed at a lower end of the rigid tube 71 so as to make the rigid tube 71 movable when a fixed degree or more of external force is applied thereto. A housing 73 is attached to a lower end of the elastic tube 72 and accommodates therein the distance sensor 61 and the LED controller 60, though not shown in FIG. 14. A base plate 74 is mounted integrally on an upper end of the rigid tube 71. A lens 75 of a transparent or translucent resin is arranged on the base plate 74. The LED 62 is inserted in a lower center of the lens 75. The ultrasonic vibrator 54 is airtightly inserted in a circular hole (not shown) of the housing 73.

Particularly, in this embodiment, the housing 73 is provided for accommodating the distance sensor 61 and the LED controller 60. Therefore, it is possible to accommodate therein another distance sensor for measuring a distance between the car and another car body (object) in front of or behind it, in addition to the distance sensor 61 for measuring the clearance between the car and the obstacle beside it. Such a modified indicator can measure the car distance between the adjacent cars in a regular running state at a fixed speed, and informs the driver of the distance.

A seat 80 and a thread 81 are secured to a lower end of the housing 73 so as to attach body 70 to the car body 1. A nut 82 is engaged with the thread 81 to fix the main body 70 on the car body 1 through the thread 81 and seat 80.

Namely, the main body 70 of this embodiment is composed of the rigid tube 71, elastic tube 72, housing 73, base plate 74, lens 75, seat 80, thread 81 and nut 82.

As in the fifth embodiment, the housing 73 accommodates therein a printed circuit board (not shown). The printed circuit board has the LED 62, LED controller 60, various circuits and the distance sensor 61 from FIG. 11 mounted thereon. The distance sensor 61 is composed of the ultrasonic vibrator 54 and its control circuit, as shown in FIG. 11. The printed circuit board is inserted and fitted in the housing 73.

Moreover, as in the fifth embodiment, the present embodiment connects the distance sensor 61 to the input of the LED controller 60 so as to detect the clearance between the car body 1 and the obstacle beside it. Then, it operates the LED 62 to emit a fixed color of light corresponding to the detected distance. Thereby, such color of light is radiated outside through the main body 70, and the main body 70 is illuminated in that color by continuous light or flashing light, as desired.

The lens 75 has a fitting hole 75*a* formed at its center for accommodating the LED 62. Particularly, the surface of fitting hole 75*a* in lens 75 is roughened by graining or cutting.

The sixth embodiment is similar to the fifth embodiment and has similar advantageous effects.

The main body 70 is attached near the right and left corners of the car body 1 and resembles a conventional corner pole in appearance. So, even if it protrudes from the body 1 at the front or rear thereof, it contributes to the improvement of the ornamentation of the car body 1. Moreover, as in the fifth embodiment, since the main body 70 accommodates therein the distance sensor 61, LED 62 and LED controller 60, the indicator can be operated merely by introducing an external power source thereunto. Thus, the corner indicator becomes compact in size and easy to install.

Each of the fifth and sixth embodiments has the main body, 70, the distance sensor 61 provided inside the main body 70 for measuring the clearance, the LED 62 inside the main body 70, and the LED controller 60 provided inside the main body 70 for controlling the LED 62 by the output of the sensor 61.

However, the distance sensor 61 may be disposed outside the main body 70 for the purpose of improving the reliability of the distance sensor 61. Thus, the distance sensor 61 becomes more reliable, and its output can be enlarged.

The distance sensor 61 may be a sensor which measures a distance between the driving car and a car in front thereof. Namely, the distance sensor 61 of the vehicle corner indicator may be a sensor which measures the distance between the main body 70 and a car body 1 of a car running ahead thereof.

Accordingly, the driver can see the output light of the LED 62 to know the car distance between his or her car and a car ahead of him or her in a usual driving condition without having to look away from the vehicle surrounding by looking at a dashboard indicator, since the distance sensor 61 measures such car distance and changes the output of the LED 62 depending on the distance.

Moreover, if the distance sensor 61 is disposed separately from the main body 70, a large distance sensor 61 can be used and the reliability of the device improves. Here, the corner indicator is located at such a position as to draw the attention of the driver who looks forward while driving easily without requiring the driver to look away from the vehicle's surroundings, so that it functions more efficiently than a conventional warning lamp and can be used as a warning indicating device with high visibility and reliability.

The housing 73 may accommodate therein a distance sensor for measuring the car distance in addition to the distance sensor 61 for measuring the clearance as described above. Such a modified indicator can measure the car distance and let the driver know it. Namely, it can measure the car distance in addition to the clearance at the side of the car. Of course, the indicator can use a sensor for detecting an obstacle ahead of or behind the driver's car. Namely, the number of distance sensors 61 used is not limited in the above embodiments.

The quantity of light emitted from the LED 62 is set at about a medium value between a light quantity at daytime and a light quantity at nighttime, e.g. a value equivalent to a light quantity at the evening time, based on the visibility curve by the well-known Prukinje effect. Then, an optical sensor 63 (see FIG. 12) may be additionally provided on the corner indicator in order to determine if it is daytime or nighttime. In this case, it is preferable to detect the light quantity at the outside of the car, since such a construction is added to improve the visibility of the corner indicator which is also located outside of the car.

If a light quantity detector is provided, as described in the first to fourth embodiments, the illumination color of the corner indicator can be automatically set to a bluish or reddish color in accordance with the difference in the external light quantity, for example, depending on whether it is daytime or nighttime. Namely, the corner indicator is illuminated in the bluish color if the light quantity is small, while illuminated in the reddish color if the light quantity is large. As a result, the corner indicator can be lighted up in a suitable color depending on the external light quantity. Thus, the driver can clearly see the corner indicator at any time regardless of the light quantity change.

Each above embodiment may be provided with a plurality of sensors including the distance sensor 61 arranged either together or separately from the main body 70. Moreover, the distance sensor 61 accommodated in the main body 70 can be composed of an ultrasonic sensor, optical sensor and other proximity sensors or switches. Thus, an optimal sensor having characteristics suitable for detecting the distance to a detected object can be used as the distance sensor 61, so that reliability of detection can be heightened.

Particularly, in case of using an optical sensor, it is preferable to form a coating of titanium dioxide (TiO2) on an outer surface of a glass or lens sealing packing a transmitting hole. In this case, dirt on the outer surface can be resolved by near ultraviolet radiation from the sun or LED through the TiO2 coating, so that the sensor can keep its initial property.

While the LED 62 in the above embodiment is composed of the red, green and blue LEDs 62R, 62G and 62B, it is not always necessary to use these three colors of LEDs 62R, 62G and 62B as long as a fixed color of light can be generated to represent a meaning for a predetermined warning or the like. Namely, if it is necessary to give multiple meanings to multiple warnings or the like, different colors of LEDs are used so that multiple colors of light can be generated for giving them the fixed meanings for the predetermined warnings or the like. It is also possible to use one of the above three colors of LEDs. In this case, similar effects can be attained, too, though the color of the emitted light is limited. Still, if three LEDs 62R, 62G and 62B are used, any desired color of light can be obtained, so that utilization field of the indicator becomes wider.

While the main body 70 is used for showing one specific warning in each above embodiment, it may be used to show multiple warnings.

Figure 15:
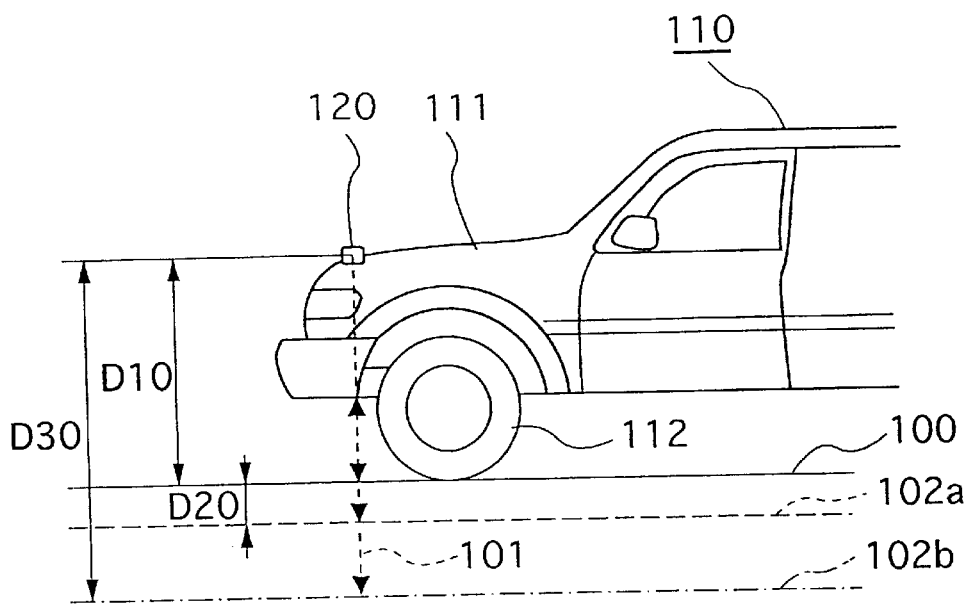
FIG. 15 is a side view showing a car equipped with an approach warning indicator according to a seventh embodiment of the information indicator of the invention.
Figure 16:
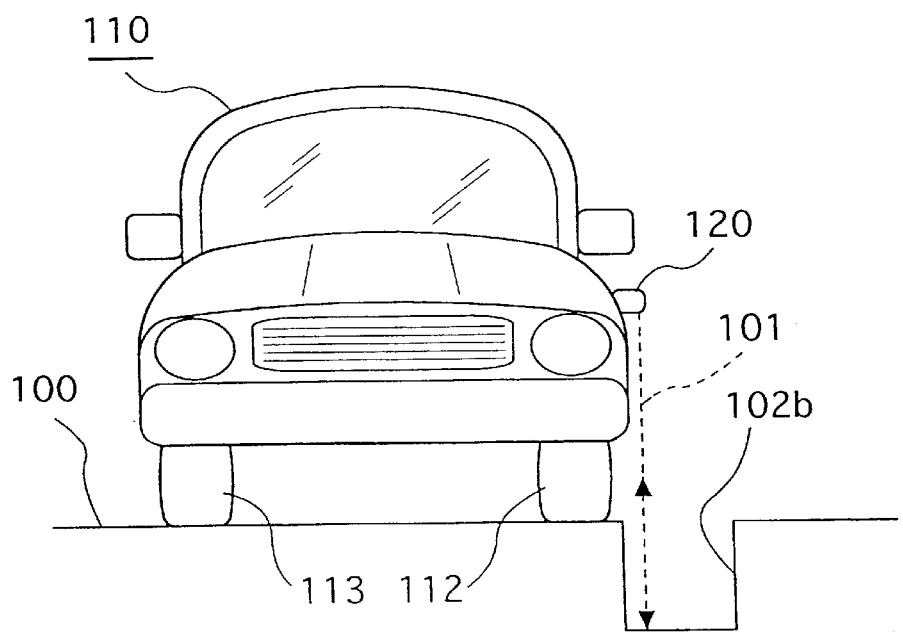
FIG. 16 is a front view showing the car equipped with the seventh embodiment of the inventive approach warning indicator.
Figure 17:
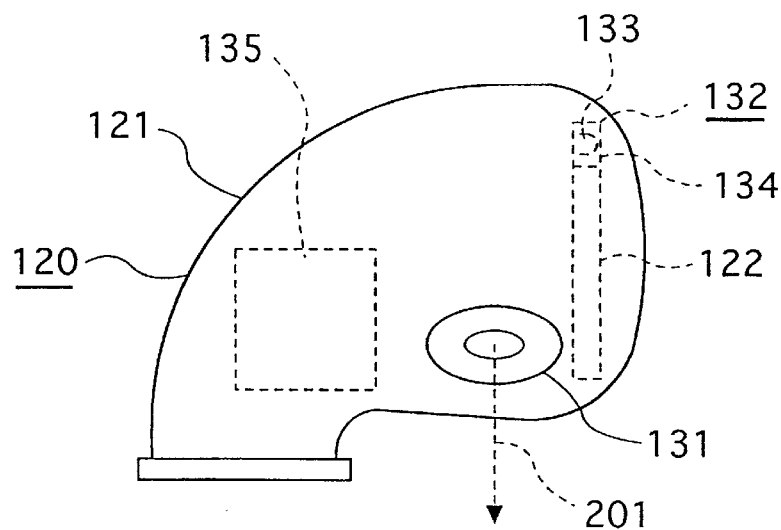
FIG. 17 is a side view showing an auxiliary mirror according to the seventh embodiment of the inventive approach warning indicator.
Figure 18:
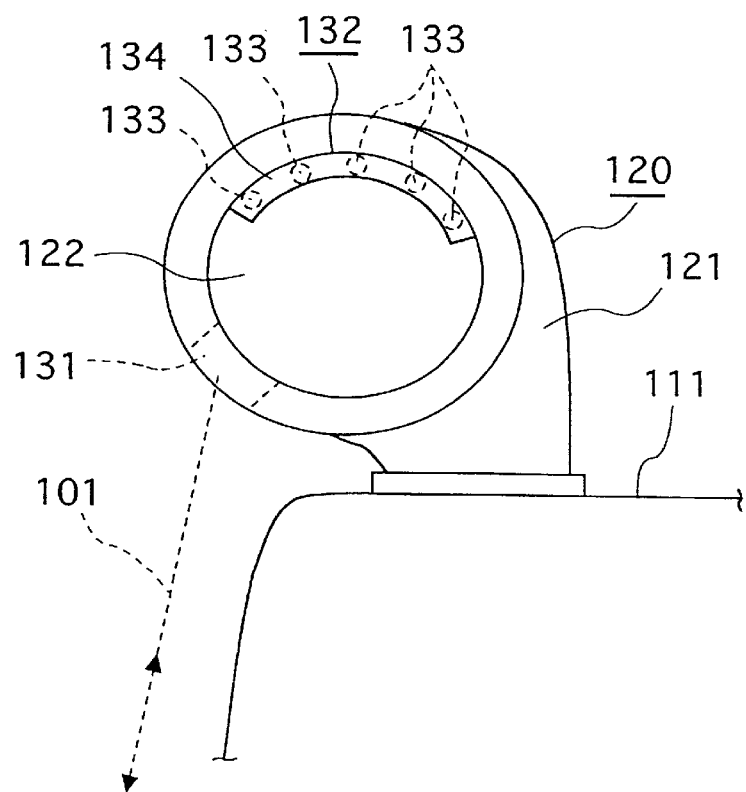
FIG. 18 is a front view showing the auxiliary mirror according to the seventh embodiment of the inventive approach warning indicator.
Figure 19:
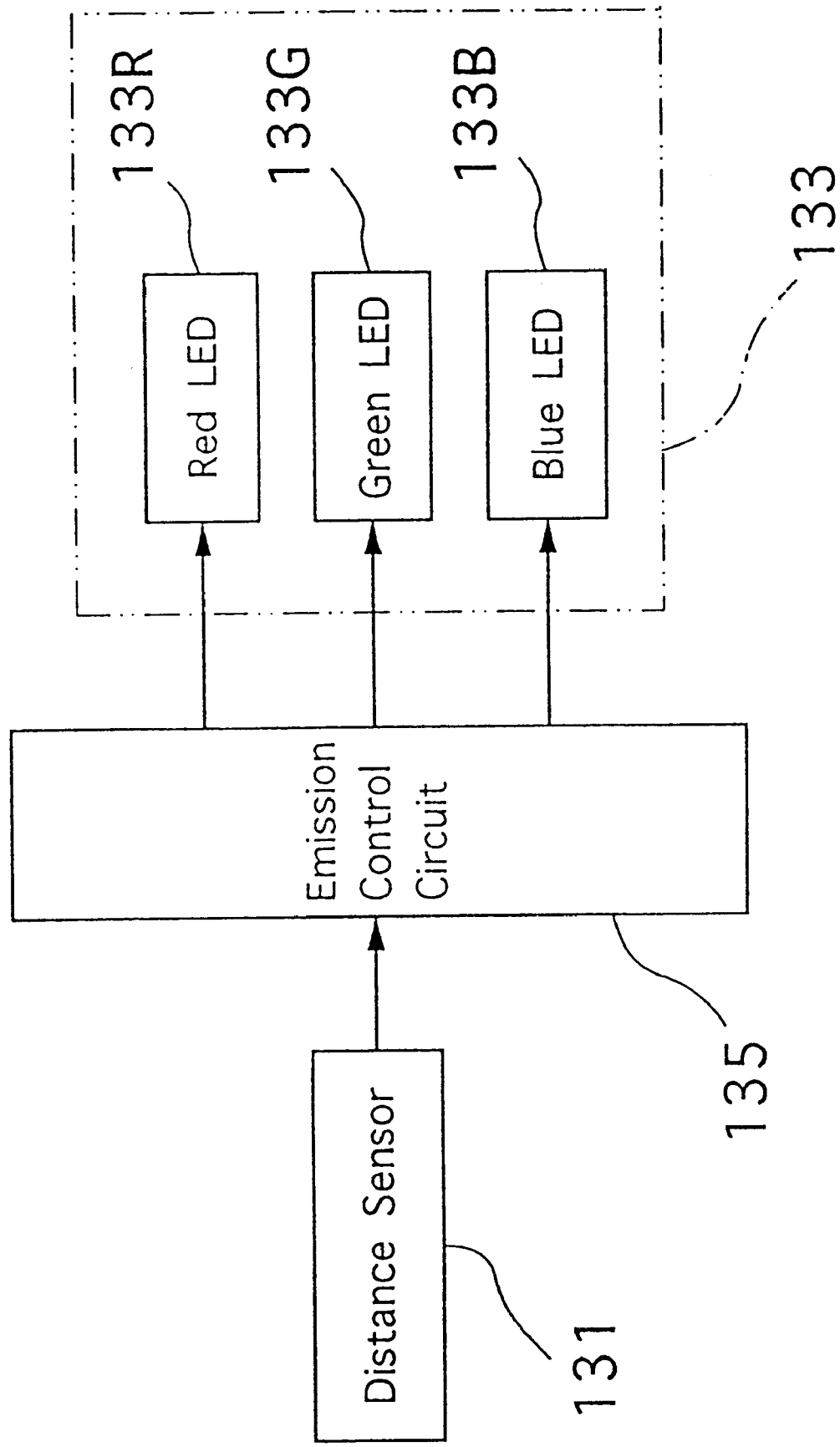
FIG. 19 is a block diagram showing an electric structure of the seventh embodiment of the inventive approach warning indicator.

FIG. 15 is a side view showing a car equipped with an approach warning indicator according to a seventh embodiment of information indicator of the invention. FIG. 16 is a front view showing the car equipped with the seventh embodiment of the inventive approach warning indicator. FIG. 17 is a side view showing an auxiliary mirror according to the seventh embodiment of the inventive approach warning indicator. FIG. 18 is a front view showing an auxiliary mirror according to the seventh embodiment of the inventive approach warning indicator. FIG. 19 is a block diagram showing an electric circuit used in the seventh embodiment of the inventive approach warning indicator.

Referring to FIGS. 15 to 19, the present embodiment of approach warning indicator is applied to an auxiliary mirror 120, which is used as an outside mirror of a car, a recreational vehicle (RV) or the like. It is disposed near a front end of a car body 110 opposite to a driver's seat (left side in case of the illustrated right-hand-drive car) so as to protrude from a front fender 111. According to this configuration, the driver can be warned of an approaching depression in the road or other object, while observing the surrounding of the vehicle through the auxiliary mirror. The auxiliary mirror 120 is composed of a housing having substantially a bullet shape and a mirror 122 arranged at a rear side of the housing 121.

The present embodiment of an approach warning indicator includes a distance sensor 131, a warning indicator 132 having LED lamps 133 and a lens 134, and an LED controller 135. All these elements are disposed integrally on the auxiliary mirror 120, while some of them are accommodated in the housing 121. The distance sensor 131 is arranged on the auxiliary mirror 120 and detects a concave place or a hollow 102a, 102b adjacent the car so as to output a signal corresponding to a depth of the hollow 102a, 102b. In this embodiment, an ultrasonic sensor is used as the distance sensor 131. Though not shown, the ultrasonic sensor itself is a conventional device that has an ultrasonic vibrator, a drive control circuit for operating the ultrasonic vibrator and a circuit necessary for transmitting and receiving ultrasonic waves 101 through the vibrator accommodated in a housing in an airtight manner. The ultrasonic sensor is fitted inside the housing 121 so that the ultrasonic vibrator is exposed at a lower part of an outer surface of the auxiliary mirror 120. The distance sensor 131 transmits the ultrasonic waves 101 toward a ground surface 100 or the like which serves as a reflection surface, while receiving reflected waves to output a signal corresponding to a distance to the reflection surface therefrom, as shown by arrows in FIGS. 15 and 16.

Specifically, the distance sensor 131 transmits the ultrasonic waves 101 to the ground surface 100 at a fixed position at the side of a left front wheel 112 of the car body 110. In the illustrated embodiment, it transmits the waves to the ground surface 100 at a point a little ahead of a position at the side of a contact portion of the left front wheel 112 with the ground surface 100, and receives the reflected waves from that point. If there is a hollow 102a, 102b at such point of the ground surface 100, a bottom surface of the hollow 102a, 102b becomes a reflection surface. Therefore, the distance sensor 131 receives reflected waves from the bottom surface of the hollow 102a, 102b and outputs a signal corresponding to a distance between the bottom and it for measuring the distance.

The warning indicator 132 is disposed on the housing 121 along a periphery of an upper edge of the mirror 122. The warning indicator 132 has a plurality of LED lamps 133 arranged at fixed intervals along its length so that the LED lamps 133 can emit light toward the interior of a car. A lens 134 covers an emitting side (car interior side) of the LED lamps 133. The lens 134 has a light diffusing effect so that it uniformly diffuses the light from the LED lamps 133 and emits the diffused light from its entire surface. The warning indicator 132 is fixedly and integrally joined to the mirror 122 and tiltable together with the mirror 122. An outer surface of the lens 134 is flush with an outer surface (mirror surface) of the mirror 122.

The LED lamp 133 is composed of a red LED 133R, a green LED 133G and a blue LED 133B and capable of emitting three primary colors of light. For example, the LED lamp 133 may be one constructed such that the red, green and blue LEDs 133R, 133G and 133G are mounted on a lead frame and packed in a molding resin so as to emit all colors of light by itself.

The LED controller 135 is fixedly accommodated inside the housing 121 and controls the LED lamps 133 according to an output of the distance sensor 131.

Namely, as shown in FIG. 19, the LED controller 135 has an input connected with the distance sensor 131, and computes the distance between the car body 110 and the ground surface 100 or bottom surface of the hollow 102a, 102b at the side of the left front wheel 112, on the basis of the output of the distance sensor 131. The LED controller 135 has an output side connected with the red, green and blue LEDs 133R, 133G and 133B of the LED lamp 133 so as to cause the lamp to emit a preset desired color according to the output of the distance sensor 131. In this embodiment, the LED controller 135 is made of a one-chip microcomputer and has a CPU, ROM, and RAM. It controls the LED lamps 133, by the duty control or the like, while selectively combining the different colors of LEDs 133R, 133G and 133B, thereby generating a desired color of light.

Specifically, as shown in FIG. 15, the LED controller 135 stores beforehand distances between a fitting position of the distance sensor 131 in a regular state of the car and a fixed position of the ground surface 100, a dent and the hollows 102a and 102b, respectively. Namely, it stores a distance D10 from the distance sensor 131 to the ground surface 100 as a reference value. It stores a distance from the distance sensor 131 to a bottom surface of the dent not shown, which has such a small depth as is in an irregular ground surface, as a smallest distance threshold L. It stores a distance D10+D20 from the distance sensor 131 to the bottom surface of the hollow 102a, which has a depth D20 (normally about 20 cm) that is small enough so that the car wheel can get over it, as a medium distance threshold M. It also stores a distance D30 from the distance sensor 131 to the bottom surface of the hollow 102b, which has a depth such that the car wheel cannot get over it and will remain therein, as a largest distance threshold H. Then, the LED controller 135 computes the distance from the sensor 131 to the ground surface 100 or the bottom surface of the hollow 102a, 102b based on the output from the distance sensor 131. Thereafter, it compares a computed value with the smallest threshold L, medium threshold M and largest threshold H, and controls light emission of the LED lamps 133 depending on a result of such comparison.

In this embodiment, the LED controller 135 is supplied with power, e.g., when the car speed becomes 10 km/h or less, which occurs at the time of slow driving or parking or the like, so that the distance sensor 131 inputs the signal into the LED controller 135. Then, the LED controller 135 controls the emission of the LED lamps 133 according to a warning corresponding to the input signal, thereby illuminating the warning indicator 131 through the lens 134.

An operation of the present embodiment of approach warning indicator is described hereafter.

Figure 20:
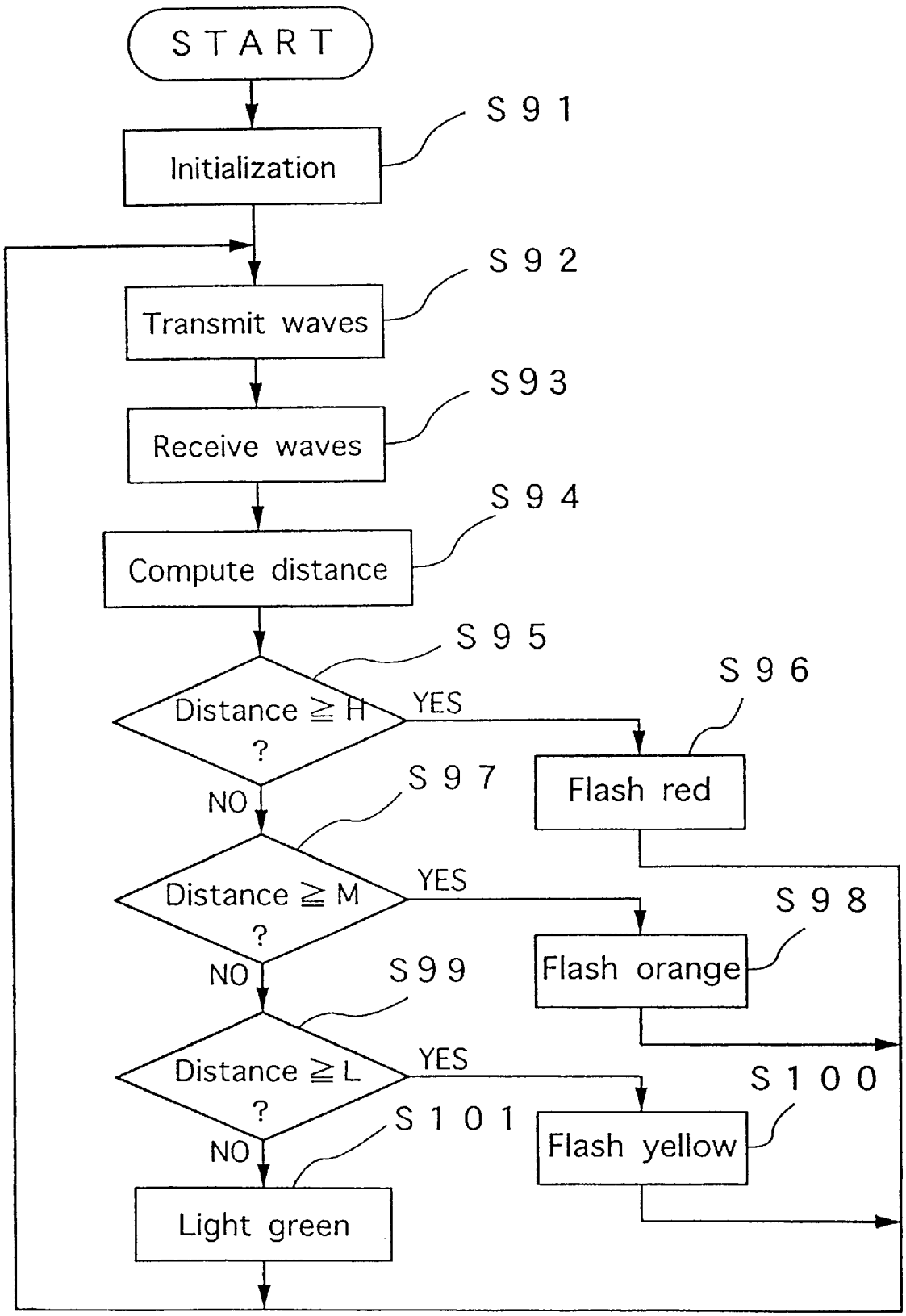
FIG. 20 is a flowchart showing an overall operation of the seventh embodiment of the inventive approach warning indicator.

FIG. 20 is a flowchart showing an overall operation of the seventh embodiment of the inventive approach warning indicator.

In this embodiment, the LED controller 135 is supplied with power when the car speed becomes 10 km/h or less, and the following program is executed.

If the power is supplied to the distance sensor 131, LED lamps 133, LED controller 135 and so on, the LED controller 135 is initialized in step 91. Then, the distance sensor 131 transmits ultrasonic waves 101 for a predetermined period of time, i.e. a few microseconds or less, in step S92. The distance sensor 131 receives and detects reflected ultrasonic waves 101 after a fixed period of time in step S93. Thereafter, in step S94, the LED controller 135 computes a distance from the sensor 131 to the reflection surface near the left front wheel 112, on the basis of a delay in transmitting and receiving the ultrasonic waves 101. In step S95, it is decided if the computed distance is not less than the largest distance threshold H or not. If it is decided that the distance is not less than the largest threshold H, the red LED 133R is operated so that the LED lamp 133 emits flashes of red light, in step S96, thereby flashing the warning indicator 132 in red through the lens 134 and visually informing the driver of the relatively deep depression near wheel 112. Thus, the driver is notified by the red flashes of the warning indicator 132 that a hollow 102b is near the wheel that is so deep that the wheel may not be able to exist therefrom, such as a gutter.

If it is determined that the computed distance in step S95 is less than the largest threshold H, the execution proceeds to step S97. In step S97, it is decided if the computed distance is not less than the medium distance threshold M or not. If it is decided that the distance is not less than the medium threshold M, the red LED 133R and the green LED 133G are lighted while adjusting their duty ratio, in step S98, so that the LED lamp 133 emits flashes of orange light, thereby flashing the warning indicator 132 in orange through the lens 134 and visually informing the driver of the depression next to wheel 112. Thus, the driver is notified by the orange flashes of the warning indicator 132 that a hollow 102a is near the left front wheel 112 without requiring the driver to discern an audio warning or look away from the mirror through which the driver observes the vehicle's surroundings.

If it is determined that the computed distance in step S97 is less than the medium threshold M, the execution proceeds to step S99. In step S99, it is decided if the computed distance is not less than the smallest distance threshold L or not. If it is decided that the distance is not less than the smallest threshold L, the red LED 133R and the green LED 133G are lit while adjusting their duty ratio, in step S100, so that the LED lamp 133 emits flashes of yellow light, thereby flashing the warning indicator 132 in yellow through the lens 134 and visually informing the driver of the slight depression. Thus, the driver is notified by the yellow flashes of the warning indicator 132 that a dent from an irregular ground surface exists at the side of the left front wheel 112.

If it is decided in step S99 that the computed distance is less than the smallest threshold L, the green LED 133G is operated to emit flashes of green light in step S101 so that the LED lamp 133 emits green flashes of light. Thus, the driver is notified by the green flashes of warning indicator 132 that there are no dents or hollows at the side of the left front wheel 112.

While the blue LED 133B is not used in the above operation, it may be used as desired. For example, a distance threshold is additionally set between the smallest threshold L and the medium threshold M. Then, the green LED 133G flashes the LED lamp 133 at the time of such a threshold. The blue LED 133B flashes the LED lamp 133 in blue, thereby illuminating the warning indicator 132 by blue flashes of light through the lens 134. Otherwise, the blue LED 133B may be combined with the other LEDs 133R and 133G by the duty control to obtain a mixed color of light which is different from the above colors. Namely, the illumination color of the warning indicator 132 may be any desired color according to the threshold, in addition to the above colors. In executing the above program, the blue LED 133B may be omitted.

In the seventh embodiment, the distance sensor 131 detects the hollow 102a, 102b on the ground surface 100 at the side of the left front wheel 112 and measures the depth thereof, thereby changing the output according to the distance. Moreover, the LED controller 135 controls and drives on the LED lamps 133 according to the output from the distance sensor 131. Then, the warning indicator 132 indicates a warning by providing illumination light toward the car interior of the car through the LED lamps 133 located around the mirror 122. At this time, the driver obtains information of the hollow 102a, 102b beside the wheel 112, e.g., the gutter, from the change in indicating state of the warning indicator 132 by looking at the auxiliary mirror 120, which is placed within his or her sight and easy to see. Therefore, the warning indicator 132 can effectively perform a warning function, so that the warning indication thereby becomes reliable. As a result, the driver can be visually and effectively given the information of the hollow 102a, 102b beside the wheel 112 during driving without having to look away from the vehicle's surroundings. Then, the driver can recognize the distance between the hollow 102a, 102b and his or her car, so as to prevent the wheel from falling into the hollow or getting stuck. Thus, the driver can better handle the vehicle in a smooth and correct way. Particularly, in case there is a hollow 102a, 102b like a gutter near the car at the time of parking, he or she can park the car at a correct position while keeping the wheel from dropping into the hollow.

The distance sensor 131, LED controller 135 and warning indicator 132 are provided on the auxiliary mirror 120, so that these members form one body and need no special space for fitting on the car. Therefore, total costs can be reduced and the whole structure can be compact and easy to install. Moreover, these integral members can work only by introducing an external power source therein, so that the approach warning indicator can be made more compact. Since the distance sensor 131 is disposed on the auxiliary mirror 120 which protrudes sidewards from the car body 110, it can exactly measure the distance therefrom to the hollow 102a, 102b at the side of the car body 110. In addition, the LED lamps 133 emit light around the mirror 122 and seen by the driver, so that the visibility of the warning indicator 132 is excellent and the warning information can be reliably transmitted to the driver.

Furthermore, the LED lamps 133 can emit any color of light as described above, while controlled by the control circuit 135 to emit one of preset desired colors of light according to the output of the distance sensor 131. Namely, the distance between the car and the hollow is computed based on the output of the distance sensor 131, and the LED lamps 133 are lit in one of the four colors (red, orange, yellow and green) or five colors (those four colors plus blue) depending on the distance. Accordingly, the LED controller 135 changes the light color of the LED lamps 133 depending on the output of the distance sensor 131. For example, it changes the light color to blue, green, yellow, orange, and red, in turn, according to the depth of the hollow 102a, 102b. Thus, a variety of light colors can be provided to transmit more kinds of information to the driver.

In addition, the distance sensor 131, warning indicator 132 and LED controller 135 are disposed on the auxiliary mirror 120 as an outside mirror opposite side from the driver's seat. Therefore, the driver can recognize and be notified of the hollow 102a, 102b located opposite to his or her seat merely by looking in that direction, which is a direction the driver would usually be looking, and not by taking his eyes off the vehicle's surroundings to observe a dashboard indicator, for example. Namely, it is difficult for the driver to see and know correctly how far or where such a gutter or hollow is. In this embodiment, since the warning indicator 132 or the like are placed at the auxiliary mirror 120 opposite side from the driver's seat, the driver can easily notice the position of such hollows and perform exactly and smooth steering operations, such there involved when parking the car. Particularly, even if there is a gutter or hollow 102a, 102b at the opposite side to the driver's seat, in parking the car in parallel to the gutter, the driver can make the car approach the gutter while recognizing the distance through the warning indicator 132. As a result, the driver is able to park the car very close to the gutter or hollow.

An eighth embodiment of the inventive approach warning indicator is described hereafter.

Figure 21:
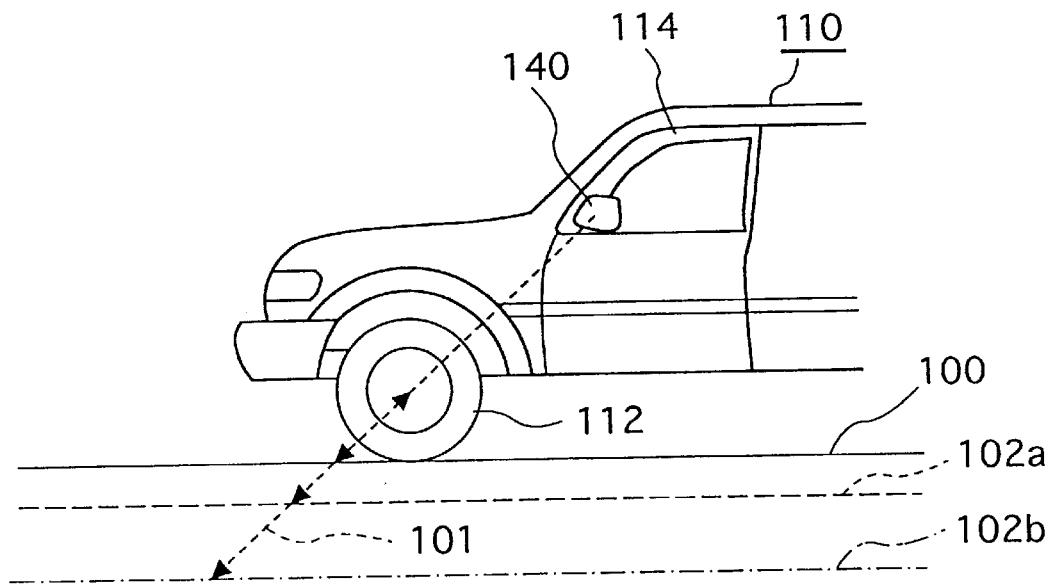
FIG. 21 is a side view showing a car equipped with an approach warning indicator according to an eighth embodiment of the information indicator of the invention.
Figure 22:
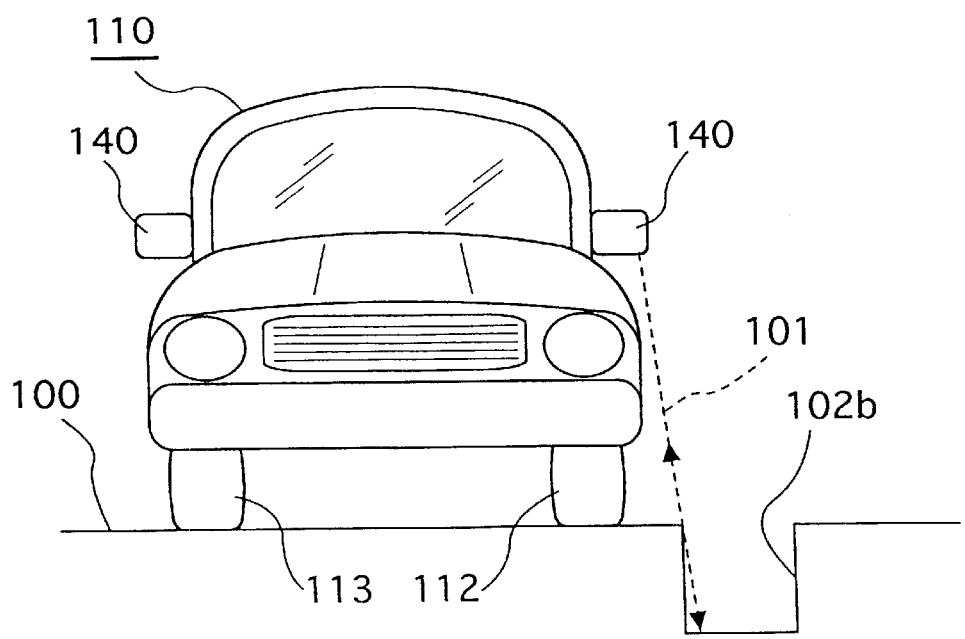
FIG. 22 is a front view showing the car equipped with the eighth embodiment of the inventive approach warning indicator.
Figure 23:
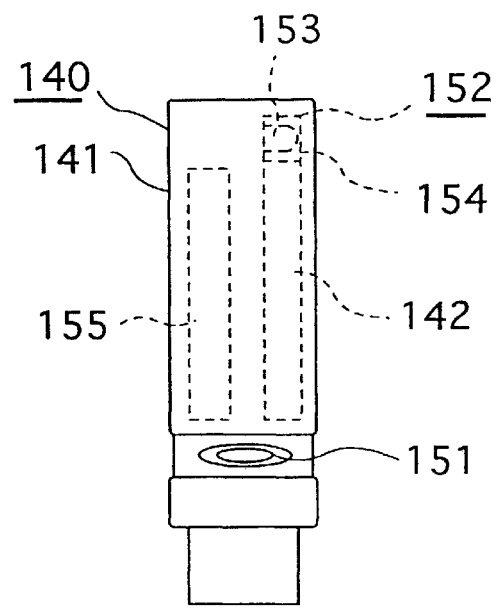
FIG. 23 is a side view showing a door mirror according to the eighth embodiment of the inventive approach warning indicator.
Figure 24:
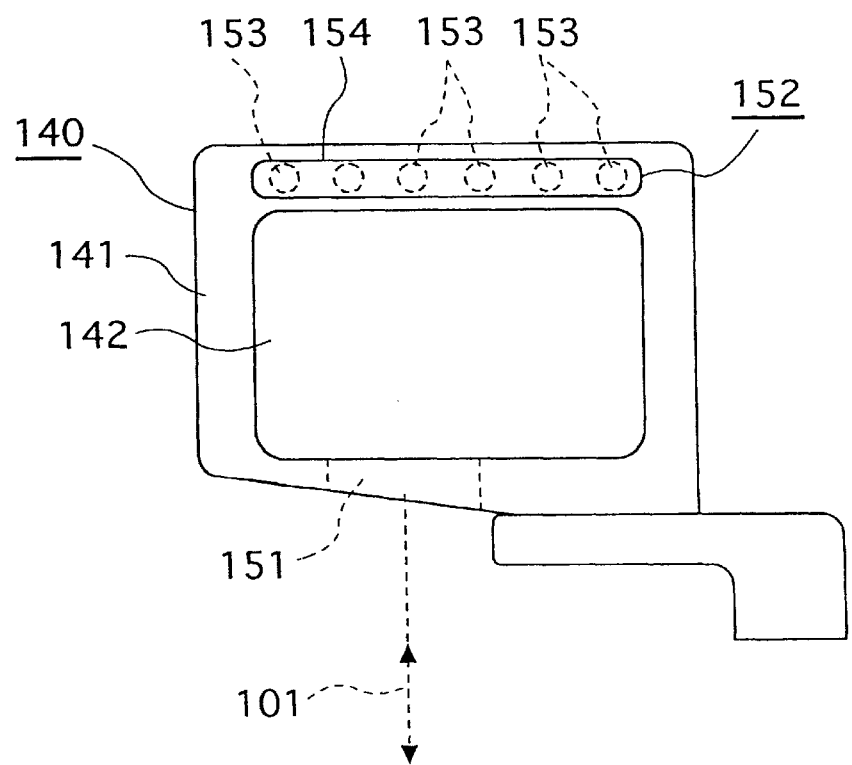
FIG. 24 is a front view showing the door mirror according to the eighth embodiment of the inventive approach warning indicator.

FIG. 21 is a side view showing a car equipped with an approach warning indicator according to an eighth embodiment of the information indicator of the invention. FIG. 22 is a front view showing the car equipped with the eighth embodiment of the inventive approach warning indicator. FIG. 23 is a side view showing a door mirror according to the eighth embodiment of the inventive approach warning indicator. FIG. 24 is a front view showing the door mirror according to the eighth embodiment of the inventive approach warning indicator.

Referring to FIGS. 21 to 24, the present embodiment of approach warning indicator is different from the seventh embodiment in that it is provided on a door mirror 140 on a left side door 114 of the car body 110. Other structures are nearly same as the seventh embodiment. Namely, the door mirror 140 has a housing 141 of substantially a square box shape and a mirror 142 disposed at a rear side of the housing 141. The present embodiment of the approach warning indicator includes a distance sensor 151, a warning indicator 152 having LED lamps 153 and a lens 154, and an LED controller 155. All these elements are disposed integrally on the door mirror 140, while some of them are accommodated in the housing 141. The distance sensor 151 is arranged on the door mirror 140 and detects the hollow 102a, 102b located at a position on the ground surface 100 in front of or at the side of the left front wheel 112, thereby outputting a signal corresponding to a depth of the hollow 102a, 102b. The distance sensor 151 is made of an ultrasonic sensor of a similar structure as the distance sensor 131 of the seventh embodiment. The ultrasonic sensor is fitted inside the housing 141 so that the ultrasonic vibrator is exposed at a lower part of an outer surface of the door mirror 140. The distance sensor 151 transmits the ultrasonic waves 101 toward the ground surface 100 or the like which serves as a reflection surface, while receiving reflected waves so as to output a signal corresponding to a distance to the reflection surface therefrom, as shown by arrows in FIGS. 21 and 22.

Specifically, the distance sensor 151 transmits the ultrasonic waves 101 to the ground surface 100 at a position at the side of the left front wheel 112 of the car body 110, as in the seventh embodiment. In the illustrated embodiment, it transmits the waves to the ground surface 100 at a point a little ahead of a position at the side of a contact portion of the left front wheel 112 with the ground surface 100, and receives the reflected waves from that point. If there is a hollow 102a, 102b at such point of the ground surface 100, a bottom surface of the hollow 102a, 102b becomes a reflection surface. Therefore, the distance sensor 151 receives reflected waves from the bottom surface of the hollow 102a, 102b and outputs a signal corresponding to a distance between the bottom and it for measuring the distance.

The warning indicator 152 is disposed on the housing 141 so as to extend along an upper edge of the mirror 142. The warning indicator 152 is constructed in the same manner as the seventh embodiment of warning indicator 132 and has a plurality of LED lamps 153 arranged at fixed intervals along its length so that the LED lamps 153 can emit light toward a car interior side. The lens 154 covers an emitting side (car interior side) of the LED lamps 153. The lens 154 uniformly diffuses the light from the LED lamps 153 and emits the diffused light from its entire surface. The warning indicator 152 is integrally joined to the mirror 142 and tiltable together with the mirror 142. An outer surface of the lens 154 is flush with an outer surface (mirror surface) of the mirror 142.

The LED lamp 153 has the same structure as the LED lamp 133 of the seventh embodiment and emits three primary colors of light which can be combined so as to emit all colors of light.

The LED controller 155 is accommodated inside the housing 141 and controls the LED lamps 153 according to an output of the distance sensor 151.

Namely, as in the seventh embodiment shown in FIG. 19, the LED controller 155 has an input connected with the distance sensor 151, and computes the distance between the car body 110 and the ground surface 100 or bottom surface of the hollow 102 at the side of the left front wheel 112, on the basis of the output of the distance sensor 151. The LED controller 155 has an output connected with the LED lamp 153 so as to cause the lamp to emit a preset desired color of light according to the output of the distance sensor 151.

Specifically, as in the LED controller 135 of the seventh embodiment, the LED controller 155 stores beforehand a reference distance between a fitting position of the distance sensor 151 in a regular state of the car and a fixed position of the ground surface 100. It also stores smallest, medium and largest distance thresholds L, M and H, respectively, corresponding to distances from the sensor 151 to the dent and the hollows 102a, 102b. Namely, the LED controller 155 stores a distance from the distance sensor 151 to the ground surface 100 as a reference value. It stores a distance from the distance sensor 151 to a bottom surface of the dent (not shown), which has a small depth as is in an irregular ground surface, as a smallest distance threshold L. It stores a distance from the distance sensor 151 to the bottom surface of the hollow 102a, which has a depth sufficient for the car wheel can get over it, as a medium distance threshold M. It stores a distance from the distance sensor 151 to the bottom surface of the hollow 102b, which has a depth such that the car wheel cannot get over it and will remain dropped therein, as a largest distance threshold H. Then, the LED controller 155 computes the distance from the sensor 151 to the ground surface 100 or the bottom surface of the hollow 102a, 102b on the basis of the output from the distance sensor 151. Thereafter, it compares a computed value with the smallest threshold L, medium threshold M and largest threshold H, and controls light emission of the LED lamps 153 depending on a result of such comparison. As in the seventh embodiment, this embodiment has the LED controller 155 supplied with power when the car speed is 10 km/h or less. Then, the distance sensor 151 inputs the signal into the control circuit 155, and the LED controller 155 controls the emission of the LED lamps 153. Namely, the hollow 102a, 102b is detected and its distance is computed in accordance with the flowchart shown in FIG. 20. Then, the warning indicator 152 is lit by flashes of a fixed color such as red according to the computed result, thereby notifying the driver of it.

In the present embodiment, the position of the distance sensor 151 is more rearward than that of the seventh embodiment, so that the distance from it to the fixed position of the ground surface 100 or the bottom surface of the hollow 102a, 102b is greater. Accordingly, the reference value and the thresholds L, M and H are different from those of the seventh embodiment. Other structures of the LED controller 155 are the same as in the LED controller 135 of the seventh embodiment and functions as well.

The eighth embodiment of approach warning indicator has the same functions and advantageous effects as the seventh embodiment. Moreover, the present embodiment of warning indicator can be applied to cars other than the RV that do not have an auxiliary mirror.

Figure 25:
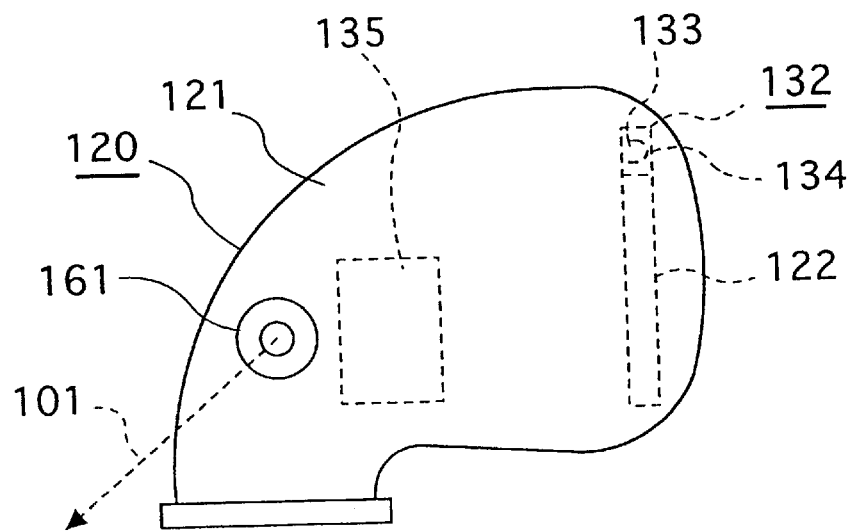
FIG. 25 is a side view showing a door mirror having an approach warning indicator according to a ninth embodiment of the information indicator of the invention.
Figure 26:
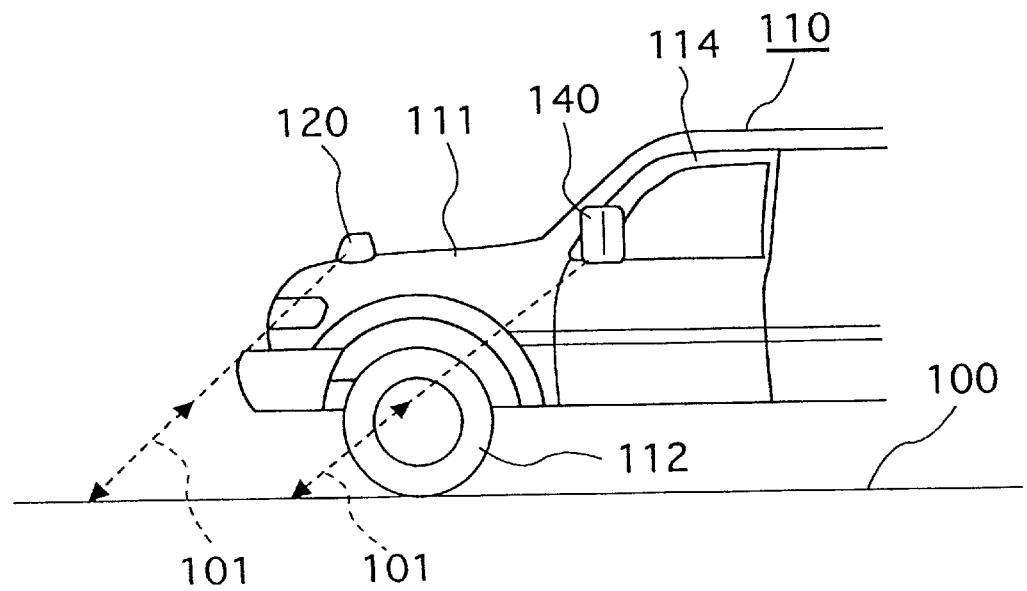
FIG. 26 is a side view showing a car equipped with the ninth embodiment of the inventive approach warning indicator.
Figure 27A:
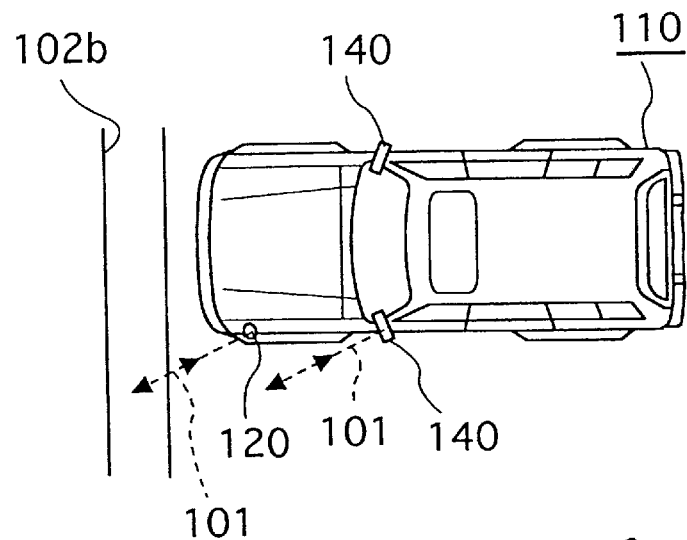
FIGS. 27a, 27b, and 27c are plan views showing an operation of the ninth embodiment of the inventive approach warning indicator together with a running direction of the car.
Figure 27B:
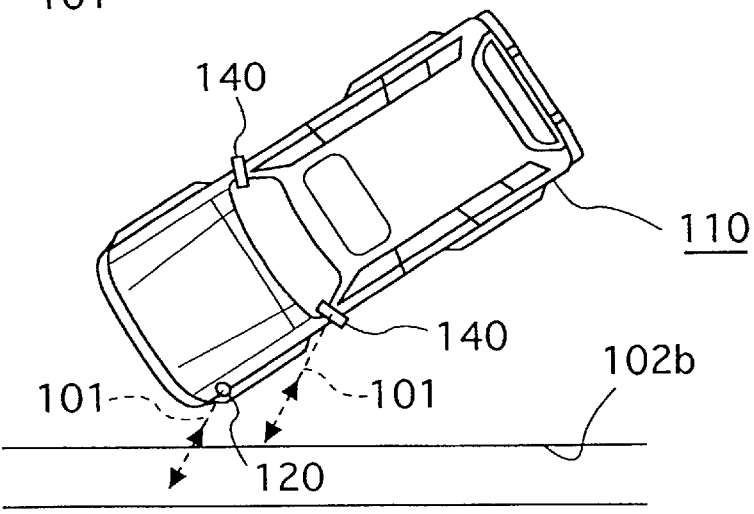
Figure 27C:
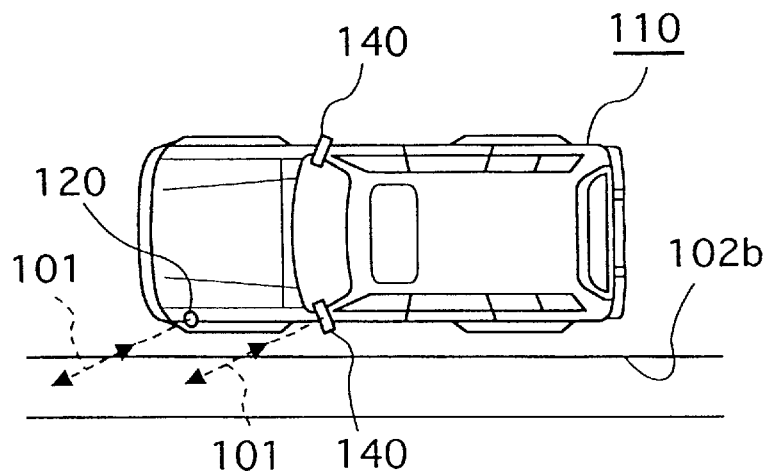

FIG. 25 is a side view showing a door mirror having an approach warning indicator according to a ninth embodiment of information indicator of the invention. FIG. 26 is a side view showing a car equipped with the ninth embodiment of the inventive approach warning indicator. FIGS. 27a, 27b and 27c are plan views showing an operation of the ninth embodiment of the inventive approach warning indicator together with the direction of movement of the car. FIG. 27a shows a case in which the car goes forward to approach a gutter in front of the car. FIG. 27b shows a case in which the car approaches a gutter at an angle and FIG. 27c shows a case in which the car is nearly parallel to the gutter.

As shown in FIGS. 25 to 27c, the present embodiment has the approach warning indicators provided on both the door mirror 140 and auxiliary mirror 120 at the side of the car opposite the driver's seat (the left side in FIGS. 26, 27a, 27b, and 27c. The distance sensor 151 on the door mirror 140 detects the hollow 102a, 102b near the left front wheel, while a distance sensor 161 on the auxiliary mirror 120 detects the hollow 102a, 102b ahead of the front wheels 112 and 113. The warning indicator provided on the door mirror 140 is structured same as the warning indicator of the eighth embodiment. On the other hand, the warning indicator provided on the auxiliary mirror 120 is different from the warning indicator of the seventh embodiment in that the transmitting direction of the ultrasonic waves 101 from the distance sensor 161 are dissimilar. Other structures are substantially same. Namely, the distance sensor 161 is made of an ultrasonic sensor of a similar structure as the distance sensor 131 of the seventh embodiment. The ultrasonic sensor is fitted inside the housing 121 so that the ultrasonic vibrator is exposed at a lower part of an outer surface of the housing 121. The distance sensor 161 transmits the ultrasonic waves 101 toward the ground surface 100 or the like serving as a reflection surface, while receiving reflected waves so as to output a signal corresponding to a distance to the reflection surface therefrom, as shown by arrows in FIGS. 26 and 27a–27c.

Specifically, the ultrasonic sensor transmits the ultrasonic waves 101 to the ground surface 100 at a position ahead of the left front wheel 112 of the car body 110. In the illustrated embodiment, it transmits the waves to the ground surface 100 at a position further ahead of a front end of the car body, and receives the reflected waves from that point. If there is a hollow 102a, 102b at such position of the ground surface 100, a bottom surface of the hollow 102a, 102b becomes a reflection surface. Therefore, the distance sensor 161 receives reflected waves from the bottom surface of the hollow 102a, 102b and outputs a signal corresponding to a distance therebetween for measuring this distance.

The present embodiment uses an LED controller 135 having the same structure as that of the seventh embodiment and which functions in the same way. On the other hand, the detected position by the distance sensor 161 is further forward from the front end of the car body 110. Therefore, the reference value and the thresholds L, M and H are set in accordance with the distances from the sensor 161 to such reflection surfaces (i.e., ground surface 100 or bottom surface of the hollow). The warning indicator 132 is lit by flashes of a fixed color in accordance with the flowchart of FIG. 20 baesed on the reference value and the thresholds L, M and H, thereby notifying the driver of the position of the car relative to the ground.

Specifically, as in the seventh embodiment, the control means 135 stores a reference distance between a position of the distance sensor 161 and the ground surface 100. It also stores smallest, medium and largest distance thresholds L, M and H, respectively, corresponding to distances from the sensor 161 to the depression in the ground and the hollows 102a, 102b. Namely, the control circuit 135 stores a distance from the distance sensor 161 to the ground surface 100 as a reference value. It stores a distance from the distance sensor 161 to a bottom surface of the depression (not shown), which has such a small depth so as to be merely an irregular ground surface, as a smallest distance threshold L. It stores a distance from the distance sensor 161 to the bottom surface of the hollow 102a, which has such a depth such that the car wheel can get over it, as a medium distance threshold M. It stores a distance from the distance sensor 161 to the bottom surface of the hollow 102b, which has such a depth such that the car wheel cannot get over it and will remain trapped therein, as the largest distance threshold H. Then, the LED controller 135 computes the distance from the sensor 161 to the ground surface 100 or the bottom surface of the hollow 102a, 102b based on the output from the distance sensor 161. Thereafter, it compares a computed value with the smallest threshold L, medium threshold M and largest threshold H, and controls light emission of the LED lamps 133 depending on a result of such comparison. Then, the hollow 102a, 102b is detected and its distance is computed in accordance with the flowchart shown in FIG. 20. Thereafter, the warning indicator 132 is lit by flashes of a fixed color, such as red, according to the computed result, thereby notifying the driver of the depression.

On the other hand, the approach warning indicator on the door mirror 140 detects the hollow 102a, 102b, such as a gutter, at the side of the left front wheel 112 and computes the depth as in the eighth embodiment. It controls the warning indicator 132 to emit flashes of a fixed color light, such as red, according to the computed result, thereby visually informing the driver of the hollow.

Thus, in the present embodiment, the driver is notified of not only the hollow 102a, 102b at the side of the left front wheel 112, but also the hollow 102a, 102b ahead of the car body 110, by seeing both the warning indicator 152 on the door mirror 140 and warning indicator 132 on the auxiliary mirror.

As shown in FIG. 27a, if there is a hollow 101b or a gutter in front of the car when the car is moving, the hollow could be avoided by proper steering operation. Then, when the car comes to a position behind the hollow 102b, the distance sensor 161 on the auxiliary mirror 120 detects the hollow 102b. Thereafter, the LED controller 135 judges an existence and a depth of the hollow 102b, thereby flashing the warning indicator 132 in red and notifying the driver of the hollow. In this embodiment, the detecting point of the distance sensor 151 on the door mirror 140 lies forward of the contact point of the left front wheel 112 with the ground surface 100. Therefore, the driver can drive the car further ahead at a slow speed after the warning indicator 132 flashes red. Then, the driver can stop the car when the distance sensor 151 and the LED controller 135 on the door mirror 140 detects the hollow 102b and the warning indicator 152 flashes red. Thus, the driver can get close to the hollow 102b without dropping the wheel therein.

In the case of parking the car at the right side of the hollow 102b in parallel therewith, when the car comes to a position behind the hollow 102b by a fixed distance at the time of moving at an angle relative thereto, the distance sensor 161 on the auxiliary mirror 120 detects the hollow 102b. Then, the LED controller 135 judges the existence and a depth of the hollow 102b, thereby flashing the warning indicator 132 in red to warn the driver. At this time, the driver steers the car to the right and avoids dropping the left front wheel 112 into hollow 102b . Moreover, if the driver continues driving the car in the same direction at a low speed to approach the hollow 102b substantially parallel thereto, the distance sensor 151 and the LED controller 155 on the door mirror 140 detects the hollow 102b, thereby flashing the warning indicator 152 in red. At this time, both the warning indicator 132 on the auxiliary mirror 120 and the warning indicator 152 on the door mirror 140 flash red. Thus, the driver can stop approaching to the hollow 102b and prevent the wheel from dropping therein.

The present embodiment has advantages, in addition to the effects or advantages of the seventh and eighth embodiments, that the driver is informed of the hollow 102a, 102b or can know its relative position, at the side of the car opposite to his or her seat, through the warning indicator 152 on the door mirror 140 without having to look away from the vehicle surroundings, which are observed through the auxiliary and door mirrors, for example. Moreover, the driver is informed of the hollow 102a, 102b or can know its relative position ahead of the car and opposite to his or her seat through the warning indicator 132 on the auxiliary mirror 120. Namely, it is difficult for the driver to see and know correctly how far or where such a gutter or hollow is. In this embodiment, since the warning indicators 132, 152 are placed at the auxiliary mirror 120 and the door mirror 140 opposite the driver's seat, the driver can easily notice the position of such hollows and perform steering operations more precisely. Particularly, even if there is a gutter or hollow 102a, 102b at the opposite side to the driver's seat in parking the car in parallel to the gutter, the driver can make the car approach the gutter while recognizing the distance through the warning indicators 132, 152. So, the driver is permitted to park the car very close to the gutter or hollow.

Moreover, the driver can recognize the hollows 102a, 102b at the side of the car as well as ahead of the car at the same time, by seeing the indicators 132, 152 at once, so that an accident such as dropping of wheel, contact or collision of the car is prevented more efficiently. For example, in the case of parking the car in parallel to the gutter, the driver will move the car forward in at an angle to the gutter and steer the car parallel to the gutter. Then, at first, the distance sensor 161 on the auxiliary mirror 120 detects the gutter, that is located ahead of the car in its inclined state. Thereafter, when the car becomes parallel to the gutter, the distance sensor 151 on the door mirror 140 detects the gutter that is located at the side of the car at that time. As a result, the driver can be notified of the gutter at any time through the indications of the indicators 132, 152, not only in case of parking the car aside the gutter while keeping it nearly parallel to the gutter from the beginning to the end, but also in case of parking the car aside the gutter after moving it in the slanting direction. Therefore, an accident like the dropping of the wheel into the gutter can be avoided more efficiently, and more correct and smooth parking operation is possible.

Figure 28:
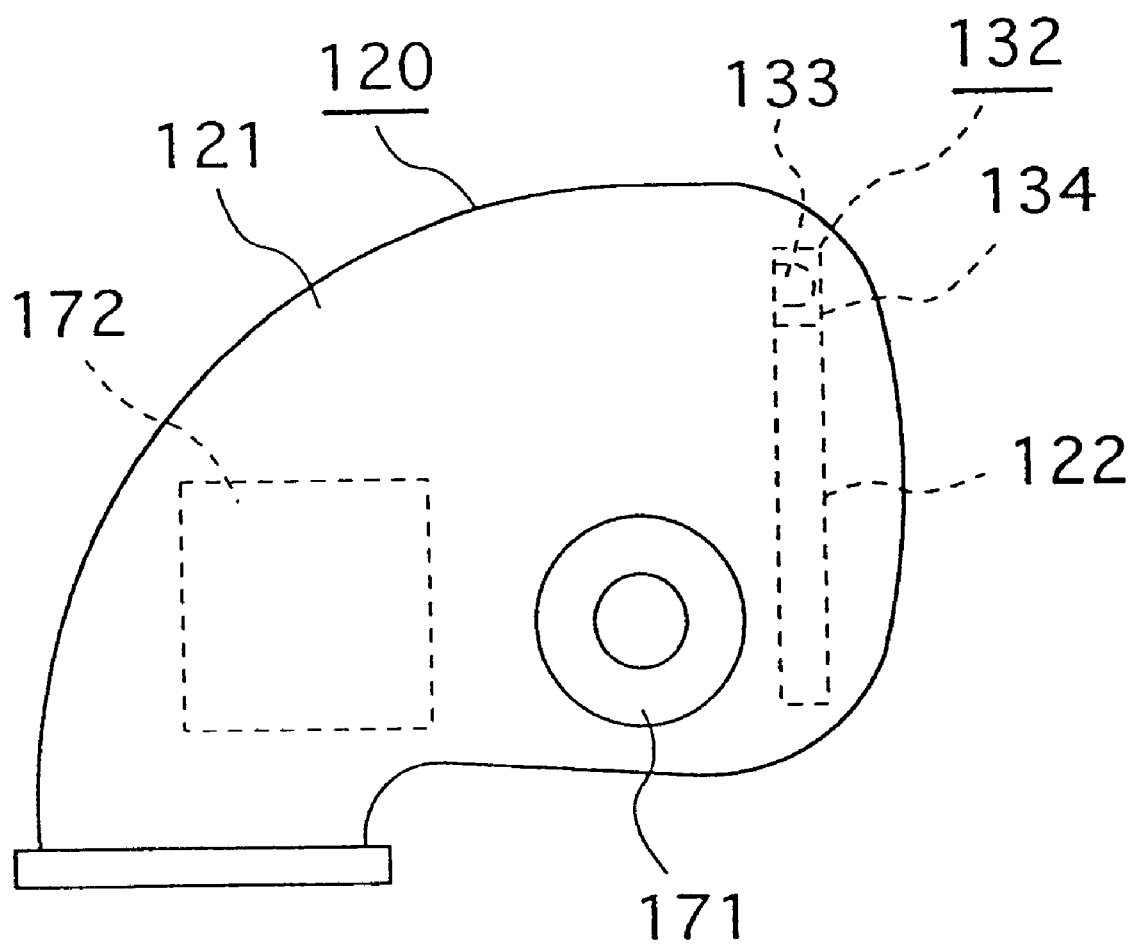
FIG. 28 is a side view showing a door mirror having an approach warning indicator according to a tenth embodiment of the information indicator of the invention.
Figure 29:
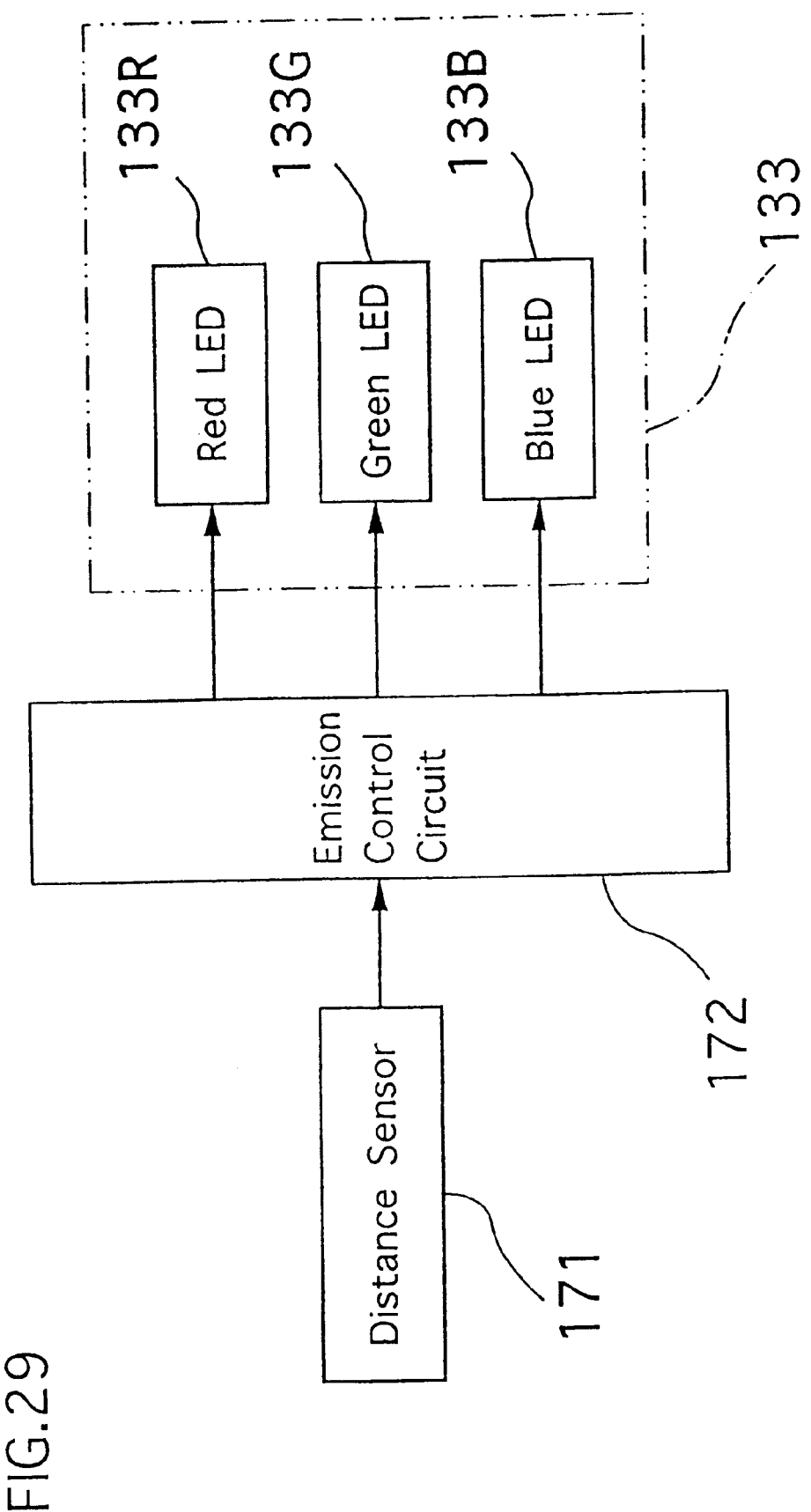
FIG. 29 is a block diagram showing an electric structure of the tenth embodiment of the inventive approach warning indicator.

FIG. 28 is a side view showing a door mirror having an approach warning indicator according to a tenth embodiment of the information indicator of the invention. FIG. 29 is a block diagram showing a schematic electric structure of the tenth embodiment of the inventive approach warning indicator.

Referring to FIGS. 28 and 29, though each of the above embodiments of the approach warning indicators detects the hollow 102a, 102b, such as a gutter, this embodiment of approach warning indicator detects an object like an obstacle at the side of the car body 110. Namely, The present embodiment of approach warning indicator includes a distance sensor 171, the warning indicator 132 having the LED lamps 133 and the lens 134, and an LED controller 172. All these elements are disposed integrally on the door mirror 140, while some of them are accommodated in the housing 121 of the auxiliary mirror 120. The distance sensor 171 is arranged on the auxiliary mirror 120 and detects an object at the left side of the car body 110, thereby outputting a signal corresponding to the distance of the object from the car. The distance sensor 171 is an ultrasonic sensor of a similar structure as the distance sensor 131 of the seventh embodiment. The ultrasonic sensor is fitted inside the housing 121 so that the ultrasonic vibrator is exposed at a lower part of an outer surface of the auxiliary mirror 120. The distance sensor 171 transmits the ultrasonic waves 101 leftward of the car body 110, while receiving reflected waves from the object located leftward of the car so as to output a signal corresponding to the distance to the object therefrom for measuring this distance.

The LED controller 172 is accommodated inside the housing 121 and controls the LED lamps 133, according to an output of the distance sensor 171. Namely, as shown in FIG. 29, the LED controller 172 has an input connected to the distance sensor 171, and computes the distance between the car body 110 and the object at the left side of the car body 110 based on the output of the distance sensor 171. The LED controller 172 has an output connected to the red, green and blue LEDs 133R, 133G and 133B of the LED lamp 133 to cause the lamp to emit a preset desired color of light according to the output of the distance sensor 171.

Specifically, the LED controller 172 has a similar structure to that of the LED controller 135 of the seventh embodiment. The LED controller 172 stores three threshold values defining the distance from a position of the distance sensor 171 on the car to the object serving as the reflection surface: a smallest distance threshold L, a medium distance threshold M and a largest distance threshold H. Then, the LED controller 172 computes the distance from the sensor 171 to the object based on the output from the distance sensor 171. Thereafter, it compares a computed value with the smallest threshold L, medium threshold M and largest threshold H, and controls light emission of the LED lamps 133 depending on a result of such comparison. Other structures are nearly same as the control circuit 135 of the seventh embodiment and it functions in the same manner, too.

An operation of the present embodiment of the approach warning indicator is described hereafter.

Figure 30:
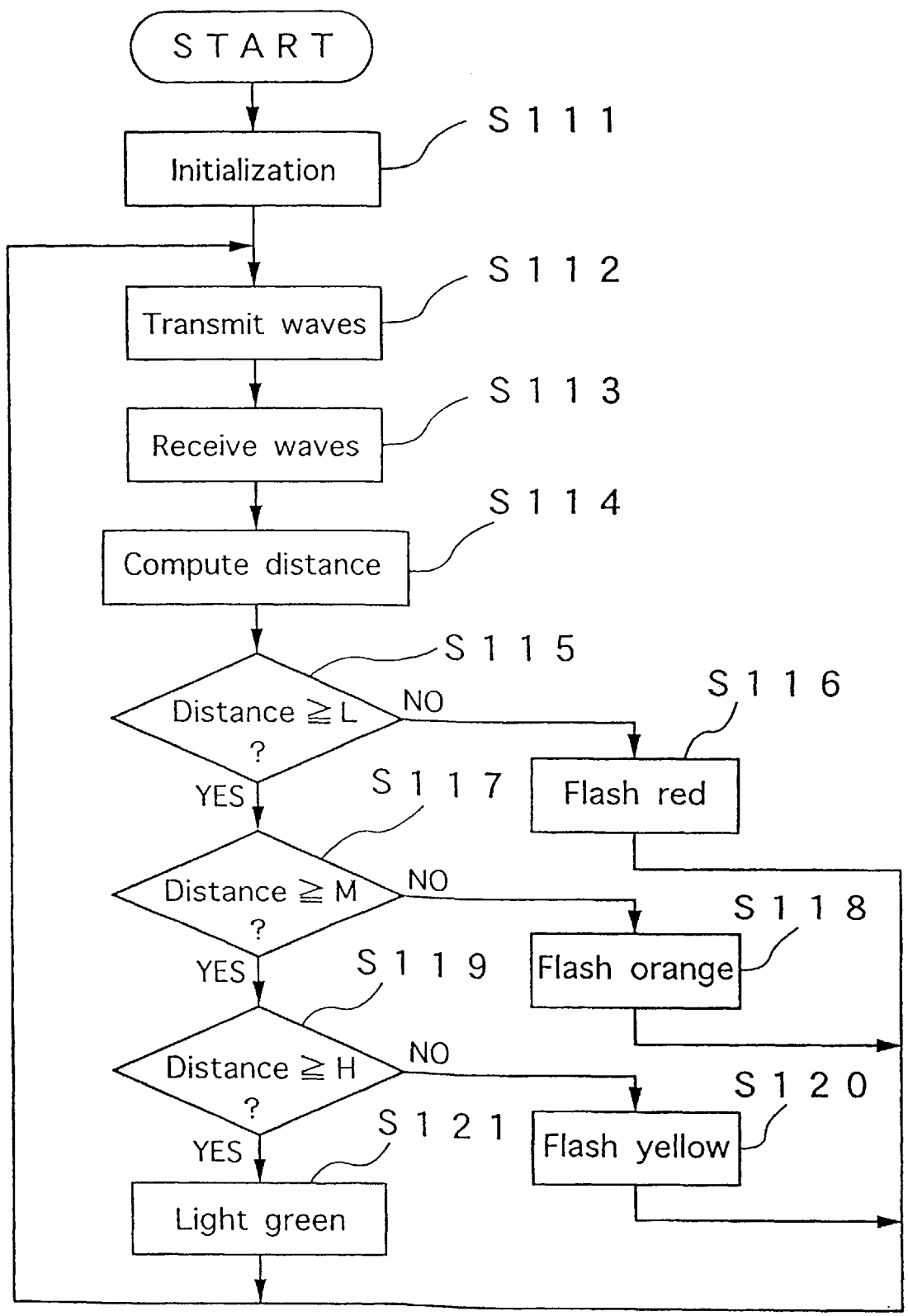
FIG. 30 is a flowchart showing an overall operation of the tenth embodiment of the inventive approach warning indicator.

FIG. 30 is a flowchart showing an overall operation of the tenth embodiment of the inventive approach warning indicator.

In this embodiment, the LED controller 172 is supplied with power when the car speed is 10 km/h or less, and the following program is executed.

If power is supplied to the distance sensor 171, LED lamps 133, LED controller 172 and so on, the LED controller 172 is initialized in step 111. Then, the distance sensor 171 transmits ultrasonic waves 101 for a predetermined period of time, i.e., a few microseconds or less, in step S112. The distance sensor 171 receives and detects reflected ultrasonic waves 101 after a fixed period of time in step S113. Thereafter, in step S114, the LED controller 172 computes a distance from the sensor 171 to the reflection surface if such a surface is located at the left side of the car body 110, based on the delay in transmitting and receiving the ultrasonic waves 101. In step S115, it is decided if the computed distance is not less than the smallest distance threshold L or not. If it is decided that the distance is less than the smallest threshold L, the red LED 133R is operated so that the LED lamp 133 emits flashes of red light, in step S116, thereby flashing the warning indicator 132 in red through the lens 134. Thus, the driver is visually notified by the red flashes of the warning indicator 132 that an object or an obstacle exists near the car that the car could possibly contact or collides with on its leftside.

If it is determined that the computed distance in step S115 is not less than the smallest threshold L, the execution proceeds to step S117. In step S117, it is decided if the computed distance is not less than the medium distance threshold M or not. If it is decided that the distance is less than the medium threshold M, the red LED 133R and the green LED 133G are lit while adjusting their duty ratio, in step S118, so that the LED lamp 133 emits flashes of orange light, thereby flashing the warning indicator 132 in orange through the lens 134. Thus, the driver is visually notified by the orange flashes of the warning indicator 132 that an object or an obstacle exists near the car that should be carefully observed.

If it is determined that the computed distance in step S117 is not less than the medium threshold M, the execution proceeds to step S119. In step S119, it is decided if the computed distance is not less than the largest distance threshold H or not. If it is decided that the distance is less than the largest threshold H, the red LED 133R and the green LED 133G are lit while adjusting their duty ratio, in step S120, so that the LED lamp 133 emits flashes of yellow light, thereby flashing the warning indicator 132 in yellow through the lens 134. Thus, the driver is visually notified by the yellow flashes of the warning indicator 132 that there exists an object or an obstacle exists that the driver should pay attention to on its leftside.

If it is decided in step S119 that the computed distance is not less than the largest threshold H, the green LED 133G is operated to emit flashes of green light in step S121 so that the LED lamp 133 emits green flashes of light. Thus, the driver is visually notified by the green flashes of the warning indicator 132 that there are no objects nor obstacles on the leftside of the car body 110.

In the tenth embodiment, the distance sensor 171 detects the object or the obstacle at the leftside of the car and measures the distance during driving or the like, thereby changing the output according to the distance. Moreover, the control circuit 172 controls the LED lamps 133 to change the indicating state of the warning indicator 132 according to the output from the distance sensor 131, thereby indicating the warning toward the car interior. At this time, the driver can get an information of the object or obstacle beside the car, e.g., a guardrail, from a change in the indicating state of the warning indicator 132. As a result, the driver can be visually and effectively given information of the object, such as the guardrail beside the car, during driving without having to look away from the vehicle surroundings. Then, the driver can recognize the distance between the object and his or her car, to prevent the car from contacting or colliding with the object. Thus, the driver can make a handling operation like parking, a right or left turn or the like, in a smooth and correct way. Particularly, in case where there is an object, such as the guardrail or a curb, at the leftside of the car when parking the car, or in case where there is an object, such as a fence, when turning right or left the car on a narrow street, the driver can make the parking or turning operation in a correct and smooth way, while keeping the car from contacting or colliding with the object.

Moreover, since the distance sensor 171, LED controller 172 and warning indicator 132 are integrally disposed on the auxiliary mirror 120, the same advantages can be obtained as the seventh embodiment.

Furthermore, in this embodiment, the LED lamps 133 can emit any color of light as in the seventh embodiment. Namely, the distance between the car and the object is computed based on the output of the distance sensor 171, and the LED lamps 133 are lit in one of the four colors (red, orange, yellow and green) or five colors (those four colors plus blue) depending on the distance. Accordingly, the LED controller 172 changes the light color of the LED lamps 133 depending on the output of the distance sensor 171. For example, it changes the light color from green, yellow, orange and red in turn according to the distance from the car to the object. Thus, a variety of light colors can be provided to transmit more kinds of information to the driver.

In addition, the driver can recognize and be notified of the object located at the side of the car and opposite to his or her seat by seeing the warning indicator 132. Namely, it is difficult for the driver to see and know correctly how far or where such an object like a guardrail or fence is relative to the car. In this embodiment, because the warning indicator 132 is placed at the auxiliary mirror 120 at the opposite side to the driver's seat, the driver can easily notice the position of such objects and perform exactly and smoothly steering operations such as right or left turn without having to look at a dashboard warning, thereby taking his eyes off the road. Particularly, even if there is an object like a guardrail at the opposite side to the driver's seat during parking of the car in parallel to the road, the driver can make the car approach the object while recognizing the distance through the warning indicator 132. As a result, the driver is permitted to park the car very close to the object.

Figure 31:
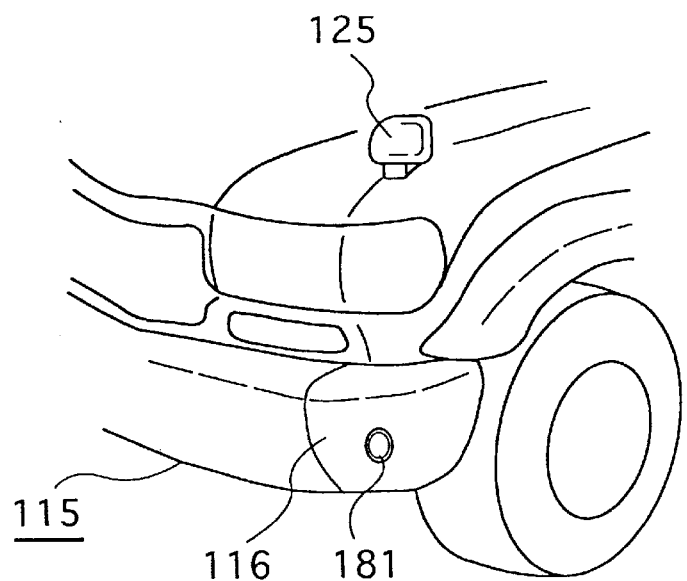
FIG. 31 is a perspective view showing a left front part of a car equipped with an approach warning indicator according to an eleventh embodiment of the information indicator of the invention.
Figure 32:
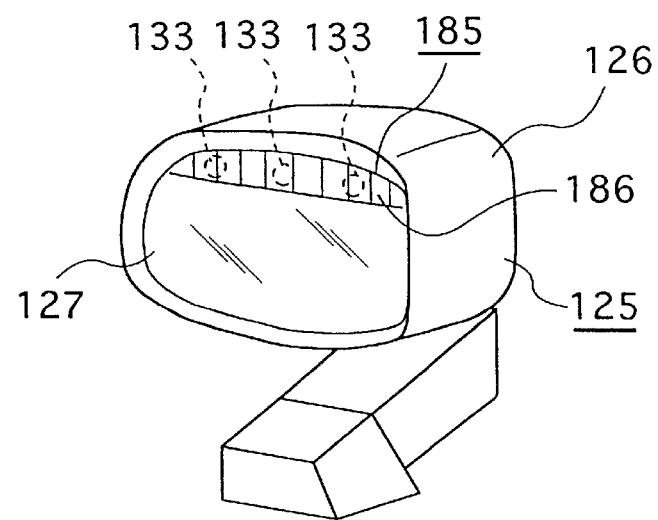
FIG. 32 is a perspective view showing an auxiliary mirror equipped with a warning indicating part and a control circuit of the eleventh embodiment of the inventive approach warning indicator.

FIG. 31 is a perspective view showing a left front part of a car having an approach warning indicator according to an eleventh embodiment of the information indicator of the invention. FIG. 32 is a perspective view showing an auxiliary mirror having a warning indicating part and a control circuit of the eleventh embodiment of the inventive approach warning indicator.

The present embodiment of approach warning indicator is composed of a distance sensor 181, a warning indicator 185 and an LED controller 172 as in the tenth embodiment of the approach warning indicator. However, the present embodiment is different from the tenth embodiment in that the distance sensor 181 is fitted, not to an outside mirror, but to a corner portion of the car. Namely, as shown in FIG. 31, the distance sensor 181 is disposed on a left corner 116 of a front bumper 115, which in this embodiment is a corner opposite the drive's seat (left side in the illustrated right-hand drive car). It detects an object ahead of or at the side of the car and outputs a signal corresponding to the distance of the car to the object. The distance sensor 181 is an ultrasonic sensor of a similar structure as the distance sensor 131 of the seventh embodiment. The ultrasonic sensor is fitted to the from bumper 115 so that the ultrasonic vibrator is exposed at an outer surface of the left corner 116 of the front bumper 115. The distance sensor 181 transmits the ultrasonic waves within a zone from a position in front of the car to a position at the left side of the car. Then, it receives reflected waves to output a signal corresponding to a distance of the object from the car.

As shown in FIG. 32, the warning indicator 185 is disposed on a housing 126 of an auxiliary mirror 125, which is located opposite the driver's seat (left side) along an upper edge of a mirror 127. The warning indicator 185 is constructed in the same manner as the seventh embodiment of warning indicator 132 and has a plurality of LED lamps 133 arranged at fixed intervals along its length so that the LED lamps 133 can emit light toward the car interior. A lens 186 covers an emitting side (car interior side) of the LED lamps 133. The LED lamps 133 and the lens 186 of this embodiment have substantially the same structures as the LED lamps 133 and the lens 134 of the seventh embodiment and function in the same manner. Moreover, the emission control circuit of this embodiment is similar to the LED controller 172 of the tenth embodiment, though not shown. It is accommodated inside the housing 126 and controls the LED lamps 133 of the warning indicator 185 to emit all colors of light and selectively radiate a preset desired color of light among them.

The present embodiment of approach warning indicator controls the light emission of the LED lamps 133 of the warning indicator 185, e.g., according to the flowchart shown in FIG. 30 by the LED controller 172 that stores the same program as that of the tenth embodiment. Then, it illuminates the warning indicator 185 in a desired color, such as red, orange and yellow, in accordance with the distance L, M, H between the car and an object located ahead or at the left side of the car. Thus, the driver is visually notified whether or not there is an obstacle and how far it is from the car to the obstacle.

In the present embodiment of the approach warning indicator, the warning indicator 185 and the LED controller may be provided on a fender mirror at the opposite side to the driver's seat. Namely, the warning indicator 185 and the control circuit may be located in desired places as long as they are disposed on at least one of the fender mirror or the auxiliary mirror at the opposite side to the driver's seat of the car. Moreover, in the case of left-hand drive cars, the distance sensor 181 is located at the right corner, while the warning indicator 185 and the control circuit are disposed on the right fender mirror or auxiliary mirror. The distance sensor 181 may be located at positions other than the corner of the front bumper 115, as long as it is placed generally at a corner portion of the car at the opposite side to the driver's seat and readily observed by the driver without requiring the driver to look away from the vehicle surroundings during operation of the vehicle.

In the eleventh embodiment, the distance sensor 181 detects the object or the obstacle ahead of or at the side of the corner 116, which is located at the opposite side to the driver's seat, and measures the distance during driving or the like, thereby changing the output according to the distance. Moreover, the control circuit controls the LED lamps 133 to change the indicating state of the warning indicator 185 according to the output from the distance sensor 181, thereby indicating the warning toward the car interior. At this time, the driver can get information about the object or obstacle facing the left front or left side of the car and opposite to the driver's seat, e.g., a guardrail, from a change in the indicating state of the warning indicator 185, by seeing the fender mirror or auxiliary mirror which is located at the opposite side to the driver's seat and within the sight at the time of a left turn in case of the right-hand drive car. Particularly, the fender mirror or auxiliary mirror at the opposite side to the driver's seat is positioned on an imaginary line connecting the driver and the corner 116. Therefore, the warning indicator 185 performs effectively its warning function and the warning indication is reliable. As a result, the driver can be visually and effectively given the information of the object, such as the guardrail, ahead of or beside the car at the opposite side to the driver's seat, during driving without requiring the driver to look away from the vehicle surroundings, which are observed either directly through a vehicle windshield or through a mirror. Then, the driver can recognize the distance between the object and his or her car, to prevent the car from contacting or colliding with the object. Thus, the driver can make a handling operation like parking or a left turn or the like in a smooth and correct way. In addition, in a case where there is an object, such as the guardrail or a curb, at positions facing the left front part or left side part of the car when parking the car, or in a case where there is an object, such as a fence, when turning left the car on a narrow street, the driver can make the parking or turning operation in a correct and smooth way, while keeping the car from contact or collision with the object.

Moreover, since the LED controller and the warning indicator 185 are disposed on the fender mirror or auxiliary mirror, these items can be made in one body so that there is no need for providing a special space or member for fitting them to the car. Thus, total costs can be reduced and the overall structure can be made compact and easily installed. Furthermore, because the distance sensor 181 is separately provided on the corner 116 of the car body 110, the accommodating space for the distance sensor 181 is not limited. Thus, a variety of sensors can be used as desired. In addition, the distance sensor 181 is positioned at the corner 116, so that, if the ultrasonic sensor is used as the distance sensor, there is no object nor element around the sensor that limits the radiation of the ultrasonic waves. As a result, it is possible to detect objects in a wider area and to measure the distance from the car and the object ahead of or at the side of the car body 110 more correctly.

Figure 33:
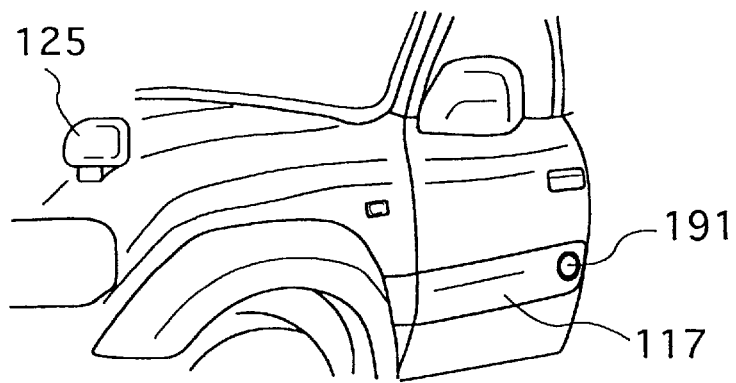
FIG. 33 is a perspective view showing a left front part of a car assembled with an approach warning indicator according to a twelfth embodiment of the information indicator of the invention.

FIG. 33 is a perspective view showing a left front part of a car assembled with an approach warning indicator according to a twelfth embodiment of the information indicator of the invention.

The present embodiment of approach warning indicator is composed of a distances sensor 191, the warning indicator 185 and the LED controller as in the eleventh embodiment. However, it is different from the eleventh embodiment in that the distance sensor 191 is mounted not on the corner 116 of the bumper 115 but on a side molding 117. Namely, as shown in FIG. 33, the distance sensor 191 is disposed on nearly a center of the car in the longitudinal direction of the side molding 117 (near a rear end of the front door 114) at a side opposite the driver's seat (left side in the illustrated right-hand drive car). It detects an object at the left side of the car and outputs a signal corresponding to the distance of the car from the object. The distance sensor 191 is made of an ultrasonic sensor having a similar structure as the distance sensor 131 of the seventh embodiment. The ultrasonic sensor fits in the side molding 117 so that the ultrasonic vibrator is exposed at an outer surface of the side molding 117. The distance sensor 191 transmits the ultrasonic waves leftward and receives reflected waves from an object, if such an object exists, to output a signal corresponding to the distance of the object from the car.

In this embodiment, the auxiliary mirror 125 has generally the same construction as that of the eleventh and accommodates therein the warning indicator 185 and the emission control circuit also having generally the same structure so as to control the light emission of the LED lamps 133. Namely, the LED controller of this embodiment is similar to the LED controller 172 of the tenth embodiment, though not shown. It is accommodated inside the housing 126 and controls the LED lamps 133 of the warning indicator 185 to emit all colors of light and selectively radiate a preset desired color of light among them.

The present embodiment of approach warning indicator controls the light emission of the LED lamps 133 of the warning indicator 185, e.g., according to the flowchart shown in FIG. 30, by the LED controller that stores the same program as that of the tenth embodiment. Then, it illuminates the warning indicator 185 in a desired color, such as red, orange and yellow, in accordance with the distance L, M, H between the car and the object at the left side of the car. Thus, the driver is visually notified whether or not there is an obstacle and how far it is from the car to the obstacle.

While, in this embodiment, the distance sensor 191 is provided on the side molding 117 whereas the warning indicator 185 and the LED controller are provided on the auxiliary mirror 125 at the side opposite to the driver's seat, they may be disposed on the driver's seat side. The warning indicator 185 and the LED controller may be provided on the door mirror or fender mirror in place of the auxiliary mirror 125. Still, the distance sensor 191, warning indicator 185 and LED controller are preferably provided on one of the door mirror, fender mirror and auxiliary mirror opposite the driver's seat, since it is difficult for the driver to correctly recognize the obstacle on that side. Therefore, in a left-hand drive car, the distance sensor 191 is provided on the right side molding while the warning indicator 15 and the LED controller are disposed on the right outside mirror such as the door mirror, fender mirror or auxiliary mirror.

In the twentieth embodiment, the distance sensor 191 detects the object or the obstacle proximate to the side associated with the side molding 117 and measures the distance during driving or the like, thereby changing the output according to the distance. Moreover, the control circuit controls the LED lamps 133 to change the indicating state of the warning indicator 185 according to the output from the distance sensor 191, thereby providing a warning signal toward the car interior. At this time, the driver can get information of the object or obstacle facing the left side of the side molding 117 of the car, e.g., a guardrail, from a change in the indicating state of the warning indicator 185. As a result, similar effects and advantages are obtained as in the eleventh embodiment.

Because the distance sensor 191 is disposed on the side molding 117 separately from the other elements, the accommodating space for the distance sensor 191 is not limited. Thus, a variety of sensors can be used as desired. In addition, the distance sensor 191 is positioned at the side molding 117 which is located at the side end of the car body 110, so that there is no such object nor element around the sensor that limits or disturbs the detection of the distance sensor 191. Then, it is possible to detect objects over a wider area to measure the distance from the car to the object at the side of the car body 110 more correctly.

Figure 34:
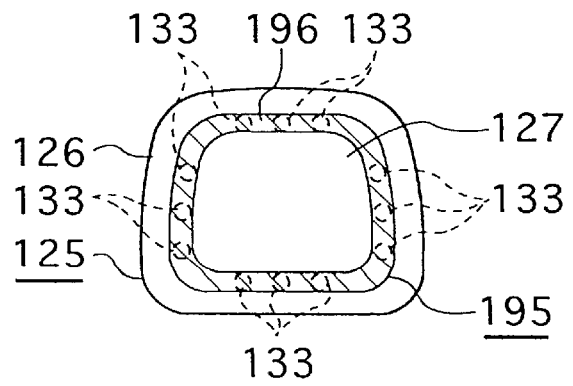
FIG. 34 is a front view showing a warning indicating part of an approach warning indicator according to a thirteenth embodiment of the information indicator of the invention.

FIG. 34 is a front view showing a warning indicating part of an approach warning indicator according to a thirteenth embodiment of information indicator of the invention.

This embodiment is different from each of the above embodiments in the warning indicator 195. Namely, as shown in FIG. 34, the warning indicator 195 is disposed on the housing 126 of the auxiliary mirror 125, while its main part is accommodated inside the housing 126. The warning indicator 195 extends substantially along the whole periphery of the mirror 127 in generally a square ring shape. The warning indicator 195 is constructed in the same manner as the seventh embodiment of warning indicator 132 and has a plurality of LED lamps 133 arranged at fixed intervals along its length so that the LED lamps 133 emit light toward a car interior. A lens 196 covers an emitting side (car interior side) of the LED lamps 133. The LED lamps 133 and the lens 196 of this embodiment have substantially the same structures as the LED lamps 133 and the lens 134 of the seventh embodiment and function in the same manner.

This embodiment of warning indicator 195 can be used in each above embodiment in place of the warning indicator 132, 152, 185. Then, it may be structured such that LED controller controls the LED lamps 133 of the warning indicator 195 to emit all colors of light and selectively radiate a preset desired color of light among them, in accordance with the output of the distance sensor 131, 151, 161, 171, 181, 191.

Moreover, the warning indicator 195 may be applied to another auxiliary mirror such as the auxiliary mirror 120 in the seventh embodiment or to the door mirror 152 in the eighth embodiment or any desired outside mirror.

The warning indicator 195 constructed as discussed above is arranged on the whole periphery of the mirror 127, so that the visibility is improved.

Figure 35:
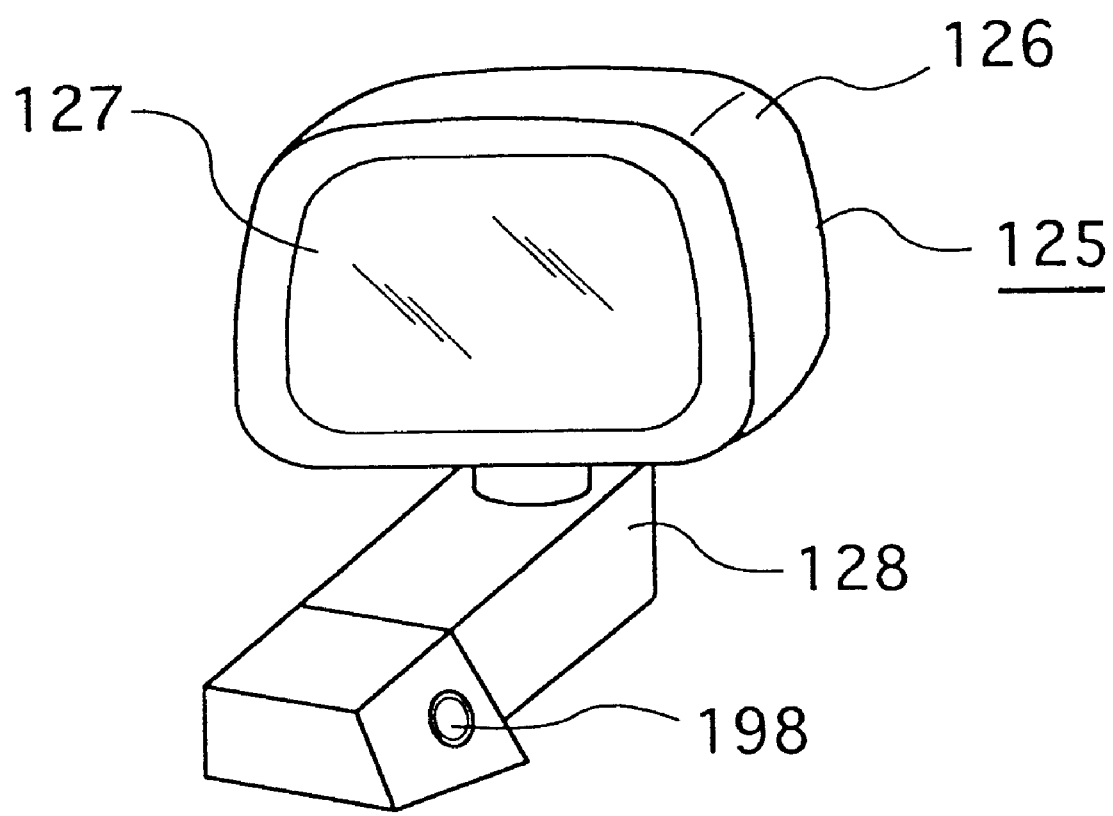
FIG. 35 is a front view showing a warning indicating part of an approach warning indicator according to a fourteenth embodiment of information indicator of the invention.

FIG. 35 is a front view showing a warning indicating part of an approach warning indicator according to a fourteenth embodiment of the information indicator of the invention.

This embodiment is different from each of the seventh to twelfth embodiments in that the warning indicator is similar to that in the thirteenth embodiment. However, as shown in FIG. 34, the warning indicator 195 is not disposed on the housing 126 of the auxiliary mirror 125 or the like, but is located at a base end of a bracket 128 of the auxiliary mirror 125. Namely, the warning indicator is composed of an LED lamp as an LED that can emit light toward the car interior.

This embodiment of LED lamp 198 can be used in each of the above embodiments, in place of the warning indicator 132, 152, 185. Then, it may be structured such that the LED controller controls the LED lamp 198 as the warning indicator to emit all colors of light and selectively radiate a preset desired color of light among them, in accordance with the output of the distance sensor 131, 151, 161, 171, 181, 191.

Moreover, the warning indicator LED lamp 198 may be applied to another bracket-like portion fitted to the body 110: a bracket of an auxiliary mirror, such as the auxiliary mirror 120 in the seventh embodiment, or a bracket of the door mirror 152 in the eighth embodiment, or brackets of any desired outside mirror.

The warning indicator composed of the LED lamp 198 constructed as above can simplify the structure and the approach warning indicator can be made compact as a whole.

The quantity of light emitted from the LED lamps 133, 153 or LED lamp 198 is set at about a medium value between a light quantity during the daytime and a light quantity during the nighttime, e.g., a value equivalent to a light quantity during the evening, on the basis of the visibility curve by the well-known Prukinje effect. An optical sensor may be additionally provided on the approach warning indicator in order to determine if it is daytime or nighttime. In this case, it is preferable to detect the light quantity at the outside of the car, since such a construction is added to improve visibility of the approach warning indicator which is located outside of the car. With such a construction added, similar effects and advantages are obtained as in the fifth or sixth embodiment.

Moreover, the distance sensor 131, 151, 161, 161, 171, 181, 191 of each of the seventh to fourteenth embodiments is preferably made of an optical sensor or other proximity sensors or switches for distance measurement, which is optimal for measuring the distance in each case. Thus, an optimal sensor having characteristics suitable for detecting the distance to a detected object can be used as the distance sensor, so that reliability of detection can be heightened.

While each of the seventh to thirteenth embodiments uses the LED lamp 133, 153, which is capable of emitting all colors of light by itself, it may provide a group of one red LED 133R, one green LED 133G and one blue LED 133b on the warning indicator 132, 152, 185. Otherwise, it may provide a group of red LEDs 133R, a group green LEDs 133G and a group blue LEDs 133B on the warning indicator 132, 152, 185. Then, the LED controller may control the LEDs 133R, 133G and 133B such that each color of the LEDs 133R, 133G and 133B may be lit by itself to emit its own single color. Moreover, the LED controller may control the LEDs 133R, 133G and 133B such that multiple LEDs 133R, 133G and 133B are lit in combination to emit mixtures of their colors. Thus, any desired color of light can be obtained. In addition, the LEDs of the warning indicator 132, 152 may be composed of an LED array which has the red LEDs 133R, green LEDs 133G and blue LEDs 133B disposed at fixed intervals in its length. In this case, any desired color of light can be obtained by lighting the LEDs 133R, 133G and 133B in combination to emit a mixed color of light. Moreover, each above embodiment does not always need three primary colors of LEDs 133R, 133G and 133B as the LED display. It may use a single LED or two or more colors of LEDs in combination.

Moreover, each above embodiment may be structured such that the LED lamps 133, 153 and the LED controller 135, 155, 172 are mounted on a printed board (not shown) into one body and such that a printed board is accommodated in the housing 121, 126, 141 of the auxiliary mirror 120, 125, 140. This modification can make the assembling work of the warning indicator 132, 152, 185, 195 easier. In this case, the distance sensor 131, 151, 161, 171 of the seventh to eleventh embodiments may be integrated on the printed board. Furthermore, the printed board with the LED lamps 133, 153 and the LED controller 135, 155, 172 mounted may be accommodated in a casing (not shown) to provide all of them into one body. Then, the casing with the printed board fitted integrally therein is accommodated in a fixed position of the housing 121, 141. Thus, the assembling work of the warning indicator 132, 152 is simplified.

In the seventh to fourteenth embodiments, the control circuit 135, 155, 172 is supplied with power when the car speed is 10 km/h or less, thereby performing the operation shown in FIG. 20 or FIG. 30. However, the LED controller 135, 155, 172 may be supplied with power by merely operating the ignition switch regardless of vehicle speed.

In the seventh and eighth embodiments, the detecting position of the distance sensor 131, 151 is a little ahead of the position at the side of the contact point of the left front wheel 112. However, it may be of another position, as long as it is possible to prevent the vehicle wheel from dropping in the hollow. For example, it may be just at the side of the contact point between the left front wheel and ground. It may be at a middle position between the position a little ahead of the contact point and the position just at the side of the contact point. Still, in consideration of a slight forward movement of the car in parking, the detecting position is preferably a little ahead of the contact point in order to prevent the wheel from dropping in the hollow 102b. Moreover, while the detecting position of the distance sensor 161 of the ninth embodiment is ahead of the car body 110, it may be located at another position, as long as it is ahead of the front wheel 112, 114 and the detecting position of the distance sensor 151 on the door mirror 140. In this case, similar effects and advantages can be obtained.

The seventh to ninth embodiments of the approach warning indicator is provided on the auxiliary mirror 120, that is disposed at the left side of the car or the left door mirror 140, in the case of a right-hand driver car. This is because the hollow 102a, 102b near the left front wheel 112 is difficult for the driver to see and such hollow should be detected. However, in the case of a left-hand drive car, to the contrary, the approach warning indicator is preferably provided on the auxiliary mirror 120, that is disposed at the right part of the car or the right door mirror 140 so that the driver can easily recognize the hollow 102a, 102b near the right front wheel 113. In this case, the sensor transmits and receives the ultrasonic waves 101 or the like to and from a position ahead of or at the side of the right front wheel 113. Similarly, the tenth embodiment of the approach warning indicator is provided on the auxiliary mirror 120 that is disposed at the left part of the car in the case of a right-hand driver car to detect the object at the left side of the car which is difficult for the driver to see. However, in the case of a left-hand drive car, to the contrary, the approach warning indicator is preferably provided on the auxiliary mirror 120 that is disposed at the right side of the car to detect the object at the right side of the car. In this case, the sensor transmits and receives the ultrasonic waves 101 or the like rightward and receives them from the right position. Moreover, the tenth embodiment of approach warning indicator may be provided on the door mirror 140. In addition, the fender mirror may be used as the outside mirror on which the eighth to tenth embodiments of the approach warning indicator is provided.

Moreover, the warning indicator 132, 152, 185, 195 in the seventh to twelfth embodiments need not be joined integrally to the mirror 122, 126 of the auxiliary mirror 120, 125 or the mirror 142 of the door mirror 140. Instead, it may be disposed on the housing 121, 126 or the housing 141 so that only the mirror 122, 127 or the mirror 142 can be tilted.

Each of the seventh to fourteenth embodiments is structured in such a manner to detect the hollow or the object on the side of the car opposite to the driver's seat. However, they may be used to detect the hollow or the object on the driver's seat side except in the eleventh embodiment. Moreover, they may be provided on both sides, the driver's seat side and the passenger's side. In these case, it is possible to detect the hollow 102a, 102b or the object, which is located within a vehicle blind spot and therefore, hard to recognize, even from the driver's seat. Thus, the driver can carry out a parking operation more smoothly and correctly.

In addition, while, in each of the seventh to fourteenth embodiments, the emission LED controller is provided on the outside mirror, it may be provided on a part of the car other than the outside mirror.

Figure 36:
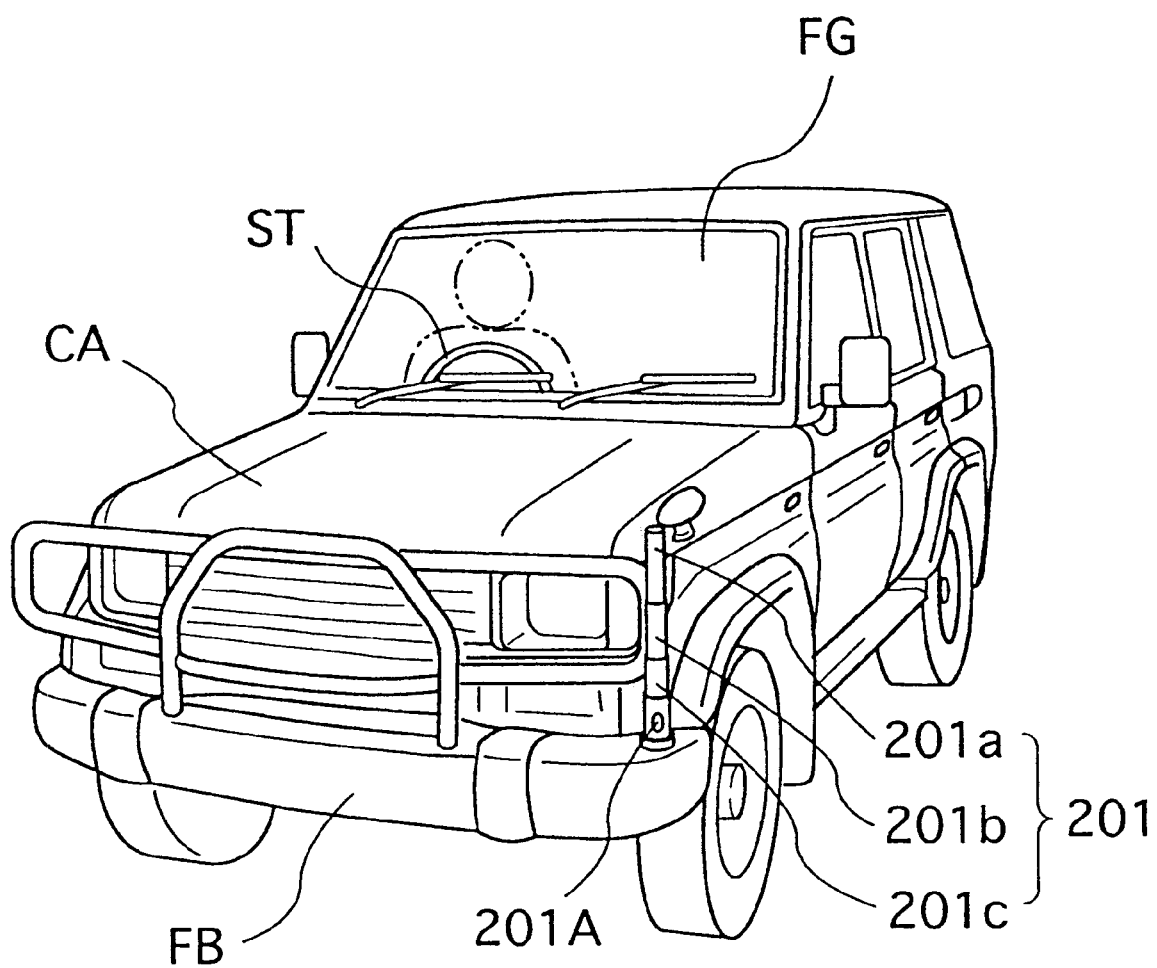
FIG. 36 is a perspective view showing a car mounted with an abnormal approach warning indicator according to a fifteenth embodiment of information indicator of the invention.

FIG. 36 is a perspective view showing a car mounted with an abnormal approach warning indicator as a fifteenth embodiment of the information indicator of the invention. FIG. 37a, is a sectional view showing the fifteenth embodiment of the inventive abnormal approach warning indicator. FIG. 37b is a partial front view of an upper part of the fifteenth embodiment of the inventive abnormal approach warning indicator.

Referring to FIG. 36, this embodiment of an abnormal approach warning indicator is disposed at a left corner of a front bumper FB of a car body CA. It is structured such that the driver can see an upper part thereof through a front windshield FG while gripping a steering wheel ST. Thus, the driver need not look away from the vehicle surroundings to observe the indicator.

Referring to FIGS. 36, 37a, and 37b, in this embodiment, a corner pole 201 has a telescopic structure that it can be extended in three stages. It is set at a fixed height or length, or used to fit a flag or the like, as desired. The corner pole 201 has an upper tube 201a, a middle tube 201b and a lower tube 201c. The upper tube 201a has one end sealed and closed and is stretched to the uppermost position of the corner pole 201. The middle tube 201b has both ends opened and is stretched to the middle position of the corner pole 201. The lower tube 201c has its lower end closed and sealed by a structure described later and is positioned at the lowermost part of the corner pole 201. The upper tube 201a, middle tube 201b and lower tube 201c themselves have well-known structures. A base end of the lower tube 201c is made into a container for accommodating a distance sensor 210. Particularly, in this embodiment, the lower part of the lower tube 201c is formed thicker than an upper portion thereof in order to accommodate the distance sensor 210 and an LED controller 220 for controlling an output of the distance sensor 210 for obtaining a desired light emission described later. The distance sensor 210 has an ultrasonic vibrator 211 and a measuring circuit 212 for measuring a distance from the vibrator 210 to an object. An output of the measuring circuit 212 is input into the LED controller 220. The emission control circuit 220 is composed of a printed board 216 on which is mounted electronic parts for controlling the light emission of an LED 222 according to a measured result by the measuring circuit 212. The LED 222 has a light emitting part at generally the center of the circular sectional base end of the lower tube 201c. A convex lens 214 is disposed so as to face the LED 222. Lens 214 leads the light emitted from the LED 222 to a leading end of the stretched upper tube 201a while altering the light into parallel rays or a light beam more converged than the parallel rays. Thus, the LED 222 is positioned near the center of the base end of the lower tube 201c, while the convex lens 214 faces to the LED 222. Thereby, the light beam of parallel rays or more converged light beam can be transmitted to the uppermost end of the stretched upper tube 201a. With this, an optical coupling loss lessens thereby compensating for the stretchable structure of the corner pole 201. The distance sensor 210 is disposed so as to be capable of detecting the distance between it and an object at the left side of the car body CA.

The distance sensor 210, LED controller 220, LED 222, convex lens 214 are integrally and air-tightly packed or molded by a synthetic resin. Its outline is made into such a shape as to be able to be inserted and closely fitted into the base end of the lower tube 201c.

The ultrasonic vibrator 211 is covered by an interposed buffering member (not shown) in its housing so that the ultrasonic vibration applied to the printed board 216 and LED 222 and the like is reduced.

The uppermost end of the upper tube 201a is sealingly formed integrally with a side wall of the upper tube 201a. It has an elliptical hole or slot 201B of about 20 mm–30 mm extending vertically at a position approximately 10 mm lower than the upper most end as shown in FIG. 37b. The slot 201B is disposed so as to face the driver when the corner pole 201 is attached to the car body CA. A diffusing lens 230 is disposed in the upper tube 201a so that its surface touches a part of the inner surface, facing the slot 201B, of the upper tube 201a. The diffusing lens 230 has a cylindrical shape with one end having a slantingly cut. The diffusing lens 230 is made of a synthetic resin and conducts the light from the LED 222 to the slot 201B. The slantingly cut surface of the diffusing lens 230 is roughened by graining or cutting, and a reflecting surface 231 is formed by a white coating or by making an irregular reflection surface on lens 230. Thus, it reflects the light from the LED 222 to the slot 201B. The diffusing lens 230 has a concave hole 232 formed at the center of its circular bottom surface. The concave hole 232 diffuses the parallel rays or converged rays from the convex lens 214 into diffused rays. It makes it easy for the light to enter the diffusing lens 230, which has a refraction index different from that of the air. The reflecting surface 231 of this embodiment is generally a flat surface, though coated with white painting or formed with the irregular reflection surface. However, it is possible to curve it such that the light from the slot 201B is spread. The slot 201B has a directivity because the light in the upper tube 201a is not radiated other than through the slot 201B.

A seat 240 and a thread 241 are integrally fixed on the lowermost end of the lower tube 201c, while a nut 242 is engaged with the thread 241 to fasten the corner pole 201 on the car body CA. A buffering plate 243 is interposed between the seat 240 and the nut 242 so that it contacts an outer surface of the car body CA and that makes the corner pole 201 stably fits even on a curved surface of the car body CA. A spring washer 244 is also interposed between the seat 240 or buffering plate 243 and the nut 242 so that it contacts an inner surface of the car body CA and that keeps the nut from rotating. A power supply lead 215 is taken out through the thread 241.

The upper tube 201 a has a fitting groove 201D formed around its perimeter at a position under the slot 201B for fitting a cord of a flag or the like. Though not shown, a ring is attached to the seat 240 so that a cord of a flag or the like is passed through it for fitting.

The diffusing lens 230 is disposed at the upper part of the upper tube 201a and constitutes a display portion for receiving the light from the LED 222 and visibly displaying it. However, the display portion may be constructed as described below.

FIG. 38a is a perspective view showing a first example of an indicating part used in the fifteenth embodiment of the inventive abnormal approach warning indicator. FIG. 38b is a sectional view showing the first example of the indicating part used in the fifteenth embodiment of the inventive abnormal approach warning indicator. FIG. 38c is a perspective view showing a second example of an indicating part used in the fifteenth embodiment of the inventive abnormal approach warning indicator. FIG. 38d is a sectional view showing the second example of the indicating part used in the fifteenth embodiment of the inventive abnormal approach warning indicator.

The upper tube 201a has the uppermost end integrally formed with the side wall or side surface and sealed. In a modification shown in FIGS. 38a and 38b, the upper tube 201a shown in FIG. 37 is modified such that its uppermost end is opened, though not illustrated. Then, a lowermost end of this modification of end member 300 is inserted in an opening at the uppermost end of the upper tube 201a and fixed thereto. Namely, the end member 300 has a cylindrical shape with its uppermost end closed, and has a circular or elliptical window hole 300A punched on a peripheral portion. A seal plate 300B is fitted on the window hole 300A. The seal plate 300B has its inside surface roughened by graining or cutting into a milky color while being translucent. The seal plate 300B is closely joined to the window hole 300A by an adhesive. A reflecting plate 300C is slantingly disposed inside the end member 300. The reflecting plate 300C has its circumference formed into generally an elliptical shape by cutting. The reflecting plate 300C has one end in contact with a top position of the inside of the end member 300 and the other end in contact with an O-ring 300D, which is inserted into the end member 300 from the lowermost opening thereof. As a result, the reflecting plate 300C is fixedly mounted between the top of the end member 300 and the O-ring 300D. While the reflecting plate 300C is made into a flat mirror in this modification, it may be made into a convex mirror or concave mirror. Moreover, its reflecting surface may be an irregular surface composed of minute concave and convex surfaces without finishing it into a specular surface. The light passed through the window hole 300A has a directivity since it is not radiated from parts other than the window hole 300A.

Referring to FIGS. 38c and 38d, in this modification, the upper tube 201a shown in FIG. 37 is modified such that its uppermost end is opened. Then, a lowermost end of this modification of end member 310 is inserted in an opening at the uppermost end of the upper tube 201a and fixed thereto. Namely, the end member 310 has a semi-cylindrical shape with its uppermost end closed, and has an elliptical or slot-like window hole 310A punched on a flat wall portion thereof. A seal plate 310E is fitted on the window hole 310A. The seal plate 310E has its inside surface formed with a Fresnel lens and transmits light. The seal plate 310E is closely joined to the window hole 310A by an adhesive or any other suitable fastening means. A reflecting plate 310C is slantingly disposed inside the end member 310. The reflecting plate 310C has its circumference formed into generally an elliptical shape by cutting. The reflecting plate 310C has one end in contact with a top position of the inside of the end member 310 and the other end in contact with an O-ring 310D, which is inserted into the end member 310 from the lowermost opening thereof. As a result, the reflecting plate 310C is fixedly mounted between the top of the end member 310 and the O-ring 310D. While the reflecting plate 310C is made into a flat mirror in this modification, it may be made into a convex mirror or concave mirror. Moreover, its reflecting surface may be an irregular surface composed of minute concave and convex surfaces without finishing it into a specular surface. The light passed through the window hole 310A has a directivity since it is not radiated from parts other than the window hole 310A and the Fresnel lens.

Figure 39:
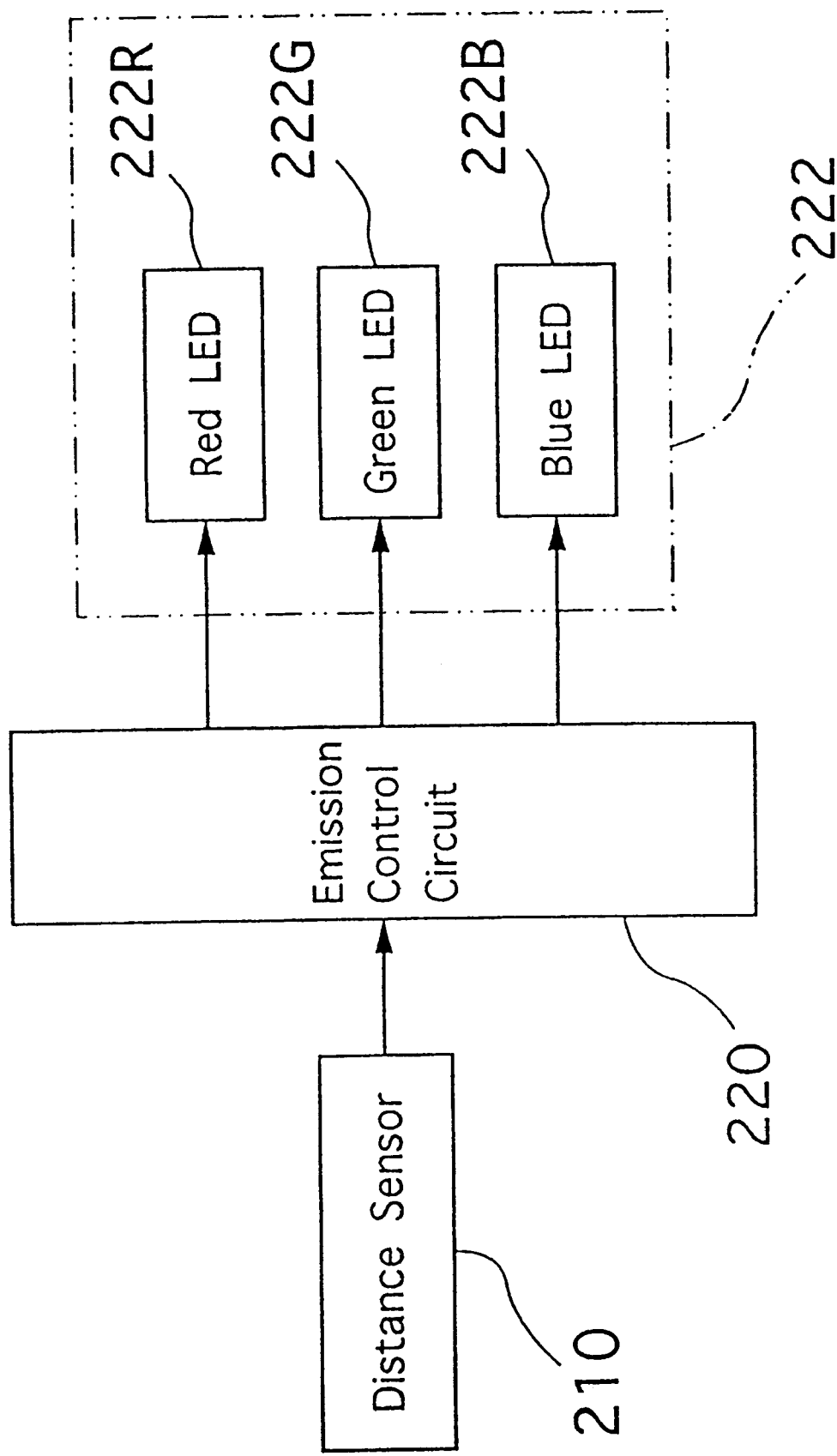
FIG. 39 shows a control circuit for controlling an overall operation of the fifteenth embodiment of the inventive abnormal approach warning indicator.

FIG. 39 shows a control circuit for controlling an overall operation of the fifteenth embodiment of the inventive abnormal approach warning indicator.

As shown in FIG. 39, this embodiment of an abnormal approach warning indicator shown in FIG. 37 contains the distance sensor 210, LED 222, and LED controller 220 inside the corner pole 201. The LED 222 has a red LED 222R, a green LED 222G, and a blue LED 222B to emit three primary colors.

The LED 222 does not always need three primary colors of LEDs 222R, 222G and 222B. It may be composed of one or more of LED selected from among desired colors of LEDs such as red, green and blue LEDs 222R, 222G and 222B.

The printed board 216 (see FIG. 37a) has one surface on which is mounted the LED controller 220 for controlling the LED 222 and other necessary circuits and another surface on which is mounted the LED 222. The ultrasonic vibrator 211 operates in conjunction with the measuring circuit 212 which drives and controls ultrasonic vibrator 211, thereby both members define the distance sensor 210. The measuring circuit 212 is composed of a circuit, necessary for causing the ultrasonic vibrator 211 to transmit and receives the ultrasonic waves, and an output circuit therefor. The LED controller 220 is a one-chip microcomputer and has a CPU, a ROM, a RAM. The LED controller 220 has the LED 222 connected with its output. The LED controller 220 controls the LED 222 by a current control or duty control or the like so that the LEDs 222R, 222G and 222B selectively emit light appropriately in combination, thereby radiating a desired color of light. That color of light passes through the diffusing lens 230 and is radiated out of the upper tube 201a through the slot 201B, so that color of light is seen by the driver as flashes or continuous light at the slot 201B.

The ultrasonic vibrator 211 of the distance sensor 210 is connected to an input side of the LED controller 220. Thus, the distance sensor 210 detects the distance between the car body CA and an obstacle at the side of the car, and the LED controller 220 controls the LED 222 to emit a fixed color of light for warning the driver of the obstacle depending on the distance. The distance sensor 210 is the ultrasonic sensor for measuring the distance between the car body CA and the obstacle beside the car at the time of parking or the like, when the driver is typically concerned with such distances. Though not used in the illustrated embodiment, information from a speedometer is input in the LED controller 220 so that, when the car speed is a predetermined speed or less, e.g., 10 km/h, the LED controller 220 starts operating.

Though not shown in this embodiment, power is supplied through the power supply lead 215 when the car speed is at the predetermined speed or less, e.g., 10 km/h and an ignition switch is ON. Namely, in this embodiment, when the output of the speedometer becomes 10 km/h or less, the LED controller 220 is supplied with power. The circuitry for supplying power to the control circuit is not shown.

An operation of this embodiment of the abnormal approach warning indicator shown in FIG. 37 is described hereafter.

The indicator of this embodiment operates similarly to the fifth or sixth embodiment of indicator shown in FIG. 13. For example, when the output of the speed sensor is 10 km/h or less, the LED controller 220 is supplied with power, and the program of FIG. 13 is executed. Then, the computed distance is compared with the thresholds L, M, H and the LED 222 is controlled to emit a fixed color of light according to the distance.

As described above, in the present embodiment of abnormal approach warning indicator, the display portion is composed of the diffusing lens 230 and the slot 201B that are disposed on the corner pole 201, while the corner pole 201 is attached near the front end of the car body CA. Then, the display portion receives the light from the LED 222 and visibly displays a signal in the form of light of a particular color.

Accordingly, when the car speed is a predetermined value or less, which is typical of a speed when parking the car for example, the distance sensor 210 measures the distance between the car body CA and an obstacle beside it, so that the light color of the LED 222 is changed according to the distance. The driver can recognize such a distance by seeing the light as an output of the LED 222, so that, even if the driver is not familiar with driving, he or she can handle the car in a correct and rapid way to approach the obstacle.

The corner pole 201 has a similar appearance to a conventional corner pole as a whole. Moreover, it can be formed into any desired shape. Therefore, the corner pole of this embodiment can contribute to the improvement of the design or ornamentation of the car body CA. The corner pole 201 accommodates therein the distance sensor 210, LED 222, and LED controller 220, so that they can be made operational nearly by introducing an external power source thereto. Therefore, the abnormal approach warning indicator can be made compact and manufactured or dealt with separately, so that it is advantageous in view of assembling work or its maintenance, as well as being easy to install.

Particularly, in this embodiment, when the output of the speed sensor is 10 km/h or less, a logic circuit judges an on and off of the ignition switch and controls a gate for the power source to the distance sensor 210, LED 222 and LED controller 220. However, it may be modified such that a power generated by the ON operation of the ignition switch is supplied to the distance sensor 210, LED 222 and LED controller 220 in the corner pole 201. In this modification, the light color for the warning is kept green as long as there is no obstacle at the side of the car body CA. In such a modification, the corner pole can be integrally manufactured in one body and attached thereafter to the car body CA, thereby performing the above functions.

In this embodiment, the distance between the car and obstacle is computed by the output of the distance sensor 210, and the light of the LED 222 is changed to one of four colors according to the distance. However, during the regular driving, the light color of the LED 222 may be controlled by other information such as a car speed so that, only when the output of the speed sensor is 10 km/h or less, the distance sensor 210 is made ON. Furthermore, more or less color can be used depending on the degree of precision desired by the user.

Figure 40:
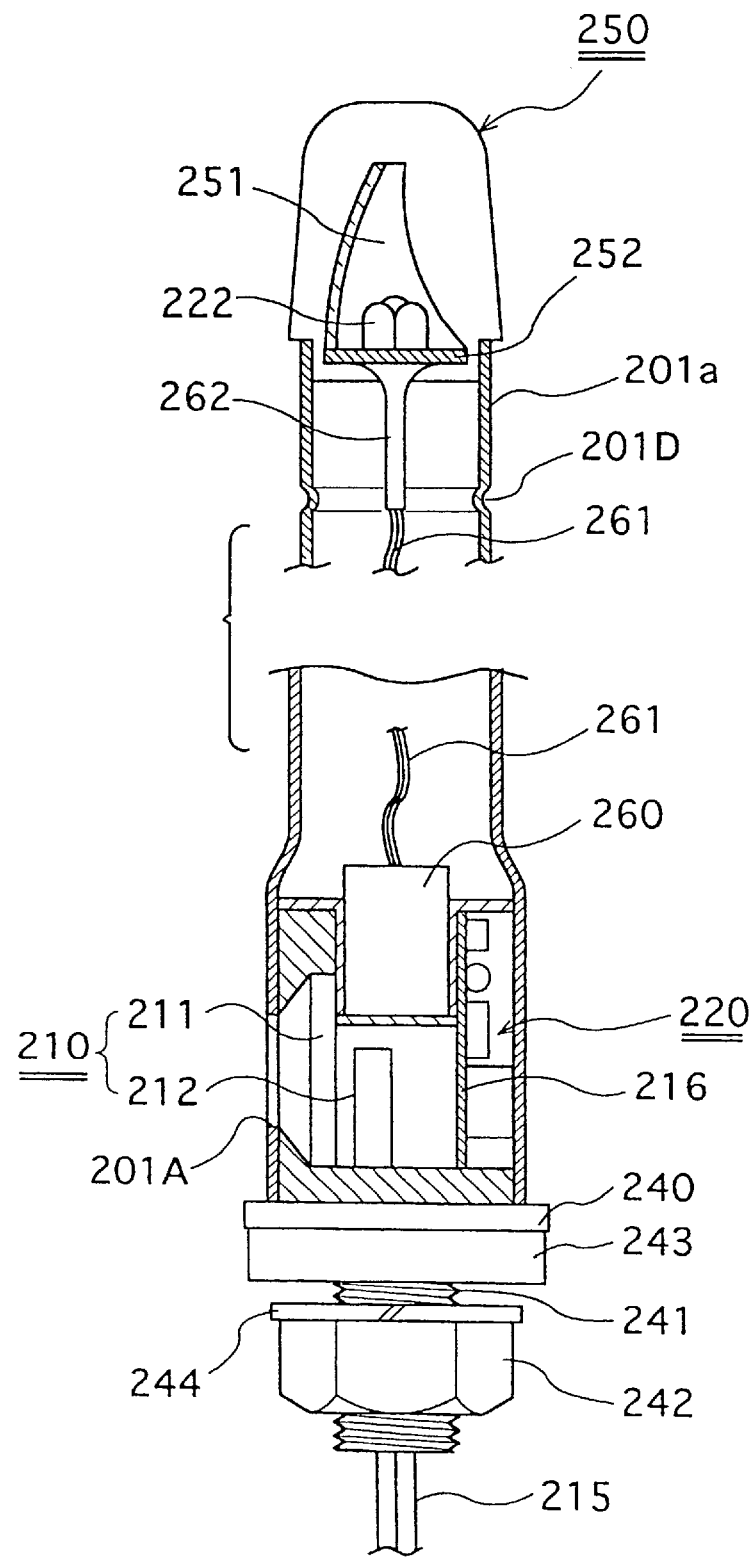
FIG. 40 is a sectional view showing an abnormal approach warning indicator according to a sixteenth embodiment of information indicator of the invention.

FIG. 40 is a sectional view showing an abnormal approach warning indicator according to a sixteenth embodiment of the information indicator of the invention.

Referring to FIG. 40, this embodiment modifies the upper tube 201a of the fifteenth embodiment shown in FIG. 37a such that not only the lowermost end, but also the uppermost end are opened. A display portion described later is disposed at the uppermost end of the upper tube 201a. A reel 260 is disposed inside the lower tube 201c. The reel 260 is capable of automatically winding a lead 261 thereon. The lead 261 transmits a signal for controlling the LED 222 from the printed board 216.

The display portion is composed of an end member 250 inserted into the uppermost opening of the upper tube 201a.

The end member 250 is formed of a light-transmitting synthetic resin, which has a milky color surface, into generally a bell shape. The LED 222 and a printed board mounting the LED 222 thereon are together packed by molding in the lower end portion, which is inserted in the upper opening of the upper tube 201a, of the end member 250. A concave mirror 251 is also packed by molding in the end member 250 while fixed to the printed board 252. The concave mirror 251 has a shape obtained by dividing a hemispherical body into about ten pieces. Namely, the end member 250 is molded into one body while accommodating therein the LED 222, printed board 252, and concave mirror 251. In this embodiment, the concave mirror 251 gives a directivity to the light from the LED 222. A reinforcing tube 262 of a soft synthetic resin has its upper end joined to the printed board 252 to prevent a stress to an end part of the lead 261 and protect it.

The display portion of this embodiment is composed of the end member 250 which accommodates therein the LED 222, printed board 252, and concave mirror 251.

In the fifteenth embodiment shown in FIGS. 37a, and 37b, the LED 222 is positioned at generally the center of the base end of the lower tube 201c and the convex lens 214 is disposed opposite to the LED 222, thereby enabling the tube 201 change length. However, in the sixteenth embodiment, the change in length of the corner pole 201 is dealt with by means of the reel 260 that automatically winds the lead 261 thereon. Other structures and operation are same as those of the fifteenth embodiment shown in FIGS. 37a, and 37b, so their description is omitted.

Figure 41A:
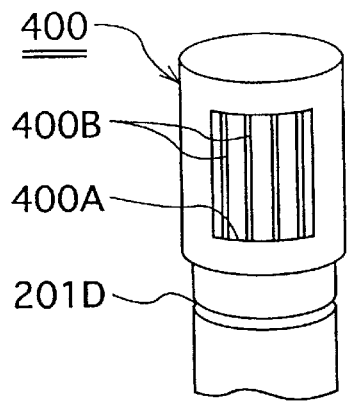
FIG. 41a is a perspective view showing a first example of an indicating part used in the sixteenth embodiment of the inventive abnormal approach warning indicator.
Figure 41B:
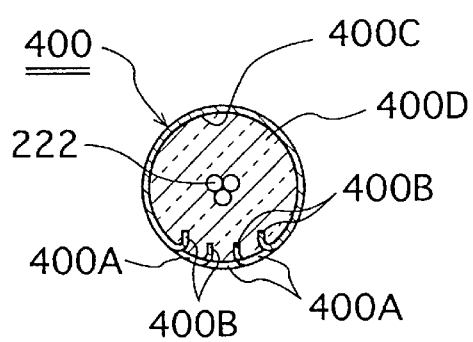
FIG. 41b is a sectional view showing the first example of the indicating part used in the sixteenth embodiment of the inventive abnormal approach warning indicator.
Figure 41C:
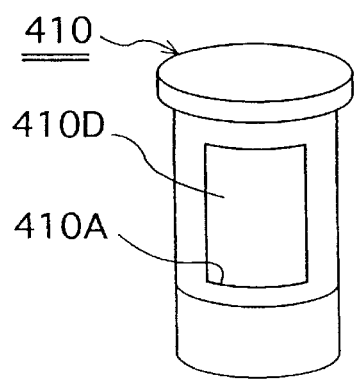
FIG. 41c is a perspective view showing a second example of an indicating part used in the sixteenth embodiment of the inventive abnormal approach warning indicator.
Figure 41D:
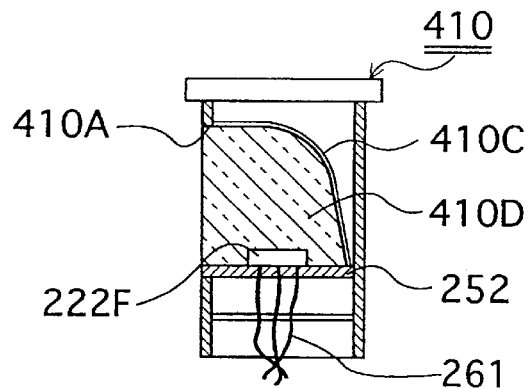
FIG. 41d is a sectional view showing the second example of the indicating part used in the sixteenth embodiment of the inventive abnormal approach warning indicator.
Figure 41E:
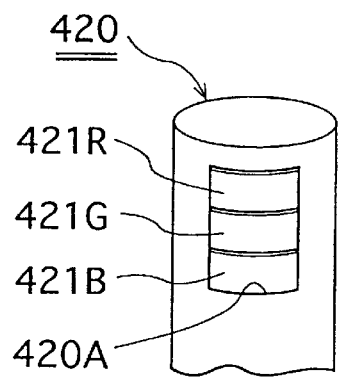
FIG. 41e is a perspective view showing a third example of an indicating part used in the sixteenth embodiment of the inventive abnormal approach warning indicator.
Figure 41F:
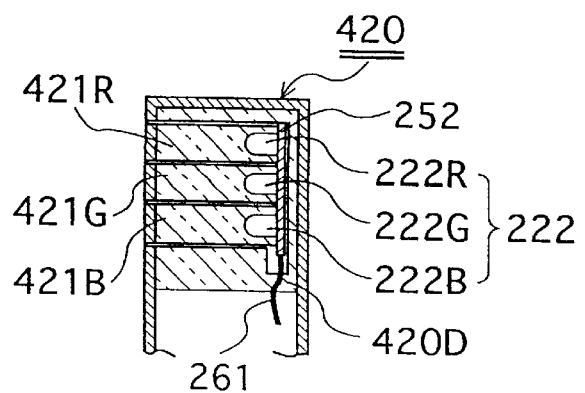
FIG. 41f is a sectional view showing the third example of the indicating part used in the sixteenth embodiment of the inventive abnormal approach warning indicator.

FIG. 41a is a perspective view showing a first example of an indicating part used in the sixteenth embodiment of the inventive abnormal approach warning indicator. FIG. 41b is a sectional view showing the first example of the indicating part used in the sixteenth embodiment of the inventive abnormal approach warning indicator. FIG. 41c is a perspective view showing a second example of an indicating part used in the sixteenth embodiment of the inventive abnormal approach warning indicator. FIG. 41d is a sectional view showing the second example of the indicating part used in the sixteenth embodiment of the inventive abnormal approach warning indicator. FIG. 41e is a perspective view showing a third example of an indicating part used in the sixteenth embodiment of the inventive abnormal approach warning indicator. FIG. 41f is a sectional view showing the third example of the indicating part used in the sixteenth embodiment of the inventive abnormal approach warning indicator.

Referring to FIGS. 41a and 41b, in this modification, a lowermost end of end member 400 is inserted in the opening at the uppermost end of the upper tube 201a shown in FIG. 40 and fixed thereto. The end member 400 has a semicylindrical shape with its uppermost end closed, and has generally a rectangular window hole 400A formed by cutting and bending a peripheral portion into plural pieces 400B. A diffusing lens 400D is formed so as to fill the inside of the end member 400 while facing the window 400A. The diffusing lens 400D is made of a light-transmitting synthetic resin mixed with grains or powders to have a pale milky color. The inside surface of the end member 400 has a reflecting surface 400C. While the end member 400 has the inside surface has the reflecting surface 400C, a concave mirror or a convex mirror or a flat mirror may also be disposed therein. Moreover, the reflecting surface may have an irregular surface composed of minute concave and convex surfaces without finishing it into a specular surface. The light passed through the window hole 400A has a directivity since it is prevented from radiating in other directions by the plural bent pieces 400B.

Referring to FIGS. 41c and 41d, in this modification, a lowermost end of this modification of end member 410 is inserted in an opening at the uppermost end of the upper tube 201a and fixed thereto. The end member 410 has a cylindrical shape with its uppermost end closed, and has a rectangular, elliptical, slot-like or circular window hole 410A punched on a peripheral portion. A diffusing lens 410D is accommodated inside the end member 410. The diffusing lens 410D is made of a light-transmitting synthetic resin formed into generally a cylindrical shape while having a surface facing the window hole 410A curved along a quadratic line. An LED 222F and the printed board 252 on which LED 222F is mounted are integrally packed by a molding into a lower end part of end member 410, which is inserted into the upper opening of the upper tube 201a, of the diffusing lens. The LED 222F is capable of emitting any desired color of light by combining three primary colors of light. A reflecting plate 410C is joined to the curved surface of the diffusing lens 410D to define a reflecting surface thereon. The reflecting surface is roughened by graining or cutting while coated with a white paint as desired. The diffusing lens 410D is closely joined to the window hole 410A by an adhesive or other suitable fastening means. While, in this modification, the reflecting surface on the reflecting plate 410C is made into a mirror extending planarly in the right and left direction in FIG. 41c, the reflecting surface may be made into a concave mirror or a convex mirror. Otherwise, the reflecting surface may be an irregular surface composed of minute concave and convex surfaces without finishing it into a specular surface. The light passed through the window hole 410A has a directivity since it is not radiated from parts other than the window hole 410A.

Referring to FIGS. 41e and 41f, in this modification, a lowermost end of end member 420 is inserted in an opening at the uppermost end of the upper tube 201a and fixed thereto. The end member 420 has a cylindrical shape with its uppermost end closed, and has a rectangular or slot-like window hole 420A punched on a peripheral portion. A diffusing lens 420D is accommodated inside the end member 420. The diffusing lens 420D is made of a light-transmitting synthetic resin into generally a cylindrical shape while having a surface facing the window hole 420A curved along a quadratic line. The diffusing lens 420D is made by integrally forming a diffusing lens 421R, a diffusing lens 421G and a diffusing lens 421B, each of which is formed of a predetermined synthetic resin, by another synthetic resin. The diffusing lens 421R houses therein the red LED 222R and part of the printed board 252 on which the red LED 222R is mounted by molding. The diffusing lens 421G houses therein the green LED 222G and part of the printed board 252 on which the green LED 222G is mounted by molding. The diffusing lens 421B houses therein the blue LED 222B and part of the printed board 252 on which the blue LED 222B is mounted by molding. A white paint or an aluminum foil is interposed between the diffusing lens 421R, 421G and 421B, respectively, for shielding the light therebetween. Each of the diffusing lens 421R, 421G and 421B has an equal area of surface exposed from the window hole 420A. The diffusing lens 421R, 421G, 421B has a surface, opposite to the exposed surface, roughened by graining or cutting. The red LED 222R, green LED 222G and blue LED 222B are positioned at such roughened surface sides. The diffusing lens 420D is closely joined to the window hole 420A by an adhesive or other suitable fastening means. In this modification, the surface at the side of the printed board 252 is preferably made into a reflecting surface. The light passed through the window hole 420A has a directivity since it is not radiated from parts other than the window hole 420A.

The sixteenth embodiment of the warning indicator operates in the same manner as the fifteenth embodiment and has the same effects and advantages. Moreover, since the change in length of the corner pole 201 is dealt with means of the reel 260 that automatically winds the lead 261, the LED 222 can be disposed directly on the display portion, i.e., the end member 250, and emit light directly therefrom. Therefore, it is possible to reduce the loss in the emitting light due to the extending operation of the corner pole 201.

While the lead 261 follows the extending and contracting operation of the corner pole 201 by means of the reel 260, a flat cable or the like may be spirally wound or curved to follow the change in length of the corner pole 201.

In each of the fifteenth and sixteenth embodiments, the quantity of light emitted from the LED 222 is set at about a medium value between a light quantity during the daytime and a light quantity during the nighttime, e.g., a value equivalent to a light quantity at the evening time, on the basis of the visibility curve by the well-known Prukinje effect. An optical sensor may be additionally provided on the approach warning indicator in order to determine if it is daytime or nighttime. In this case, it is preferable to detect the light quantity at the outside of the car, since such a construction is added to improve visibility of the approach warning indicator which is located outside of the car. With such a construction added, similar effects and advantages are obtained as in the fifth or sixth embodiment.

In the fifteenth and sixteenth embodiments, one or more distance sensors 210 may be provided in order to detect an obstacles ahead of the car as well as at the side of the car. Moreover, multiple sensors may be combined and provided separately from the corner pole 201. The distance sensor 210 may be one of the ultrasonic sensor, optical sensor or other sensors, such as proximity sensor or proximity switch. It is possible to use any sensor which has characteristics suitable for detecting the distance from the sensor to an object, thereby improving the reliability in detection.

While the LED 222 in the fifteenth and sixteenth embodiments is composed of the red, green and blue LEDs 222R, 222G and 222B, it is not always necessary to use these three colors of LEDs 222R, 222G and 222B, as long as a fixed color of light can be generated to represent a meaning for a predetermined warning or the like. Namely, if it is necessary to give plural meanings to plural warnings or the like, different colors of LEDs are used so that plural colors of light can be generated for giving each color a fixed meanings corresponding to predetermined warnings or the like. It is also possible to use one of the above three colors of LEDs. In this case, similar effects can be attained, too, though the emitted color is limited.

While the corner pole 201 is used for showing one specific warning in each of the fifteenth and sixteenth embodiments, it may be used to show multiple warnings.

While the illustrated corner pole 201 is extendable in three stages, it may be extendable in two or more stages. Otherwise, it may have a fixed length or be tiltable.

Figure 42:
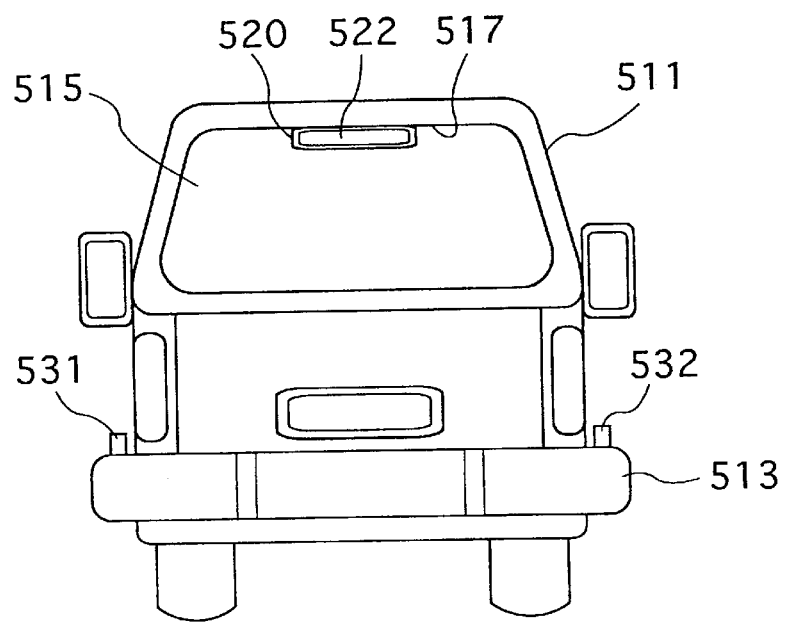
FIG. 42 is a rear view showing a car equipped with an abnormal approach warning indicator according to a seventeenth embodiment of information indicator of the invention.
Figure 43:
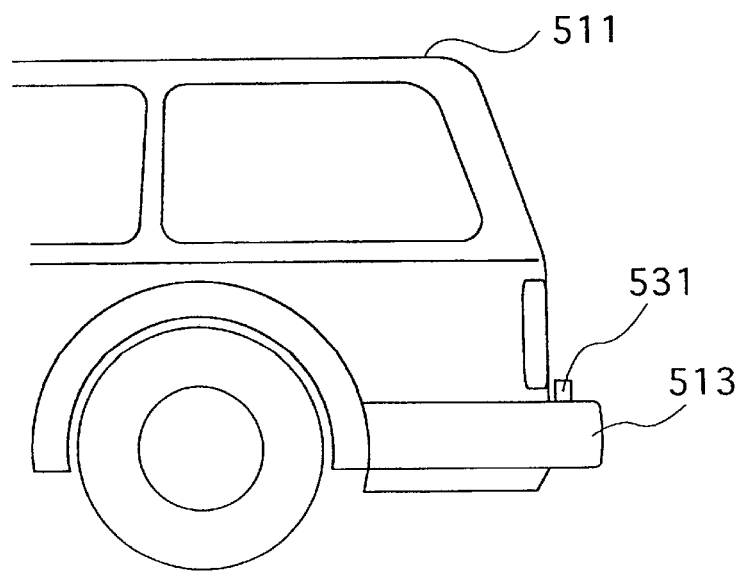
FIG. 43 is a side view showing the car equipped with the seventeenth embodiment of the inventive abnormal approach warning indicator.
Figure 44:
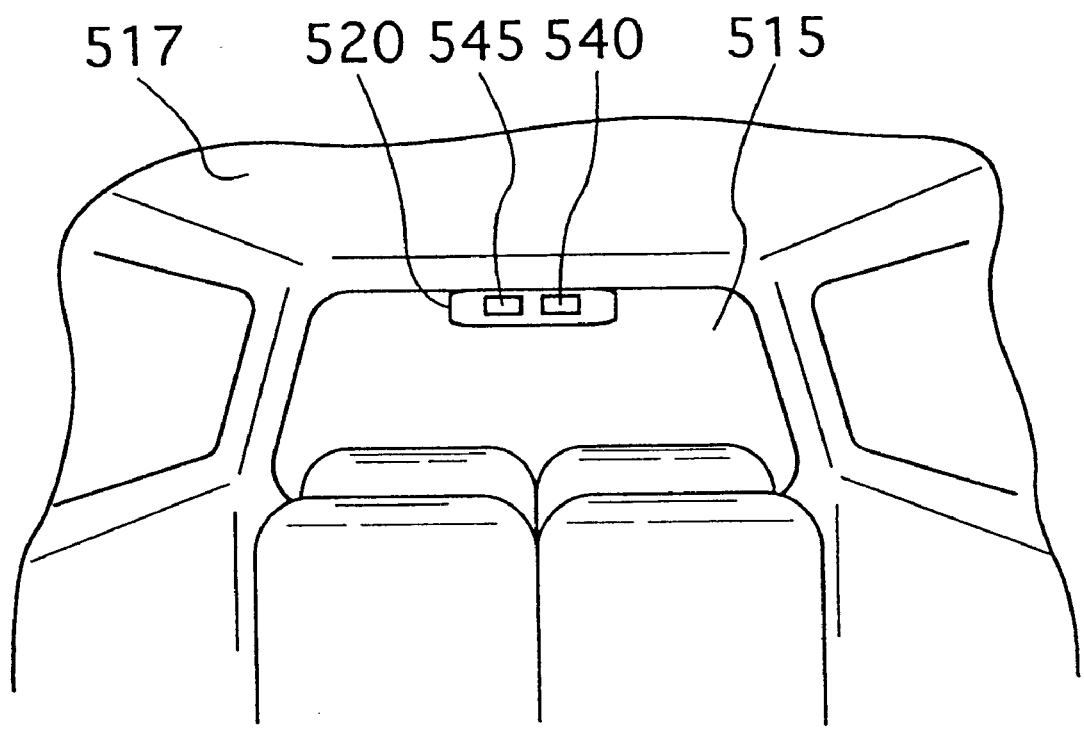
FIG. 44 is a front view showing an interior of the car equipped with the seventeenth embodiment of the inventive abnormal approach warning indicator.
Figure 45A:
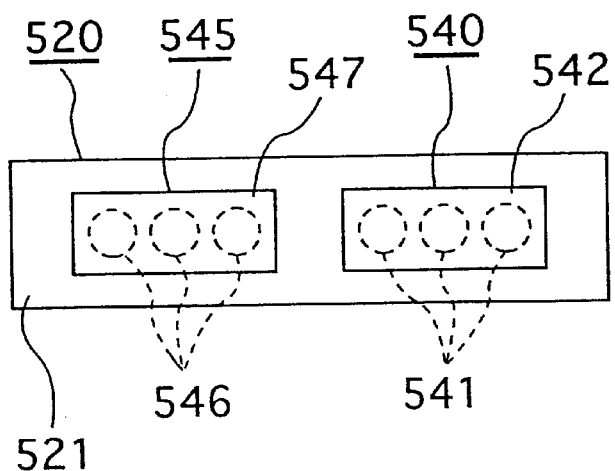
FIG. 45a is a front view showing a schematic structure, seen from a side of a warning indicator part, of a high mounted brake light according to the seventeenth embodiment of the inventive abnormal approach warning indicator.
Figure 45B:
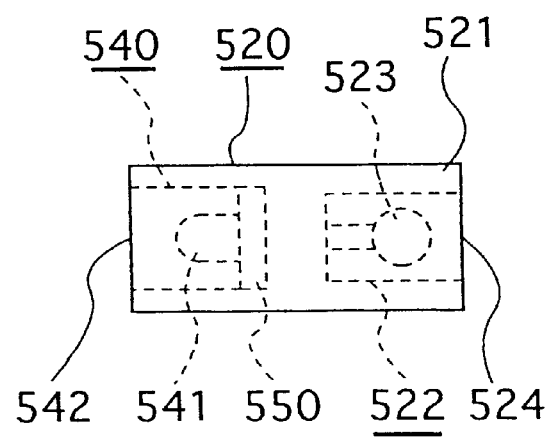
FIG. 45b is a side view of the high mounted brake light according to the seventeenth embodiment of the inventive abnormal approach warning indicator.
Figure 46:
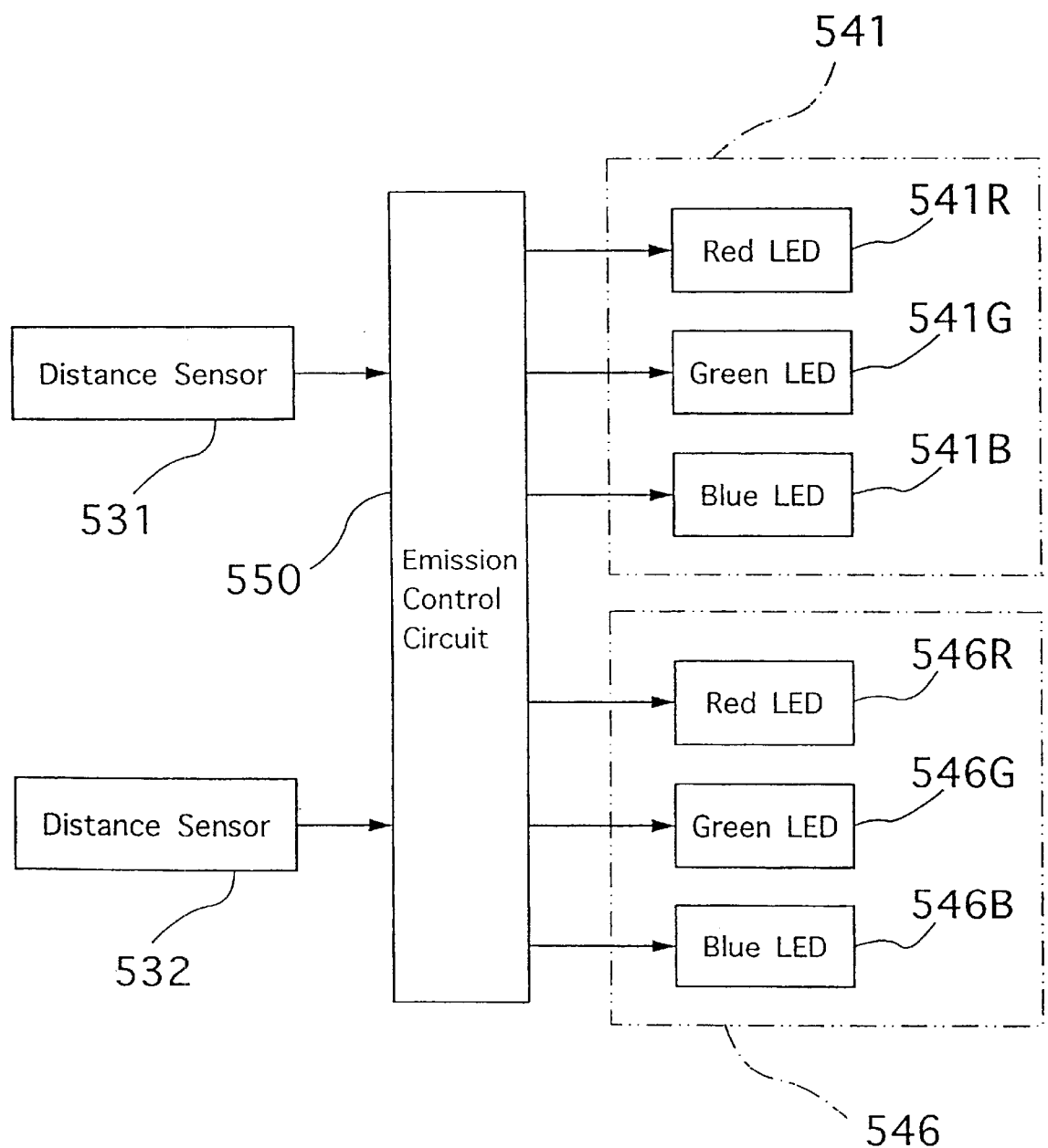
FIG. 46 is a block diagram showing an electrical structure of the seventeenth embodiment of the inventive abnormal approach warning indicator.

FIG. 42 is a rear view showing a car equipped with an abnormal approach warning indicator according to a seventeenth embodiment of the information indicator of the invention. FIG. 43 is a side view showing the car equipped with the seventeenth embodiment of the inventive abnormal approach warning indicator. FIG. 44 is a front view showing an interior of the car equipped with the seventeenth embodiment of the inventive abnormal approach warning indicator. FIG. 45a is a front view showing a schematic structure, seen from a side of a warning indicator part, of a high mounted brake light according to the seventeenth embodiment of the inventive abnormal approach warning indicator. FIG. 45b is a side view of the high mounted brake light according to the seventeenth embodiment of the inventive abnormal approach warning indicator. FIG. 46 is a block diagram showing an electrical structure of the seventeenth embodiment of the inventive abnormal approach warning indicator.

Referring to FIGS. 42 to 45, a high mounted brake light 520, to which this embodiment of abnormal approach warning indicator is directed, is described first. The high mounted brake light 520 is attached to a center of a rear end of a roof in a cabin. The brake light 520 has a generally square, box-shaped housing 521 positioned at a center of an upper edge of a rear windshield. The stop lamp 520 has a stop indicator 522 within the housing 521 at the exterior side (right side in FIG. 45b). The stop indicator 522 has a lamp 523 fitted inside the housing 521 and emits light toward the car exterior. The stop indicator 522 also has a lens 524 covering, the emitting side of the lamp bulb 523 to uniformly diffuse the light from the bulb 523 while making it into a red light. The structure of the high mounted brake light 520 itself is the same as a conventional high mounted brake light which is disposed inside a vehicle. The present embodiment is characterized in the following points.

The present embodiment of abnormal approach warning indicator is composed of a left distance sensor 531, a right distance sensor 532, a left warning indicator 540, a right warning indicator 545 and an emission control circuit 550. The right and left distance sensors 531 and 532 are attached near the right and left ends of an upper surface of a rear bumper 513 so as to protrude therefrom. Each measures a distance between a car body 511 and an object or obstacle behind the car. The type of used as the distance sensor 531, 532 is selected from among an ultrasonic sensor, optical sensor and other distance measuring sensors, such as a proximity switch or proximity sensor. Though not shown, the present embodiment of distance sensor 531, 532 is a conventional ultrasonic sensor, which accommodates an ultrasonic vibrator, a drive control circuit for vibrating the ultrasonic vibrator and a circuit for transmitting and receiving ultrasonic waves through the ultrasonic vibrator airtightly in a housing.

The right and left warning indicators 540 and 545 are disposed at right and left positions of the housing 521, respectively, while contained inside the housing 521 at its car interior (left side in FIG. 45b). The left warning indicator 540 has LED lamps 541, which are capable of emitting light toward the car interior, and a lens 542 covering the emitting side (car interior side) of the LED lamps 541. Similarly, the right warning indicator 545 has LED lamps 546, which are capable of emitting light toward the vehicle cabin, and a lens 547 covering the emitting side of the LED lamps 546. The lens 542, 547 are conventional lens that have a light diffusing effect for uniformly diffusing the light from the LED lamps 541, 546 to radiate light from the whole surface thereof. Thus the driver observes the lamps without having to look away from the vehicle surrounding, either by observing the lamp directly or through the rearview mirror.

The LED lamp 541 is composed of a red LED 541R, green LED 541G and blue LED 541B to obtain three primary colors of light. For example, such an LED lamp 541 may be made by mounting the red, green and blue LEDs 541R, 541G, 541B on a lead frame and packing them with a molding resin, thereby making it possible to emit any colors of light from lamp 541. The LED lamp 546 has the same structure as the LED lamp 541 and is composed of a red LED 546R, green LED 546G and blue LED 546B to obtain three primary colors of light.

The LED controller 550 is housed inside the housing 521 and independently controls the right and left LED lamps 541, 546 depending on outputs of the right and left distance sensors 531, 532.

Namely, as shown in FIG. 46, the control circuit 550 has an input connected with the distance sensors 531, 532, respectively, so as to compute distances between the car body 511 and right and left obstacles behind the car body 511, respectively, based on the outputs from the distance sensors 531, 532. The LED controller 550 has an output connected with the LEDs 541R, 541G, 541B of the LED lamp 541 and the LEDs 546R, 546G, 546B of the LED lamp 546, respectively, to control the LED lamps 541, 546 to emit a preset color of light based on the outputs from the distance sensors 531 and 532. The LED controller 550 is made of a one-chip microcomputer having a CPU, a ROM, and a RAM. It controls the LEDs 541R, 541G, 541B, 546R, 546G, 546B by duty control or the like and selectively combines them in an appropriate way to make them emit a desired color of light.

In this embodiment, for example, when a reverse gear is selected as a shift position, the LED controller 550 is supplied with power, and the signals from the distance sensors 531, 532 are input in the LED controller 550. Then, the LED controller 550 controls the LED lamps 541, 546 according to warning states corresponding to the input signals, thereby illuminating the warning indicators 540, 545 via the lens 542, 547 for warning.

In this embodiment, a group of one red LED, one green LED and one blue LED may be disposed in each warning indicator 540, 545. Or a group of plural red LEDs, plural green LEDs and plural blue LEDs may be disposed in each warning indicator 540, 545. Then, the LED controller 550 may control each of the LEDs by itself to emit a single color of light or in combination to emit a mixed color, thereby obtaining any desired color of light. Moreover, the LED does not always need three primary colors of LEDs. It may be composed of one or more of different colors of LEDs including the three primary colors of LEDs 541R, 541G, 541B, 546R, 546G, 546B.

The LED lamps 541, 546 and the LED controller 550 are integrally mounted on a printed board (not shown). Such a printed board is inserted and fixed inside the housing 521. Thus, the assembling of the warning indicators 540, 545 is relatively easy. Otherwise, printed board with the LED lamps and control circuit mounted thereon may be accommodated inside a casing so they together they are one body. Then, such an integral body may be further accommodated inside a fixed position of the housing 521, so that the assembling of the warning indicators 540, 545 is relatively easy.

While the distance sensor 531, 532 are disposed at the right and left sides of the read end of the car body 511 and the warning indicators 540, 545 are disposed at the right and left sides of the housing accordingly, a distance sensor may be disposed at a center or right or left side of the rearend of the car body 511 while a single warning indicator may be disposed on the housing 521.

An operation of the present embodiment of abnormal approach warning indicator is described hereafter.

Figure 47:
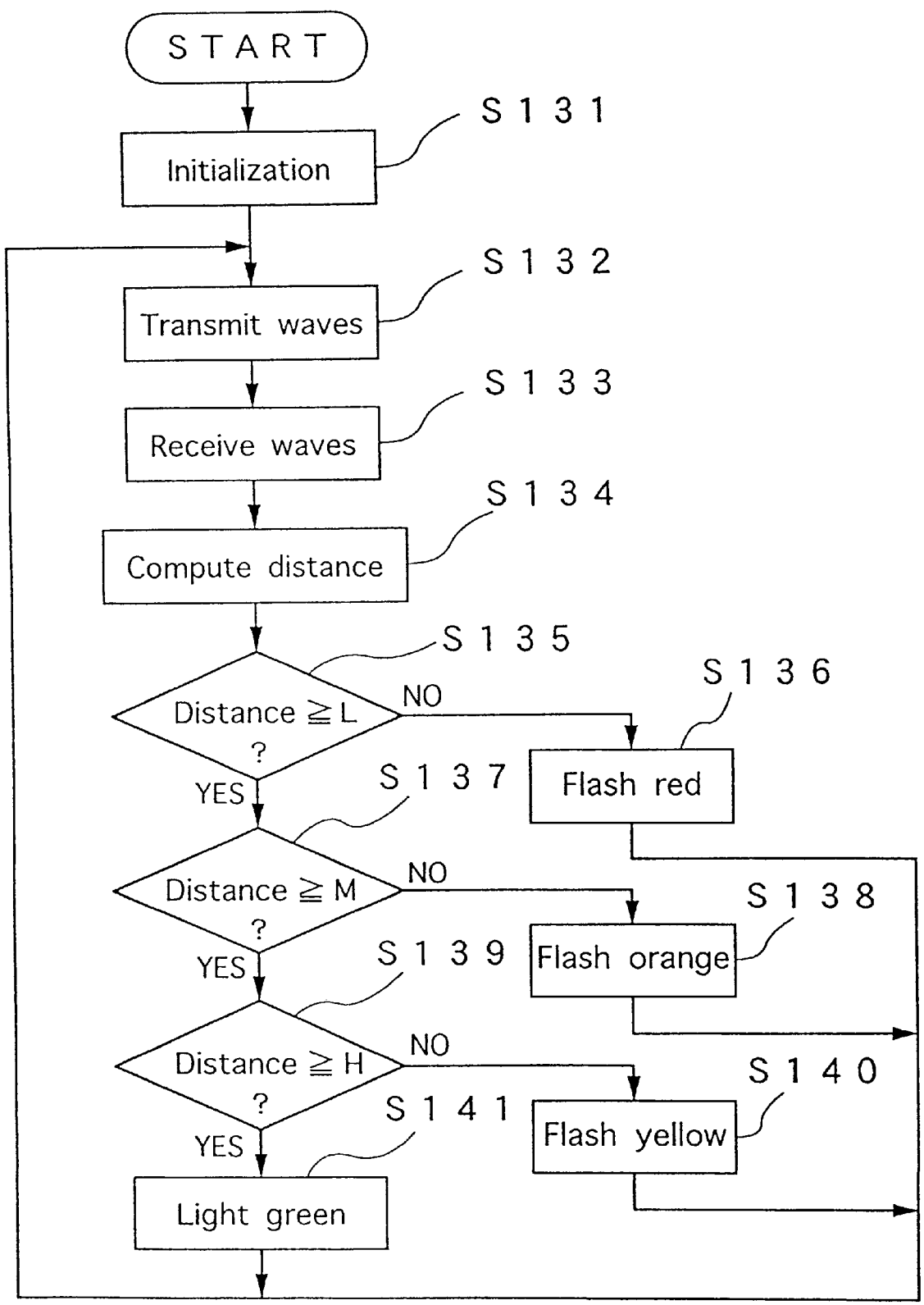
FIG. 47 is a flowchart showing an overall operation of the seventeenth embodiment of the inventive abnormal approach warning indicator.

FIG. 47 is a flowchart showing an overall operation of the seventeenth embodiment of the inventive abnormal approach warning indicator.

In this embodiment, when the reverse gear is selected as a shift position, the LED controller 550 is supplied with power and the following program is executed. In the following operation, the LED controller 550 controls the left LED lamp 541 and the right LED lamp 546 independently based on the outputs of the distance sensors 531, 532 in accordance with the flowchart of FIG. 47, though the control operation is same for each.

If the reverse gear is selected as the shift position, and power is supplied to the distance sensors 531, 532, LED lamps 541 and 546, LED controller 550 and so on, the LED controller 550 is initialized in step S131. Then, ultrasonic waves are transmitted from each of the distance sensors 531, 532 for a predetermined period of time, i.e., a few microseconds or less, in step S132. The distance sensors 531 and 532, respectively, receive and detect corresponding reflected waves of the ultrasonic waves transmitted therefrom after a fixed period of time in step S133. Thereafter, in step S134, the LED controller 550 computes each of the distances between the car body 511 and right and left obstacles behind the car based on the delay in receiving the ultrasonic waves, which were transmitted and received in the previous steps. In step S135, it is decided if the computed distance is not less than a predetermined smallest distance threshold L or not. If it is decided that the distance, e.g., the distance for the left obstacle is less than the smallest threshold L, the red LEDs 541R are operated to flash red light, thereby flashing the left LED lamps 541 in red in step S136. Thus, the left warning indicator 540 flashes red toward the car interior via the lens 541. Here, if it is decided that the distance for the right obstacle is less than the smallest threshold L, the right LED lamp 546 is similarly controlled in step S136, and the right warning indicator 546 flashes red toward the car interior.

If it is determined that the computed distance in step S135 is the smallest threshold L or more, the execution proceeds to step S137. In step S137, it is decided if the computed distance is not less than a medium distance threshold M or not. If it is decided that the distance, e.g., the distance for the left obstacle is less than the medium threshold M, the red LED 541R and the green LED 541G are lit in combination while adjusting their duty ratio to flash orange light, thereby flashing the left LED lamps 541 in orange in step S138. Thus, the left warning indicator 540 flashes orange toward the car interior via the lens 541. Here, if it is decided that the distance for the right obstacle is less than the medium threshold M, the right LED lamp 546 is similarly controlled in step S138, and the right warning indicator 546 flashes orange toward the car interior.

If it is determined that the computed distance in step S137 is the medium threshold M or more, the execution proceeds to step S139. In step S139, it is decided if the computed distance is not less than a largest distance threshold H or not. If it is decided that the distance, e.g., the distance for the left obstacle is less than the largest threshold H, the red LED 541R and the green LED 541G are lit while adjusting their duty ratio to flash yellow light, thereby flashing the left LED lamps 541 in yellow in step S140. Thus, the left warning indicator 540 flashes yellow toward the car interior via the lens 541. Here, if it is decided that the distance for the right obstacle is less than the largest threshold H, the right LED lamp 546 is similarly controlled in step S140, and the right warning indicator 546 flashes yellow toward the car interior.

If it is decided in step S139 that the computed distance, e.g., the distance for the left obstacle is the largest threshold H or more, the green LED 541G emits a continuous green light, thereby lighting the left LED lamps 541 continuously in green in step S141. Thus, the left warning indicator 540 is lit in green toward the car interior via the lens 541. Here, if it is decided that the distance for the right obstacle is the largest threshold H or more, the right LED lamp 546 is similarly controlled in step S141, and the right warning indicator 546 is lit in green toward the car interior.

While the blue LED 541B, 546B is not used in the above operation, it may be used as desired. For example, a threshold distance that is larger than the largest threshold is additionally set. Then, the green LED 541G, 546B flashes or light the LED lamp 541, 546 at the time of such a threshold. Then, blue LED lamp 541, 546 flashes or is lit in blue, thereby flashing or lighting the warning indicator 540, 545 in blue toward the car interior through the lens 542, 547. Otherwise, the blue LED 541B, 546B may be combined with the other color of LEDs 541R, 541G, 546R, 546G by the duty control to obtain a mixed color of light which is different from the above colors. Namely, the illumination color of the warning indicator 132 may be any desired one according to the threshold, in place of or addition to the above colors. In case of executing the above program, the blue LED 541B, 546B may be omitted.

In the present embodiment, when the reverse gear is selected as the shift position in moving the car rearward for garaging or parking or the like, the distance sensor 531, 532 measures the distances between the car body 511 and the obstacles behind it and change their outputs depending on the distances. Moreover, the LED controller 550 controls and drives on the LED lamps 541, 546 according to the outputs from the distance sensors 531, 532, thereby changing indicating states of the warning indicators 540, 545. Then, the warning indicators 540, 545 indicate warnings toward the car interior by illumination lights toward the car interior through the LED lamps 541, 546. The driver moves the car rearward, while watching the rear side through the rear windshield, so that he or she inevitably sees the high mounted brake light 520 which is located within his or her sight without having to look away from the vehicle surroundings. Therefore, the driver can get information concerning an obstacle behind the car from changes in indicating states of the warning indicators 540, 545. Moreover, the high mounted brake light 520 is usually located at the center of the upper or lower end of the rear windshield 515, which is easy to draw attention of the driver who watches the rear side while backing. Therefore, the warning indicator 540, 545 can perform the warning effectively an reliably. As a result, the driver can be visually and effectively given information regarding the obstacle behind the car during driving, such as during a parking operation. Then, the driver can recognize the distance between the car and the obstacle, thereby carrying out the backing operation correctly, safely and rapidly.

Particularly, it is common these days to provide the high mounted brake light 520 at the rear of the car body 511 for the sake of safety. Therefore, in general, no special space or member is necessary for setting the warning indicators 540, 545 other than the high mounted brake light 520, so that the costs of the warning system can be reduced as a whole.

All of the LED lamps 541, 546 and LED controller 550 are provided inside the high mounted brake light 520, so that these members form one body and need no special space for fitting. Therefore, the total costs can be reduced and the whole structure can be made compact and relatively easy to install. Moreover, these integral members can work only by introducing an external power source thereto, so that the approach warning indicator can be made more compact. Since the distance sensor 531, 532 are disposed near the right and left ends of the rear bumper 513, these sensors can exactly measure the distance to the obstacle. In addition, the high mounted brake light 520 is placed inside the cabin and the LED lamps 541, 546 can emit light toward the car interior, so that the visibility of the warning indicators 540, 545 is excellent and the warning information is reliably transmitted to the driver. Moreover, the high mounted brake light 520 accommodates therein only the LED lamps 541, 546 and LED controller 550, while the distance sensors 531, 532 are disposed at the rear end of the car separately from the above members, so that any sized distance sensors can be used as the distance sensor 531, 532 regardless of the dimension of the high mounted brake light 520, thereby improving the reliability of the approach warning indicator.

Furthermore, the light color of the LED lamp 541, 546 is changed in one of the four colors (red, orange, yellow and green) or five colors (those four colors plus blue) depending on the distance between the car rear end and the obstacle behind it. Accordingly, the LED controller 135 changes the light color of the LED lamps 541, 546 depending on the output of the distance sensor 531, 532, e.g., from blue, green, yellow, orange and red, in turn, according to the distance. Thus, a variety of light colors can be provided to transmit more kinds of information to the driver.

In addition, the distance sensors 531, 532 are disposed at the right and left of the car, so that the driver can independently obtain information of right and left obstacles by seeing the emitting states of the right and left LED lamps 541, 546. Therefore, the driver can back-up in a more correct, safe and rapid way.

Figure 48:
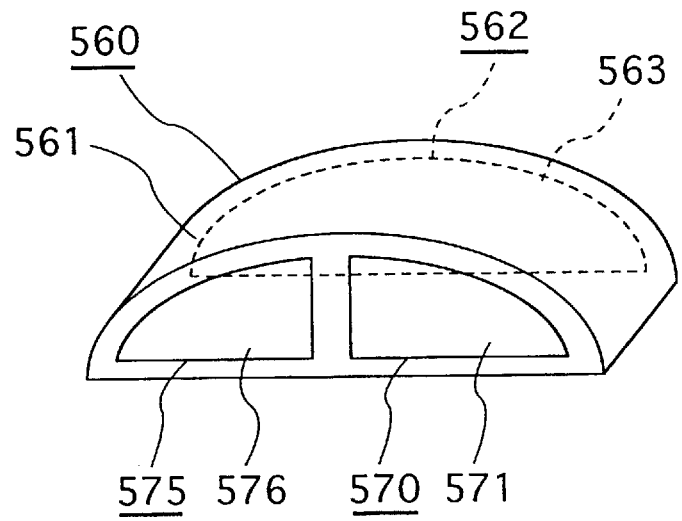
FIG. 48 is a perspective view schematically showing a a high mounted brake light having an abnormal approach warning indicator according to an eighteenth embodiment of the information indicator of the invention.

FIG. 48 is a perspective view schematically showing a a high mounted brake light having an abnormal approach warning indicator according to an eighteenth embodiment of the information indicator of the invention.

As shown in FIG. 48, the present embodiment uses a high mounted brake light 560 which is fixed on a rear package tray, not shown, at the back of a rear seat, while positioned at the center of the lower end of the rear windshield. The high mounted brake light 560 has a housing 561 which is provided with a stop indicator 562, similar to the stop indicator 522 of the seventeenth embodiment, at a side of lamp 26 facing away from the interior of the car. A red light is emitted from the stop indicator 562 to the car's exterior via a lens 563. The housing 561 is provided with right and left warning indicators 570, 575, similar to the warning indicators 540, 545 of the seventeenth embodiment, at the car interior side. A preset desired color of light is emitted from the warning indicators 570, 575 to the car interior side via lens 571, 576. Though not shown, the housing 561 accommodates therein the LED 541, 546 of the warning indicators 570, 575 and the emission LED controller 550 described in the seventeenth embodiment, and their description is omitted herein.

The eighteenth embodiment of abnormal approach indicator operates in generally the same manner as the seventeenth embodiment, and has similar effects and advantages. The main difference being the structure for housing 561 and the fact that it is positioned on the rear package tray of the vehicle.

Figure 49:
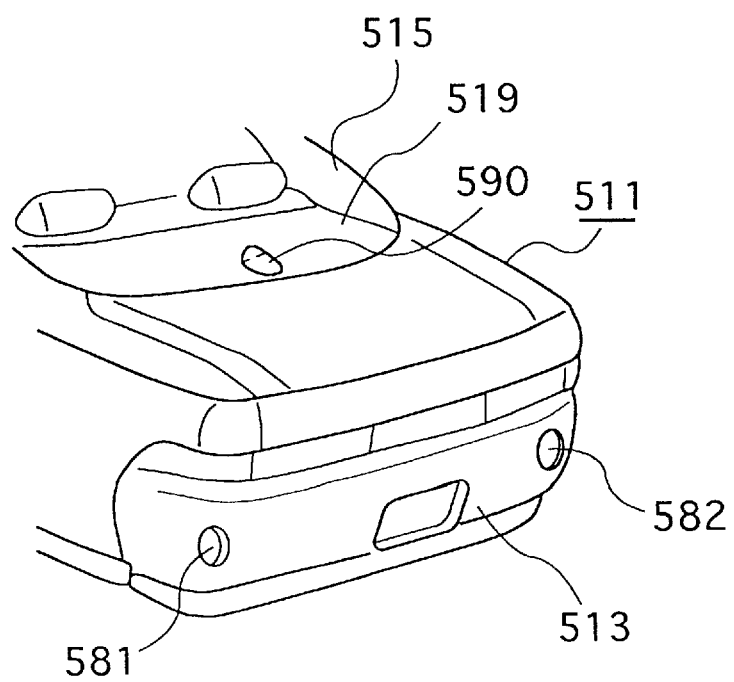
FIG. 49 is a perspective view showing a rear part of a car equipped with an abnormal approach warning indicator according to a nineteenth embodiment of the information indicator of the invention.
Figure 50:
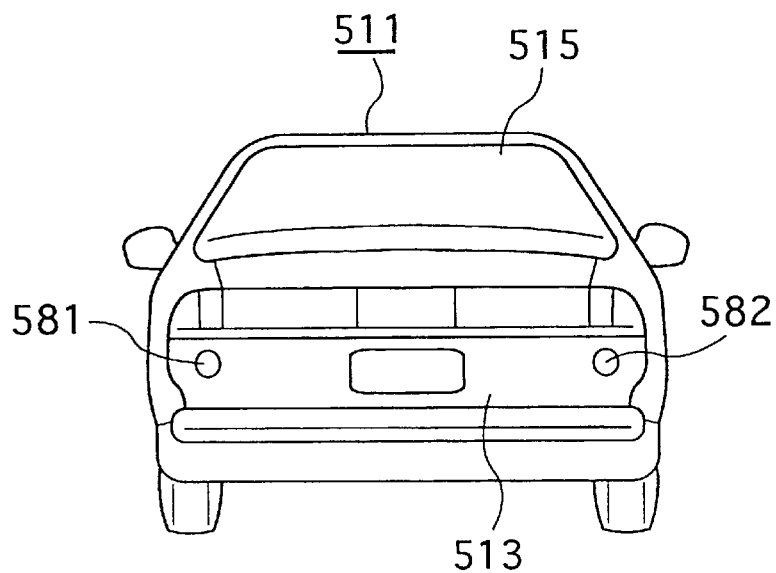
FIG. 50 is a rear view showing the car equipped with the nineteenth embodiment of the inventive abnormal approach warning indicator.
Figure 51:
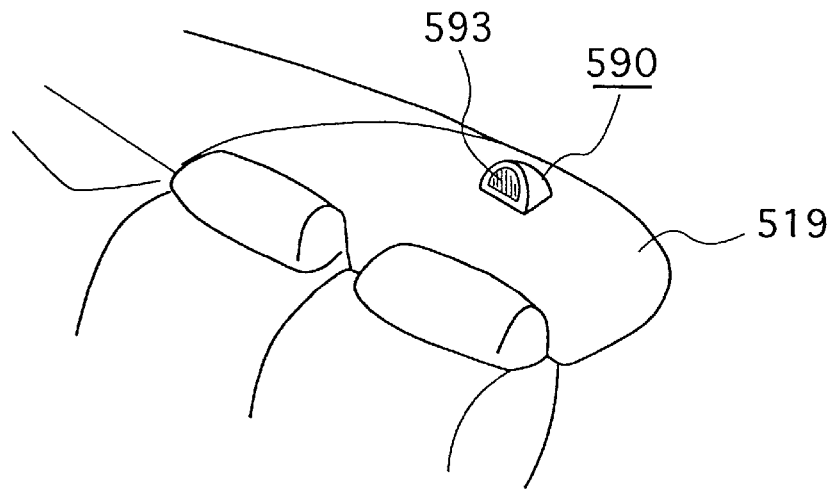
FIG. 51 is a perspective view showing a rear part of an interior of the car equipped with the nineteenth embodiment of the inventive abnormal approach warning indicator.
Figure 52:
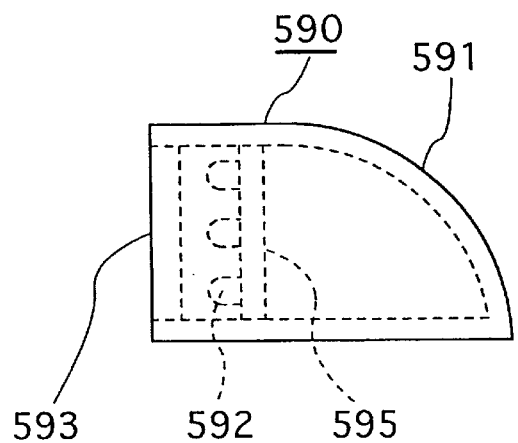
FIG. 52 is a side view showing a warning indicator part of the nineteenth embodiment of the inventive abnormal approach warning indicator.

FIG. 49 is a perspective view showing a rear part of a car equipped with an abnormal approach warning indicator according to a nineteenth embodiment of the information indicator of the invention. FIG. 50 is a rear view showing the car equipped with the nineteenth embodiment of the inventive abnormal approach warning indicator. FIG. 51 is a perspective view showing a rear part of an interior of the car equipped with the nineteenth embodiment of the inventive abnormal approach warning indicator. FIG. 52 is a side view showing a warning indicator part of the nineteenth embodiment of the inventive abnormal approach warning indicator.

Referring to FIGS. 49 to 52, the present embodiment of the abnormal approach warning indicator is provided by itself separately from the high mounted brake light, contrary to the seventeenth or eighteenth embodiment, which is incorporated in the stop lamp 520, 560. The nineteenth embodiment of approach warning indicator is composed of right and left distance sensors 581, 582, a warning indicator 590 and an emission control circuit 595. The distance sensors 581, 582 are embedded near the right and left ends of a rear surface of the rear bumper 513, respectively, so as not to protrude from the rear surface of the rear bumper 513. Distance sensors 581, 582 are similar to the sensors of the seventeenth embodiment, such as the ultrasonic sensor. Each of the distance sensors 581, 582 measures the distance between the car rear end and an obstacle behind the car. The warning indicator 590 has a case 591 provided at a predetermined position in the rear part of the cabin of the car such that LED lamps 592 contained in the case 591 emit light toward the car interior. In the illustrated embodiment, the case 591 is provided on a rear package tray 519. The LED lamp 592 is similar to the LED lamp 541 of the seventeenth embodiment. The case 591 has a box shape and a generally semicircular front face and a quadratic cross section. The case 591 has a semicircular front opening in which a lens 593, similar to the lens 542 of the seventeenth embodiment, is fitted to cover the opening. The case 591 is secured on the tray 519 while positioning the opening (lens side) toward the car interior. The emission control circuit 595 is contained inside the case 591 and controls the LED lamps 592 according to the outputs from the distance sensors 581, 582 in the same way as the seventeenth embodiment.

As in the seventeenth embodiment, the LED controller 595 has an input connected to the distance sensors 581, 582, respectively, so as to compute the distances between the car body 511 and the right and left obstacles behind it, respectively, based on the outputs from the distance sensors 581, 582. The LED controller 595 has an output connected to the LED lamps 592 so as to cause the LED lamps 592 to emit light of a desired color from among the preset colors, according to the outputs from the distance sensors 581, 582. The LED controller 595 of this embodiment has a similar structure to the LED controller 550 of the seventeenth embodiment, and controls the LED lamps 592 to generate a desired color of light.

Moreover, the LED lamps 592 and the LED controller 595 are mounted on a printed circuit board (not shown) into one body as in the seventeenth embodiment. Then, such a printed circuit board is inserted and fitted inside the case 591. Thus the structure for the present invention makes it easy to assemble the LED lamps 592 and the LED controller 595 on the case 591.

This embodiment of approach warning indicator operates in the same manner as the seventeenth embodiment, in accordance with the flowchart of FIG. 47, by the control of the LED controller 595. Since it has only one warning indicator 590, the LED controller 595 controls the LED lamps 592 to emit a fixed color of light, while processing the outputs from the right and left distance sensors 581, 582 through an OR circuit. Namely, if either the right or left distance sensor 581, 582 detects an object or obstacle within a range less than the smallest threshold L, the LED lamps 592 flash red. If either the right or left distance sensor 581, 582 detects an object or obstacle within a range not less than the smallest threshold L, but less than the medium threshold M, the LED lamps 592 flash orange. If either the right or left distance sensors 581, 582 detects an object or obstacle within a range not less than the medium threshold M but less than the largest threshold H, the LED lamps 592 flash yellow. If neither the right or left distance sensor 581, 582 detects any object within a range less than the largest threshold H, the LED lamps 592 are lit in green.

In this embodiment, a single warning indicator 590 is provided for a pair of distance sensors 581, 582 and the logical sum of the outputs from the sensors 581, 582 is computed by the LED controller 595 to control the LED lamps 592. However, as in the seventeenth embodiment, right and left warning indicators may be provided corresponding to the right and left distance sensors 581, 582 so that they independently display the warnings for the right and left obstacles. Otherwise, only one distance sensor may be provided for the warning indicator 590 so that the LED lamps 592 are controlled to emit a fixed color of light based on an output from the distance sensors. The warning indicator 590 is preferably secured at a rear position inside the cabin which easily attracts attention of the driver looking rearward when backing up. For example, it may be positioned at a center of the upper or lower end of the rear windshield 515. Thus, more effective warning can be attained without requiring the driver to look away from the vehicle surroundings.

In this embodiment, as in the seventeenth or eighteenth embodiment, when the car is backed for parking or the like, the distance sensors 581, 582 measure the distances from the car rear end to objects behind it, and change their outputs according to the detected distances. Moreover, control circuit 595 controls the LED lamps 592 based on the outputs from the distance sensors 581, 582. Then, the warning indicator 590 changes the indicating states and the LED lamps 592 emit light toward the cabin. At this time, the driver moves the car rearward, while watching the rear side through the rear windshield 515, so that he or she inevitably sees the warning indicator 590 which is located within his or her line of sight. Therefore, the driver can get an information regarding the obstacle behind the car from changes in the indicating states of the warning indicator 590. Moreover, the warning indicator 590 is located at the rear part of the cabin, e.g., the center of the upper or lower end of the rear windshield 515, which is easy to draw the attention of the driver who watches the rear of the car when backing up. Therefore, the warning indicator 590 can perform the warning effectively and reliably.

All of the LED lamps 592 and LED controller 595 are provided inside the case 591, so that these members can work only by introducing an external power source therein, and as a result, the approach warning indicator can be made compact. Because the distance sensors 581, 582 are disposed at the rear surface of the rear bumper 513, the sensors can exactly measure the distance to the obstacle. In addition, the case 591 of the warning indicator 590 is placed inside the cabin and the LED lamps 592 emit light toward the car interior side, so that the visibility of the warning indicators 590 is excellent and the warning information can be reliably transmitted to the driver without requiring the driver to look away from the vehicle surroundings. Moreover, the case 591 accommodates therein only the LED lamps 592 and LED controller 595, while the distance sensors 581, 582 are disposed near the rear end of the car body 511 separate from the above members, so that any size distance sensors can be used as the distance sensor 581, 582 regardless of the dimension of the warning indicator 590, thereby improving the reliability of the approach warning indicator.

Furthermore, in this embodiment, the LED lamps 592 can emit any desired color of light and the light color of the LED lamp 592 is changed by the LED controller 595 in one of the preset colors depending on the outputs from the distance sensors 581, 582, as in the seventeenth embodiment. Accordingly, the control circuit 595 changes the light of the LED lamps 592 in various colors depending on the distances from the car rear end to the objects behind it, e.g., into blue, green, yellow, orange and red in turn. Thus, more kinds of information can be transmitted to the driver. Moreover, this embodiment of approach warning indicator can be applied to cars that have no high mounted brake light 520, 560.

Figure 53:
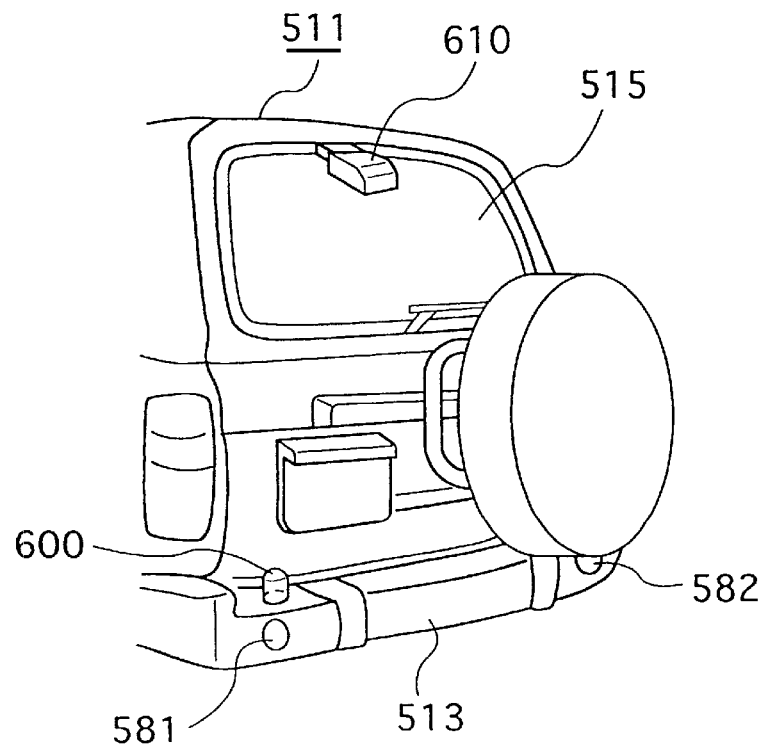
FIG. 53 is a perspective view showing a rear part of a car equipped with an abnormal approach warning indicator according to a twentieth embodiment of the information indicator of the invention.
Figure 54:
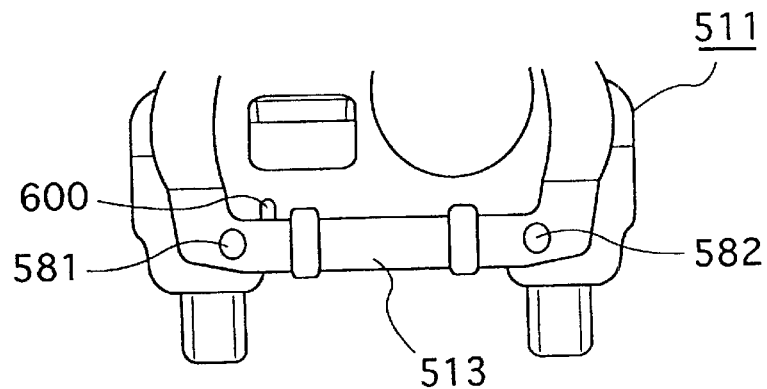
FIG. 54 is a rear view showing the car equipped with the twentieth embodiment of the inventive abnormal approach warning indicator.
Figure 55:
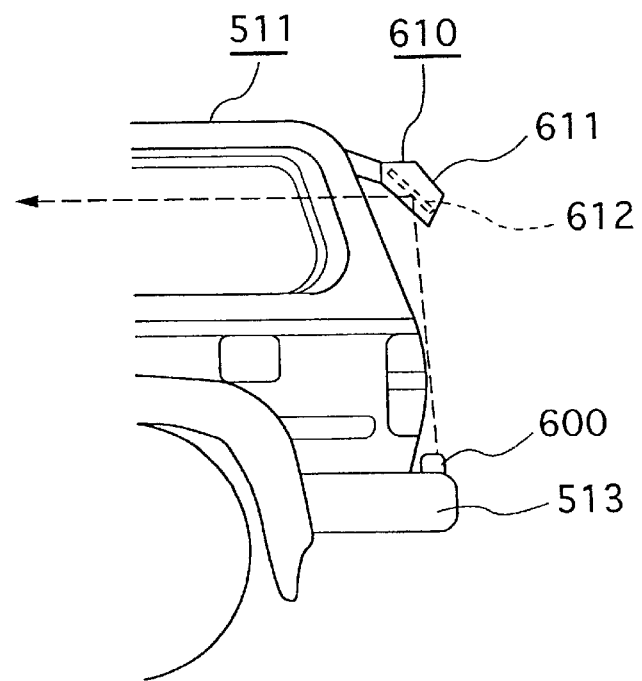
FIG. 55 is side view showing a rear part of the car equipped with the twentieth embodiment of the inventive abnormal approach warning indicator.
Figure 56:
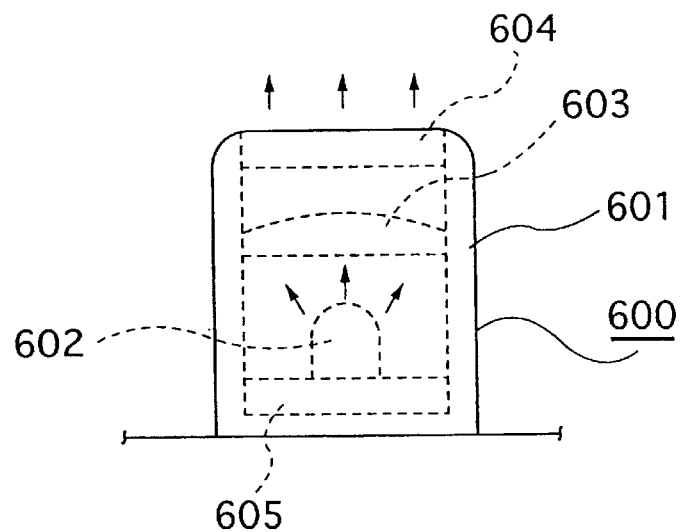
FIG. 56 is a side view showing a warning indicator part of the twentieth embodiment of the inventive abnormal approach warning indicator.

FIG. 53 is a perspective view showing a rear part of a car equipped with an abnormal approach warning indicator according to a twentieth embodiment of information indicator of the invention. FIG. 54 is a rear view showing the car equipped with the twentieth embodiment of the inventive abnormal approach warning indicator. FIG. 55 is side view showing a rear part of the car equipped with the twentieth embodiment of the inventive abnormal approach warning indicator. FIG. 56 is a side view showing a warning indicator part of the twentieth embodiment of the inventive abnormal approach warning indicator.

This embodiment of abnormal approach warning indicator is provided separately from the high mounted brake light 520, 560 as in the nineteenth embodiment. It has the right and left distance sensors 581, 582 of the nineteenth embodiment, a warning emitter 600 and an LED controller 605. The warning emitter 600 is composed of a housing 601 of a cylindrical shape with its upper end opened, an LED lamp 602 accommodated in the housing 601, a converging lens 603 disposed over the LED lamp 602 and a transparent plate shielding an upper opening of the housing 601. The housing 601 is fixed near a left end of an upper surface of the rear bumper 513 and contains the bullet-shaped LED lamp 602 with its top placed upward. The warning emitter 600 radiates a fixed color of light upward through the LED lamp 602 in a direction generally parallel to a rear surface of the car body 511. Moreover, the warning emitter 600 converges the light emitted from the LED lamp 602 through the converging lens so as to heighten the light intensity, thereby leading the intensified light upward in the predetermined direction.

Specifically, as shown by the broken line arrow in FIG. 55, the radiating direction of the light from the LED lamp 602 and the converging lens 603 is set such that the light enters nearly a center of a mirror surface 612 of a reflecting mirror 610, which is located at a left side of an upper end of the rear surface of the car body 511, and is reflected from the mirror surface toward the driver's seat inside the cabin. Namely, it is set such that the mirror surface center of the mirror 612 is positioned on a path of the light radiated from the warning emitter 600. The reflecting mirror 610 permits the driver to watch the rear bumper 513 in the recreational vehicle or the like. The mirror 612 mounted on a casing 611 reflects the image of obstacles located near the rear bumper 513 and visually notifies the driver in the cabin of it without requiring the driver to look away from the vehicle surroundings while operating the vehicle. The mirror surface of the mirror 612 constitutes a deflecting means for reflecting and deflecting the light emitted from the LED lamp 602 and leading it in another direction.

The LED controller 605 is disposed on a bottom inside the housing 601 and controls the light emission of the LED lamp 602 based on the outputs from the distance sensors 581, 582. As in the nineteenth embodiment, the LED controller 605 has an input connected to the distance sensors 581, 582 so as to compute the distances between the car body 511 and the right and left obstacles behind it, respectively, based on the outputs of the distance sensors 581, 582. The LED controller 605 has an output connected to the LED lamp 602 to control the LED lamp 602 to emit light of any desired color from among the preset colors according to the outputs from the distance sensors 581, 582. The LED controller 605 of this embodiment has a similar structure to the LED controller 550 of the seventeenth embodiment, and controls the LED lamp 602 to generate a desired color of light.

Moreover, the LED lamp 602 and the control circuit 605 are mounted on a printed board (not shown) into one body as in the seventeenth embodiment. Then, such a printed board is inserted and fitted inside the housing 601. This makes it easy to assemble the LED lamp 602 and the LED controller 605 in the housing 601.

This embodiment of approach warning indicator operates in the same manner as the seventeenth embodiment, in accordance with the flowchart of FIG. 47, by the control of the LED controller 605. Because it has only one warning emitter 600, the LED controller 605 controls the LED lamp 602 to emit a fixed color of light, while processing the outputs from the right and left distance sensors 581, 582 through an OR circuit. Namely, if either the right or left distance sensor 581, 582 detects an object or obstacle within a range less than the smallest threshold L, the LED lamp 602 flashes red. If either the right or left distance sensor 581, 582 detects an object or obstacle within a range not less than the smallest threshold L but less than the medium threshold M, the LED lamp 602 flashes orange. If either the right or left distance sensors 581, 582 detects an object or obstacle within a range not less than the medium threshold M but less than the largest threshold H, the LED lamp 602 flashes yellow. If neither the right or left distance sensor 581, 582 detects any object within a range less than the largest threshold H, the LED lamp 592 is lit green. Thus, a corresponding color of flashes or continuous light is converged by the converging lens 603 and passes through the cover 604. Then, the light reaches the mirror 612 of the reflecting mirror 610 and is reflected on the mirror surface of the mirror 612, so that the driver in the cabin can see such a light.

In this embodiment, a single warning emitter 600 is provided for a pair of distance sensors 581, 582 and the logical sum of the outputs from the sensors 581, 582 is computed by the LED controller 605 to control the LED lamp 602. However, as in the seventeenth embodiment, right and left warning emitters may be provided corresponding to the right and left distance sensors 581, 582 so that they independently emit lights for warnings for the right and left obstacles. Otherwise, only one distance sensor may be provided for the warning emitter 600 so that the LED lamp 602 is controlled to emit a fixed color of light based on an output from the distance sensor.

In this embodiment, when the car is backed for parking or the like, the distance sensors 581 and 582 measure the distances from the car rear end to the objects behind it, and change their outputs according to the distances. Moreover, the LED controller 605 controls the LED lamp 602 based on the outputs from the distance sensors 581 and 582. Then, the LED lamp 602 emits a fixed color of light and the converging lens 603 converges the light from the LED lamp 602, thereby radiating the light upward substantially in parallel to the rear surface of the car body 511. Thereafter, the converges light is reflected and deflected by the mirror surface of the mirror 612, which is located on the path of the light, at the upper position of the rear surface of the car body 511. Thus, the deflected light enters the cabin so that the driver can see such light without requiring the driver to look away from the vehicle surroundings while the driver operating the vehicle. Namely, the warning emitter 600 changes the light emitting state according to the outputs of the distance sensors 581, 582, and the mirror 612 radiates the emitted light toward the cabin via the mirror surface. The driver moves the car rearward, while watching the rear side through the rear windshield 515, so that he or she inevitably sees the mirror 612 of the reflecting mirror 610, which is located within his or her line of sight. Therefore, the driver can get information regarding an obstacle behind the car from changes in the light emitting state of the warning emitter 600 via the mirror 612. Moreover, the mirror 612 for radiating the light from the warning emitter 600 is located at the upper end of the rear windshield 515, which is easy to draw the attention of the driver who watches the rear side at the time of backing. Therefore, the approach warning indicator can perform the warning effectively and reliably.

Both the LED lamp 602 and LED controller 605 are provided inside the housing 601, so that these members can work only by introducing an external power source therein, and, as a result, the approach warning indicator can be made compact. In addition, the mirror 612 for leading the light from the warning emitter 600 to the cabin is placed at the upper end of the rear surface of the car body 511, which is easily seen from the cabin to deflect the light from the LED lamp 602 toward the cabin. Therefore, the driver can easily recognize the light from the warning emitter 600 via the mirror 612. Thus, the warning information can be reliably transmitted to the driver. Moreover, the housing 601 accommodates therein only the LED lamp 602 and LED controller 605, while the distance sensors 581, 582 are disposed near the rear end of the car body 511 separately from the above members, so that any size distance sensors can be used as the distance sensor 581, 582 regardless of the dimension of the warning emitter 600, thereby improving the reliability of the approach warning indicator.

Furthermore, in this embodiment, the LED lamp 602 can emit any desired color of light and the light color of the LED lamp 602 is changed by the LED controller 605 in one of the preset colors depending on the outputs from the distance sensors 581, 582, as in the seventeenth embodiment. Accordingly, the LED controller 605 changes the light of the LED lamp 602 in various colors depending on the distances from the car rear end to the objects behind it, e.g., into blue, green, yellow, orange and red in turn. Thus, more kinds of information can be transmitted to the driver.

The deflecting means is made of the mirror surface of the mirror 612 of the reflecting mirror 610 attached to the upper end of the car body 511 so that the mirror surface deflects the light from the LED lamp 602 toward the cabin. Accordingly, the mirror 612 reflects the light from the warning emitter 600, and no other special elements are necessary. Namely, the deflecting means needs no other member separately, so that it is possible to save a space for fitting such a separate member and reduce the costs of the warning system as a whole.

Figure 57:
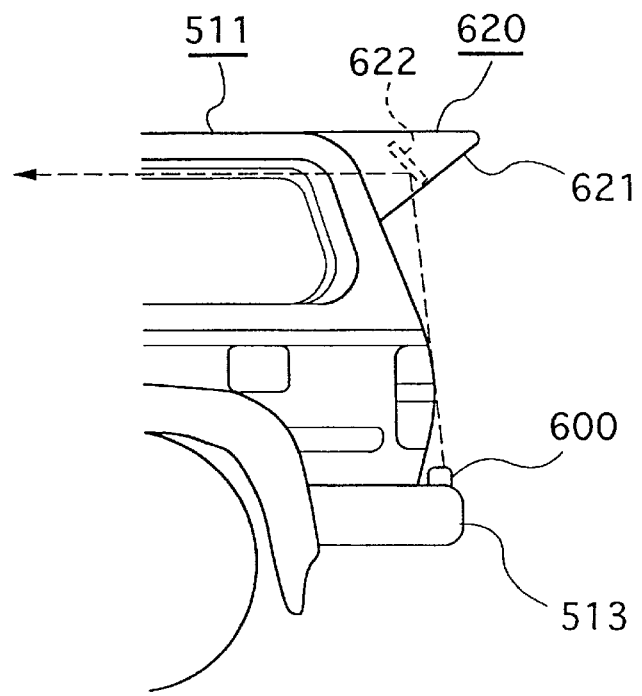
FIG. 57 is a side view showing a rear part of a car equipped with an abnormal approach warning indicator according to a twenty-first embodiment of the information indicator of the invention.

FIG. 57 is a perspective view showing a rear part of a car equipped with an abnormal approach warning indicator according to a twenty-first embodiment of the information indicator of the invention.

This embodiment of abnormal approach warning indicator substitutes a mirror surface of a mirror 622 incorporated in a main body 621 of a back visor 620, as a reflector, for the mirror surface of the mirror 612 of the reflecting mirror 610. Other structures are same as the twentieth embodiment. Namely, the back visor 620, as the reflector of this embodiment, is attached to the upper end of the rear surface of the car body 511 in order to improve aerodynamics and shield the rear seat from direct sunlight. The mirror 622 is fitted in a space defined by the inner surface of the main body 621 of the back visor 620. The mirror surface of the mirror 622 reflects the light from the LED lamp 602 of the warning emitter 600 into a direction leading to the cabin. The mirror 622 may have a variety of shapes as long as it can reflect the light from the LED lamp 602 toward the driver in the cabin. Specifically, as shown by the broken line arrow in FIG. 57, the radiating direction of the light from the LED lamp 602 and the converging lens 603 is set such that the light enters and is reflected near the lateral center of the mirror surface of the mirror 622, which is located at the upper end of the rear surface of the car body 511, thereby going toward the driver's seat inside the cabin.

This embodiment of approach warning indicator operates in the same way as the twentieth embodiment. Namely, a fixed color of light corresponding to the distance from the car rear end to the object behind the car is radiated from the warning emitter 600 in flashes or as continuous light. Then, the light reaches the mirror 622 inside the back visor 620 and is reflected by the mirror surface of the mirror 622, so that the driver in the cabin can see such a light for warning without requiring the driver to look away from the vehicle surroundings while operating the vehicle.

In addition to the functions and advantageous effects of the twentieth embodiment, the twenty-first embodiment needs no special space for fitting the mirror 622 as the deflecting means, because the mirror 622 is attached in the space inside the back visor 620. Moreover, the mirror 622 is shielded from the outside by the main body 621 of the back visor 620, so that the mirror 622 never deteriorates the aerodynamics nor the ornamental effects of the whole device.

Figure 58:
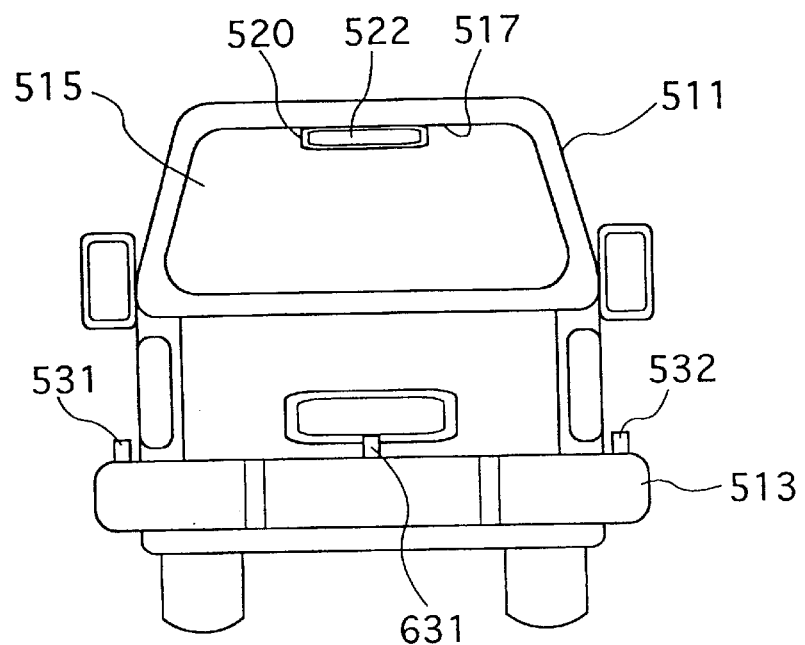
FIG. 58 is a rear view showing a car equipped with an abnormal approach warning indicator according to a twenty-second embodiment of the information indicator of the invention.
Figure 59:
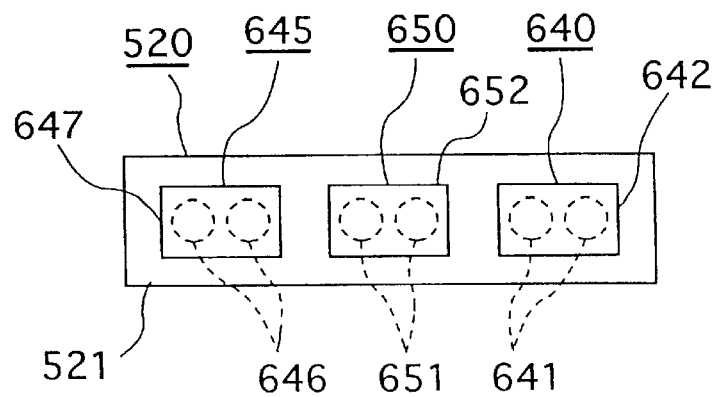
FIG. 59 is a front view showing a high mounted brake light, seen from a side of a warning indicator part, of an abnormal approach warning indicator according to a twenty-third embodiment of the information indicator of the invention.

FIG. 58 is a rear view showing a car quipped with an abnormal approach warning indicator according to a twenty-second embodiment of the information indicator of the invention. FIG. 59 is a front view showing a high mounted brake light, seen from the warning indicator part, of an abnormal approach warning indicator according to a twenty-third embodiment of the information indicator of the invention.

Referring to FIGS. 58 and 59, these embodiments of the abnormal approach indicator have a distance sensor 631 at a center of the rear end of the car body 511, in addition to the right and left distance sensors 531, 532 of the seventeenth embodiment. The sensors 531, 532, 631 can measure distances between the car and objects which are positioned at the right, left and center behind the car. Moreover, the present embodiment has three warning indicators 640, 645, 650 provided on the right, left and center of the housing 521 of the high mounted brake light 520 at its car interior side. Each warning indicator 640, 645, 650 has a similar structure to the warning indicator 540, 545 of the seventeenth embodiment. Namely, the warning indicator 640, 645, 650 each has LED lamps 641, 646, 651 which are capable of emitting light toward the car interior in the same manner as the LED lamps 541, 546, and lens 642, 646, 652 covering the emitting side (car interior side) of the LED lamps 641, 646, 651 in the same manner as the lens 542, 547. Moreover, this embodiment has an LED controller similar to the LED controller 605 of the seventeenth embodiment. Namely, the control circuit independently controls the LED lamps 641, 646, 651 of the right, left and center warning indicator 640, 645, 650 depending on outputs of the right, left and center distance sensors 531, 532 and 631, respectively.

The present embodiment provides a warning display operation for the center object or obstacle in addition to the warning display operation of the seventeenth embodiment. The control circuit controls the left LED lamp 641, right LED lamp 646, and center LED lamp 651 independently based on the outputs of the right, left and center distance sensors 531, 532, 631 in accordance with the flowchart of FIG. 47, though the control operation is same for each. The LED controller operates the LED lamps 641 of the left warning indicator 640, LED lamps 646 of the right warning indicator 645, and LED lamps 651 of the center warning indicator 650, respectively, to emit a fixed color of flashes or continuous light, e.g., red, orange, yellow, green, etc., in accordance with the distances between the car rear end and the right, left and center objects behind it. Thus, the warning indicator 640, 645, 650 corresponding thereto is illuminated.

In the present embodiment, when the reverse gear is selected, the distance sensors 531, 532, 631 measure the distances between the car body 511 and the right, left and center obstacles behind it and change their outputs depending on the distances. Moreover, the control circuit controls and drives on the LED lamps 641, 646, 651 independently, according to the outputs from the distance sensors 531, 532, 631, thereby changing indicating states of the warning indicators 640, 645, 650 independently. Then, the warning indicators 640, 645, 650 independently indicate warnings at the car interior side of the high mounted brake light 520, which is located inside the cabin, by illumination lights directed toward the car interior through the LED lamps 641, 646, 651. Therefore, the driver can get information regarding the right, left and center obstacles behind the car based on changes in indicating states of the warning indicators 640, 645, 650, as in the seventeenth embodiment. Particularly, the present embodiment of the approach warning indicator supplies information of the center object in addition to the right and left objects to the driver, thereby attracting his or her attention. Therefore, the driver can easily decides if there is an obstacle at the right, left or center behind the car.

While, in the seventeenth and eighteenth embodiments, the distance sensor 531, 532 are disposed at the right and left of the car and the warning indicators 540, 545, 570, 575 are contained at the right and left of the high mounted brake light 520, 560, the number of distance sensors or warning indicators is not limited thereto. For example, one distance sensor may be disposed at the center of the rear end of the car, e.g., the rear bumper 513 or the like, while one warning indicator being disposed on the high mounted brake light 520, 560. Then, the sensor detects the obstacle behind the car without taking it into account whether or not it is right or left, thereby informing the driver of it by light emitting display.

In each of the seventeenth to twenty-second embodiments, the quantity of light emitted from the LED lamp 541, 546, 592, 602 is set at about a medium value between a light quantity during the daytime and a light quantity during the nighttime, e.g., a value equivalent to a light quantity during the evening time, on the basis of the visibility curve by the well-known Prukinje effect. An optical sensor may be additionally provided on the approach warning indicator in order to determine if it is daytime or nighttime. In this case, it is preferable to detect the light quantity at the outside of the car, because the light quantity detector is added to improve the visibility of the approach warning indicator, which is also located outside of the car. With such a construction added, similar effects and advantages are obtained as in the fifth or sixth embodiment.

In each of the seventeenth to twenty-second embodiments, the distance sensor 531, 532, 581, 582 may be one of the ultrasonic sensor, optical sensor or other sensors, such as proximity sensor or proximity switch. It is possible to use any sensor which has characteristics suitable for detecting the distance from the sensor to the object, thereby improving the reliability in detection.

While, in each of the seventeenth to twenty-second embodiments, the LED lamp 541, 546, 592, 602 includes the red, green, and blue LEDs 541R, 541G, 541B, 546R, 546G, 546B, it is not always necessary to use these three colors of LEDs 541R, 541G, 541B, 546R, 546G, 546B, as long as a fixed color of light can be generated to represent a meaning for a predetermined warning or the like. Namely, if it is necessary to give multiple meanings to multiple warnings or the like, different colors of LEDs are used so that many colors of light can be generated for giving each a fixed meaning corresponding to the predetermined warnings. It is also possible to use one of the above three colors of LEDs. In this case, similar effects can be attained, although the emitted color is limited. Still, if three LEDs 541R, 541G, 541B, 546R, 546G, 546B are used, any desired color of light can be obtained, so that utilization field of the indicator becomes wider.

In the seventeenth to twenty-first embodiments, the control circuit 550, 595, 605 is supplied with power when the reverse gear is selected as the shift position, thereby performing the operation shown in FIG. 47. However, the LED controller 550, 595, 605 may be supplied with power to operate by an ON operation of the ignition switch.

The twentieth and twenty-first embodiment of approach warning indicators are applied to a hatch back car, such as the recreational vehicle because the light from the warning emitter 600 is reflected on the mirror 612, 622 of the reflecting mirror 610 or back visor 620. However, these embodiments may be modified in various forms as long as the driver can see the light from the warning emitter 600 in the cabin. For example, the position of the warning emitter 600 or mirror 612, 622 may be changed. Otherwise, other structures may be adopted as the deflecting means in addition to or other than the mirror surface of the mirror 612, 622, e.g., a prism.

While each of the seventeenth to twenty-second embodiments warns the driver of the distance between an object behind the car at the time of backing, it may be modified such that it detects a car distance between the car and another car behind it owing the distance sensor 531, 532, 581, 582, 631, during normal forwad operation thereby warning the driver through the warning indicator 540, 545, 570, 575, 590, 640, 645, 650, of the car distance. With such a structure, the driver is given car distance information by watching the car behind his or her car through the rear view mirror without requiring the driver to look away from the vehicle surroundings while operating the vehicle.

In the seventeenth, eighteenth and twenty-second embodiments, the LED 541, 546, 641, 646, 651 as the light source of the warning indicator 540, 545, 570, 575, 640, 645, 650 is provided separately from the lamp bulb 523 serving as the light source of the stop indicator of the high mounted stop lamp. However the LED may be used for the light source of the stop indicator. In which case, the LED is controlled and switched in the stop lamp operation and the warning lamp operation. Moreover, the car distance detecting structure may be added thereto. Then, the warning indicator as well as the high mounted stop lamp are lit at the same time, thereby warning the driver as well as a driver in the car behind his or her car, of the distance between the cars.

The preferred embodiments described herein are illustrative and not restrictive, the scope of the invention being indicated in the appended claims and all variations which come within the meaning of the claims are intended to be embraced therein.

What is claimed is:

1. An information indicating device that provides visual information regarding a vehicle to an operator of the vehicle, comprising:

an LED;

a light transmission structure disposed at a predetermined position outside a vehicle cabin within a line of sight of the vehicle operator while the vehicle operator is driving the vehicle for transmitting the light emitted from said LED to the vehicle operator during operation of the vehicle;

a detector that senses one or more conditions related to vehicle operation and generates a first predetermined signal in response to the sensed condition;

an LED controller operating said LED to transmit prescribed information to the vehicle operator in the form of one of a plurality of preset colors in response to said first predetermined signal when said first predetermined signal is greater that a predetermined threshold value and to emit a bluish light, responsive to the quantity of light in the environment in which the vehicle is operating, when said first predetermined signal is below said predetermined threshold value.

2. An information indicating device that provides visual information regarding a vehicle to an operator of the vehicle, comprising:

a light-transmitting main body provided on a fender marker near a front end of at least one of a right and a left said of the vehicle;

a plurality of LEDs of different colors disposed inside said main body;

a detector for detecting a predetermined state of the vehicle and providing a first predetermined signal to an LED controller indicative of said predetermined state of the vehicle;

said LED controller controlling operating said LEDs to illuminate at least a portion of said main body in one of a plurality of said preset colors wherein in response to said first predetermined signal received from said detector, said LEDs emit a bluish light, responsive to the quantity of light in the environment in which the vehicle is operating.

3. An information indicating device according to claim 2, wherein said detector is a shift position switch detecting selection of a gear;

said LED controller operates said LEDs to illuminate at least a portion of said main body in a first one of said preset colors when a second predetermined signal indicative of the selected gear is input to said LED controller from said shift position switch.

4. An information indicating device according to claim 2, wherein said detector detects a clearance between a car body and an object at the side of the car body;

said LED controller operates said LEDs to illuminate a portion of said main body in a second one of said preset colors if a second predetermined signal indicative of the clearance being not more than a fixed threshold value is input said LED controller from said detector.

5. An information indicating device according to claim 2, wherein said detector is a speed sensor detecting a speed of the vehicle;

said LED controller operates said LEDs to illuminate at least a portion of said main body in a third one of said preset colors if a second predetermined signal indicative of the vehicle speed exceeding a threshold speed limit is input to said LED controller from said speed sensor.

6. An information indicating device according to claim 2, wherein said detector is a parking brake switch detecting actuation of a parking brake; said LED controller operates said LEDs to illuminate at least a portion of said main body in a second one of said preset colors if a predetermined signal indicative of activation of said parking brake is input to said LED controller from said parking brake switch.

7. An information indicating device according to claim 2, wherein said detector is a distance sensor that monitors the environment around the vehicle and initiates a signal when another object is within a predetermined distance;

said LED controller operates said LEDs to illuminate at least a portion of said main body in a second one of said preset colors if said signal indicative of the distance between the vehicle and said other object is less than a threshold value is input to said LED controller from said car distance sensor.

8. An information indicating device according to claim 2, wherein said detector is a malfunction detecting circuit detecting a malfunction of the vehicle;

said LED controller operates said LEDs to illuminate at least a portion of said main body in a sixth one of said preset colors if a second predetermined signal indicative of the malfunction is input to said LED controller from said malfunction detecting circuit.

9. An information indicating device according to claim 2, wherein a plurality of said detectors are operatively coupled to said LED controller to selectively provide signals from said plurality of detectors to said LED controller which operates said LEDs to illuminate at least a portion of said main body in one of said preset colors in accordance with a state corresponding to the signal provided said LED controller.

10. An information indicating device according to claim 3, wherein said shift position switch detects selection of a reverse gear.

11. An information indicating device according to claim 4, wherein said detector is a corner sensor.

12. An information indicating device that provides visual information regarding a vehicle to an operator of the vehicle, comprising:

a light-transmitting main body provided on a fender marker near a front end of at least one of a right and a left side of the vehicle;

a plurality of LEDs of different colors disposed inside said main body;

an LED controller for controlling said LEDs in combination to illuminate at least a portion of said main body in one of a plurality of preset colors of light;

a device detecting a predetermined state of the vehicle and providing a first predetermined signal to said LED controller indicative of said predetermined state of the vehicle;

wherein the LED controller operates said LEDs to illuminate at least a portion of said main body in one of said preset colors in response to said first predetermined signal received from said detector and to emit a reddish light responsive to a quantity of light in an environment in which the vehicle is operating is more than a predetermined value, while operating said LEDs to emit a bluish light responsive to the quantity of light in the environment in which the vehicle is operating is not more than said predetermined value.

13. An information indicating device comprising:

a main body attached at a position outside a vehicle cabin near a front end of at least one of a right and a left side of a vehicle;

an LED housed within said main body;

a distance sensor for measuring a distance between the vehicle and an object near the vehicle;

an LED controller for controlling said LED based on an output of said distance sensor, wherein said LED emits a bluish light, responsive to the quantity of light in the environment in which the vehicle is operating, when the output from the said distance sensor is above a predetermined value.

14. An information indicating device according to claim 13, wherein the distance sensor is housed substantially within said main body and measures a distance between the vehicle and an object at the side of the vehicle.

15. An information indicating device according to claim 13, wherein said main body is a fender marker or a corner pole.

16. An information indicating device according to claim 13, wherein said distance sensor is one of an ultrasonic sensor, an optical sensor and a proximity switch.

17. An information indicating device comprising:

a main body attached at a position outside a vehicle cabin near a front end of at least one of a right and a left side of a vehicle;

an LED housed within said main body;

a distance sensor for measuring a distance between the vehicle and an object near the vehicle;

an LED controller for controlling said LED based on an output of said distance sensor, wherein said distance sensor is housed substantially within said main body and measures a distance between the vehicle and the object at the side of the vehicle, and wherein said main body is one of a fender marker and a corner pole.

18. An information indicating device comprising:

a main body attached at a position outside a vehicle cabin near a front end of at least one of a right and a left side of a vehicle;

an LED housed within said main body;

a distance sensor for measuring a distance between the vehicle and an object near the vehicle;

an LED controller for controlling said LED based on an output of said distance sensor, wherein said main body is one of a marker and a corner pole attached near a front end of the vehicle said distance sensor is disposed inside said one of said marker ad said corner pole;

said LED is housed substantially within said one of said marker and said corner pole;

said information indicating device further comprising an indicating portion disposed on said one of said marker and said corner pole to receive light emitted from said LED to transmit the light to the vehicle operator.

19. An information indicating device comprising:

a main body attached at a position outside a vehicle cabin near a front end of at least one of a right and a left side of a vehicle;

an LED housed within said main body;

a distance sensor for measuring a distance between the vehicle and an object near the vehicle;

an LED controller for controlling said LED based on an output of said distance sensor, wherein said main body is one of a maker and a corner pole attached near a front end of the vehicle;

said distance sensor is housed substantially within said one of said marker and said corner pole;

said information indicating device further comprising an indicating portion disposed on said one of said marker and said corner pole and accommodating said LED to transmit light from said LED to the vehicle operator;

a lead connecting said LED controller to said LED, said lead being capable of stretching and contracting in accordance with a change in length of said one of said marker and said corner pole.

20. An information indicating device comprising:

a distance sensor, disposed on a vehicle, for detecting an object near the vehicle and outputting a signal corresponding to a distance between the vehicle and the object;

a warning indicator, disposed on a mirror attached to the vehicle, an LED having a lens configured to emit light only in a direction of a driver of the vehicle;

an LED controller for controlling said LED based on an output of said distance sensor, wherein said LED is capable of emitting a plurality of colors of light, said LED controller changes the color of light of said LED according to the output of said distance sensor, and said LED emits a bluish light, responsive to the quantity of light in the environment in which the vehicle is operating, when the output of said distance sensor is above a predetermined value.

21. An information indicating device as claimed in claim 20, wherein said mirror is an external mirror.

22. An information indicating device according to claim 21, wherein said distance sensor is disposed on said external mirror and detects a road hazard located in front of and at a side of a front wheel of the vehicle, said distance sensor outputting a signal corresponding to a depth of said hollow;

wherein said warning indicator is substantially disposed around a circumference of said external mirror.

23. An information indicating device according to claim 22, wherein said distance sensor and said warning indicator are provided on a door mirror, a fender mirror, or an auxiliary external mirror disposed at a side of the vehicle opposite the driver.

24. An information indicating device according to claim 22, wherein said distance sensor and said warning indicator are provided on a door mirror and an auxiliary mirror, respectively, disposed at a side of the vehicle opposite the driver;

a first distance sensor on the door mirror detects said road hazard at a side of a front wheel of the vehicle proximate to said auxiliary mirror;

a second distance sensor on said auxiliary mirror detects said road hazard in front of the front wheel of the vehicle proximate to said auxiliary mirror.

25. An information indicating device according to claim 21, wherein said distance sensor is disposed on said external mirror and detects an object at the side of the vehicle to output a signal corresponding to a distance between the vehicle and the object;

said warning indicator is disposed substantially around a circumference of a mirror portion of said external mirror.

26. An information indicating device according to claim 25, wherein said distance sensor and said warning indicator are provided on one of a door mirror, a fender mirror and an auxiliary external mirror disposed at a side of the vehicle opposite the driver.

27. An information indicating device according to claim 20, wherein said distance sensor, provided on a corner of the vehicle at a side opposite the driver, detects objects in front of as well as at a side of the vehicle and outputs a signal corresponding to a distance between the vehicle and the objects;

said warning indicator is provided on one of a door mirror, a fender mirror and an auxiliary external mirror disposed at a side of the vehicle opposite the driver.

28. An information indicating device according to claim 20, wherein said distance sensor is disposed on a side molding of the vehicle and detects an object at the side of the vehicle and outputs a signal corresponding to a distance between the vehicle and the object.

29. An information indicating device comprising:

a distance sensor, attached near a rear end of a vehicle, for measuring a distance between the vehicle and an object behind the vehicle;

a warning indicator, disposed near the rear end of the vehicle, comprising an LED capable of emitting light toward an interior of the vehicle;

an LED controller for controlling said LED based on an output of said distance sensor, wherein said LED is capable of emit a plurality of colors of light, said LED controller changes the color of light of said LED according to the output of said distance sensor, and said LED emits a bluish light, responsive to the quantity of light in the environment in which the vehicle is operating, when the output of said distance sensor is above a predetermined value.

30. An information indicating device according to claim 29, wherein said warning indicator is disposed on the housing of a brake light disposed inside the vehicle such that said warning indicator faced the interior of the vehicle.

31. An information indicating device according to claim 30, wherein said distance sensor is provided on each of a right and a left side of the rear end of the vehicle to measure distances between the vehicle and objects behind the vehicle at the right and left sides thereof;

said warning indicator comprises a first and a second warning indicator provided on each of a right and a left side of said brake light, respectively, at a side of said brake light facing the interior of the vehicle;

said LED controller independently controls said LEDs of said first and second warning indicators according to outputs of said right and left distance sensors.

32. An information indicating device according to claim 30, wherein said distance sensor is provided on each of a right and a left and a center portion of the rear end of the vehicle to measure distances between the vehicle and objects behind the vehicle at the right and left and center portion thereof;

said warning indicator comprises a first, a second and a third warning indicator provided on each of right and left and center portions of said brake light, respectively, at a side thereof facing the interior of the vehicle;

said LED controller independently controls said LEDs of said first, second and third warning indicators according to outputs of said right and left and center distance sensors.

33. An information indicating device according to claim 29, wherein said warning indicator comprises a case disposed at a predetermined position of a rear portion of a cabin of the vehicle and said LED is housed inside said case.

34. An information indicating device according to claim 29, wherein said warning indicator comprises a warning emitter having a housing provided near a rear end of the vehicle and said LED is disposed within said housing to emit a selected color of light upward, substantially parallel to a rear surface of the vehicle;

a reflector positioned at an upper end of the rear surface of the vehicle and on an optical path of said light emitted from said LEDs to reflect said light toward the vehicle interior.

35. An information indicating device according to claim 34, wherein said reflector is a mirror attached to the upper end of the rear surface of the vehicle.

36. An information indicating device comprising:

a distance sensor, attached near a rear end of a vehicle, for measuring a distance between the vehicle and an object behind the vehicle;

a warning indicator, disposed near the rear end of the vehicle, having an LED capable of emitting light toward an interior of the vehicle, said warning indicator comprising;

a warning emitter having a housing provided near a rear end of the vehicle and said LED disposed within said housing to emit a selected color of light upward, substantially parallel to a rear surface of the vehicle;

a reflector positioned at an upper end of the rear surface of the vehicle and on an optical path of said light emitted from said LED to reflect said light toward the vehicle interior;

an LED controller for controlling said LED based on an output of said distance sensor, wherein said reflector is a mirror attached in a space inside a back visor disposed on the upper end of the rear surface of the vehicle.

37. An information indicating device that provides visual information regarding a vehicle to an operator of the vehicle, comprising:

an LED;

a light transmission structure disposed at a predetermined position outside a vehicle cabin within a line of sight of the vehicle operator to transmit light emitted from said LED to the vehicle operator;

a detector that senses one or more conditions related to vehicle operation and generates a first predetermined signal in response to said one or more conditions;

an LED controller operating said LED to transmit prescribed information to the vehicle operator in the form of one of a plurality of preset colors in response to said first predetermined signal when said first predetermined signal is greater that a predetermined threshold value and to emit another one of said plurality of preset colors, when said first predetermined signal is below said predetermined threshold value.

38. An information indicating device that provides visual information regarding a vehicle to an operator of the vehicle, comprising:

an LED;

a light transmission structure disposed at a predetermined position outside a vehicle cabin within a line of sight of the vehicle operator to transmit light emitted from said LED to the vehicle operator;

a detector that senses one or more conditions related to vehicle operation and generates a first predetermined signal in response to the sensed condition;

an LED controller operating said LED to transmit prescribed information to the vehicle operator in the form of a bluish light in response to said first predetermined signal when said first predetermined signal is greater that a predetermined threshold value and to emit one of a plurality of preset colors, when said first predetermined signal is below said predetermined threshold value.

39. An information indicating device that provides visual information regarding a vehicle to an operator of the vehicle, comprising:

an LED;

a light transmission structure disposed at a predetermined position outside a vehicle cabin within a line of sight of the vehicle operator to transmit light emitted from said LED to the vehicle operator;

a detector that senses one or more conditions related to vehicle operation and generates a first predetermined signal in response to the sensed condition;

an LED controller operating said LED to transmit prescribed information to the vehicle operator in the form of a colored light, responsive to the quantity of light in the environment in which the vehicle is operating, in response to said first predetermined signal when said first predetermined signal is greater that a predetermined threshold value and to emit a second colored light, responsive to the quantity of light in the environment in which the vehicle is operating, when said first predetermined signal is below said predetermined threshold value.

40. An information indicating device that provides visual information regarding a vehicle to an operator of the vehicle as claimed in claim 39, wherein said second colored light has a greater intensity than said first colored light.

41. An information indicating device that provides visual information regarding a vehicle to an operator of the vehicle as claimed in claim 39, wherein said first colored light is a bluish light and said second colored light is a reddish light.

42. An information indicating device that provides visual information regarding a vehicle to an operator of the vehicle as claimed in claim 39, wherein said first and said second colored lights are each one of a plurality of preset colors.

43. An information indicating device that provides visual information regarding a vehicle to an operator of the vehicle, comprising:

an LED;

a light transmission structure disposed at a predetermined position outside a vehicle cabin within a line of sight of the vehicle operator to transmit light emitted from said LED to the vehicle operator;

a detector that senses one or more conditions related to vehicle operation and generates a first predetermined signal in response to the sensed condition;

an LED controller operating said LED to transmit prescribed information to the vehicle operator in the form of one of a plurality of preset colors in response to said first predetermined signal when said first predetermined signal is greater that a predetermined threshold value and to flash one of said plurality of preset colors, when said first predetermined signal is below said predetermined threshold value.

44. An information indicating device that provides visual information regarding a vehicle to an operator of the vehicle, comprising:

an LED;

a light tranmission structure disposed at a predetermined position outside a vehicle cabin within a line of sight of the vehicle operator to transmit light emitted from said LED to the vehicle operator;

a detector that senses one or more conditions related to vehicle operation and generates a first predetermined signal in response to the sensed condition;

an LED controller operating said LED to transmit prescribed information to the vehicle operator in the form of one of a plurality of preset colors in response to said first predetermined signal when said first predetermined signal is greater that a predetermined threshold value and to flash one of said plurality of preset colors, when said first predetermined signal is below said predetermined threshold value, to transition to another one of said plurality of preset colors following said flashing color.

45. An information indicating device comprising:

a distance sensor, disposed on a vehicle, for detecting an object near the vehicle and outputting a signal corresponding to a distance between the vehicle and the object;

a warning indicator, disposed on an external mirror attached to the vehicle, an LED having a lens configured to emit light only in a direction of a driver of the vehicle;

an LED controller controlling said LED based on an output of said distance sensor, wherein said LED is capable of emitting a plurality of colors of light, said LED controller changes the color of light of said LED according to the output of said distance sensor, and said LED emits a reddish light, responsive to the quantity of light in the environment in which the vehicle is operating, when the output of said distance sensor is above a predetermined value.

* * * * *